United States Patent [19]
Farrand et al.

[11] Patent Number: 5,471,617
[45] Date of Patent: Nov. 28, 1995

[54] COMPUTER MANAGEMENT SYSTEM AND ASSOCIATED MANAGEMENT INFORMATION BASE

[75] Inventors: Scott C. Farrand, Tomball; Jonathan R. Didner, Houston; Daniel J. Mazina, Houston; Jeffrey S. Autor, Houston; Paul J. Muraski, Spring; Gregory M. Stewart, Houston; John A. Dysart, Houston, all of Tex.

[73] Assignee: Compaq Computer Corporation, Houston, Tex.

[21] Appl. No.: 933,920

[22] Filed: Aug. 21, 1992

Related U.S. Application Data

[63] Continuation-in-part of Ser. No. 720,259, Jun. 24, 1991, Pat. No. 5,367,670.

[51] Int. Cl.[6] .............................. G06F 9/44; G06F 15/40
[52] U.S. Cl. .......................................... 395/700; 395/600
[58] Field of Search ................................. 395/600, 650, 395/700

[56] References Cited

U.S. PATENT DOCUMENTS

| | | | |
|---|---|---|---|
| 5,257,371 | 10/1993 | Anezaki | 395/650 |
| 5,295,244 | 3/1994 | Dev et al. | 395/161 |
| 5,295,256 | 3/1994 | Bapat | 395/500 |
| 5,317,742 | 5/1994 | Bapat | 395/700 |

FOREIGN PATENT DOCUMENTS

| | | | |
|---|---|---|---|
| 0315425 | 11/1988 | European Pat. Off. | G06F 15/40 |
| 0413074 | 8/1989 | European Pat. Off. | G06F 15/16 |
| 0488035 | 11/1991 | European Pat. Off. | H04L 12/24 |

OTHER PUBLICATIONS

S. F. Wu et al., "Network Management With Consistently Managed Objects", *Globecom '90 IEEE Global Telecommunications Conference & Exhibition*, pp. 182–187, (1990).
T. Maynard-Smith, "The Network Management Domain", *ICL Technical Journal*, vol. 7, No. 4, pp. 763–779 (1991).
S. R. Reasoner et al., "Management By Proxy Agent", *IRE Wescon Conference Record*, vol. 35, pp. 190–195 (1991).

*Primary Examiner*—Kevin A. Kriess
*Attorney, Agent, or Firm*—Konneker & Bush

[57] ABSTRACT

A method of managing a plurality of networked manageable devices which include at least one file server having a system board, a drive array subsystem associated with the file server and a server manager installed in the file server for monitoring the system board from a manager console using a management information base or "MIB". First, second and third plurality of objects which describe the system board, the drive array subsystem and the server manager, respectively, are collected and assembled into a MIB. The assembled MIB is then used to manage the file server.

19 Claims, 20 Drawing Sheets

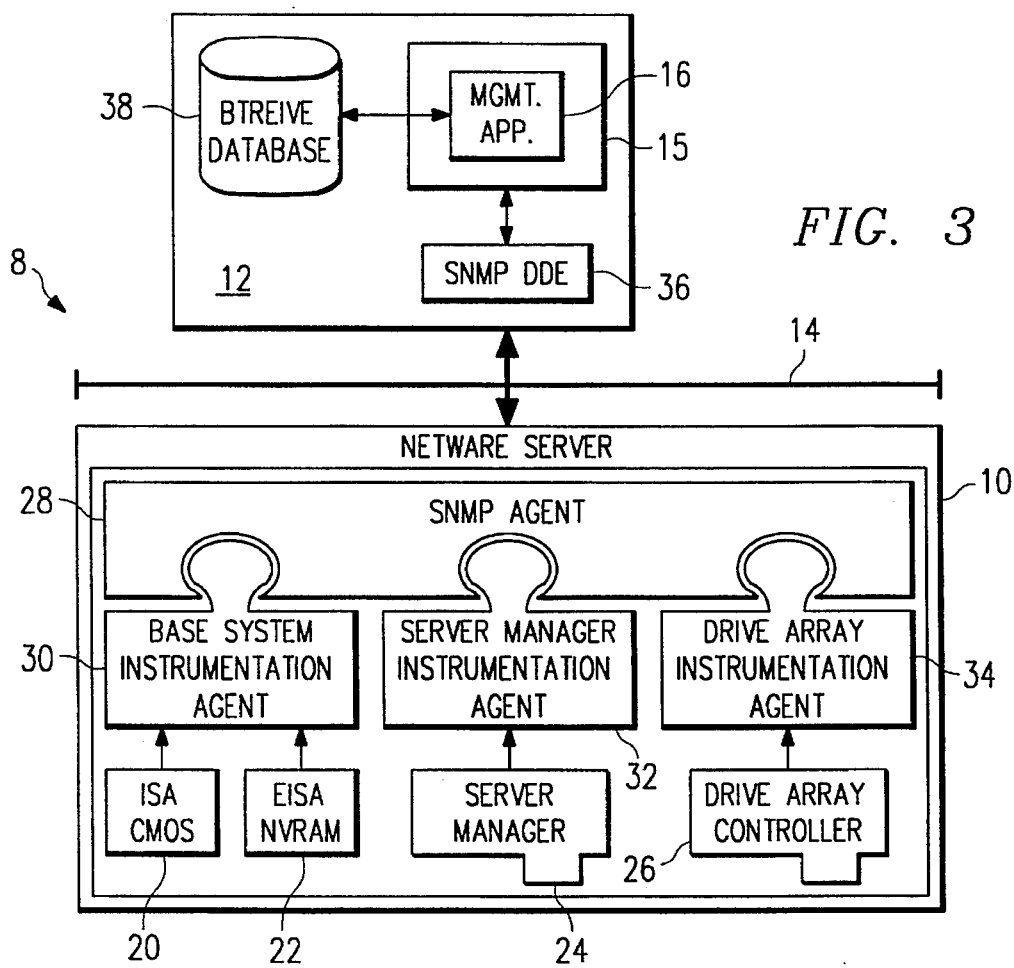
FIG. 3
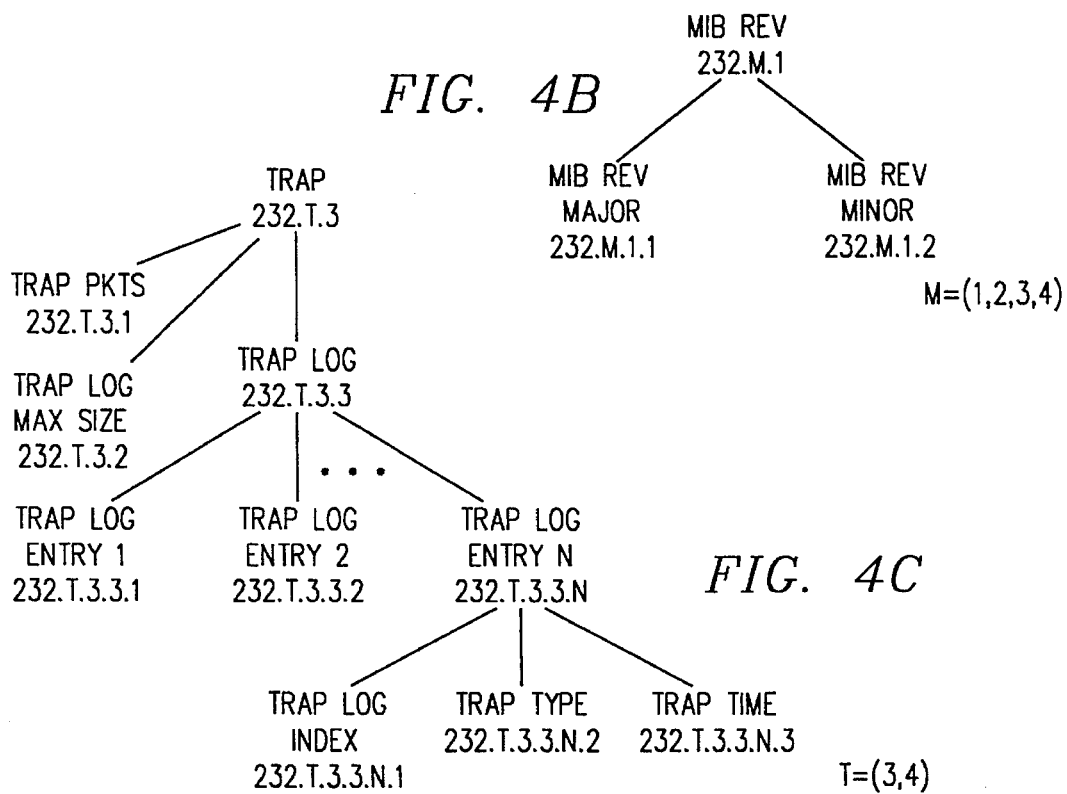
FIG. 4B
FIG. 4C

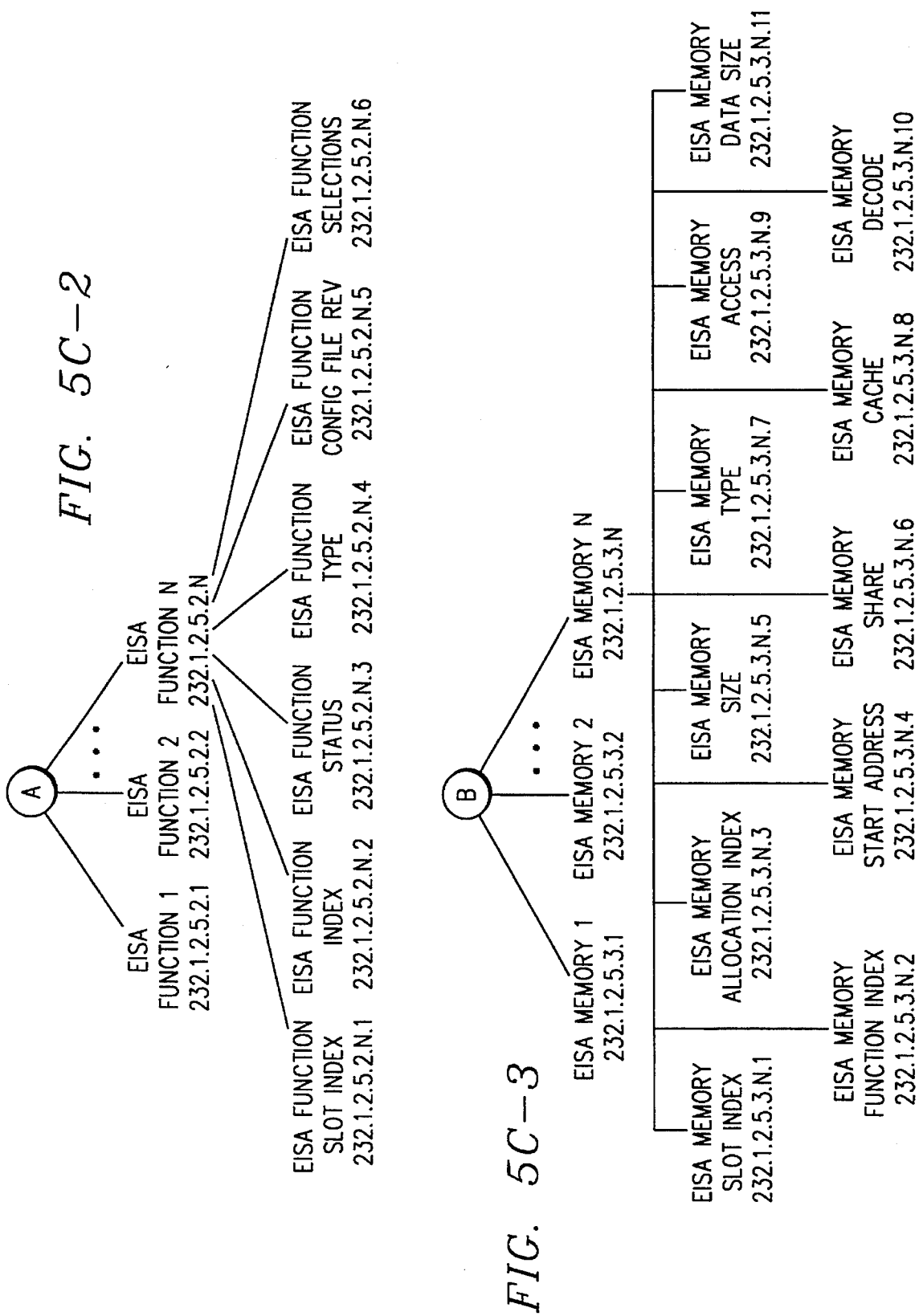

FIG. 7F

COMPUTER MANAGEMENT SYSTEM AND ASSOCIATED MANAGEMENT INFORMATION BASE

CROSS REFERENCE TO RELATED APPLICATION

This application is a Continuation-in-Part of U.S. patent application Ser. No. 07/720,259 filed Jun. 24, 1991, issued Nov. 22, 1994 as U.S. Pat. No. 5,367,670, entitled "Computer System Manager", assigned to the Assignee of the present application and hereby incorporated by reference as if reproduced in its entirety.

This application is also related to the following pending U.S. patent applications, all of which are assigned to the Assignee of the present application and hereby incorporated by reference as if reproduced in their entireties:

| Patent No. | Issue Date | Title |
| --- | --- | --- |
| 5,402,431 | 03/28/95 | Innate Bus Monitoring System for Computer System Manager |
| 07/720,258 | 06/24/91 | In-band/Out-of-Band Alert Delivery System for Computer System Manager |
| 07/719,243 | 06/24/91 | Remote Console Emulator for Computer System Manager |
| 5,283,905 | 02/01/94 | Power Supply for Computer System Manager |
| 07/756,506 | 09/08/91 | Remote System Reboot |
| 5,257,384 | 10/26/93 | Asynchronous Protocol for Computer System Manager |
| 5,309,563 | 05/03/94 | Network Protocol for Computer System Manager |
| 5,272,382 | 12/21/93 | Power Supply for Computer System Manager |

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The invention relates to a computer management system and, more particularly, to a computer management system having plural instrumentation agents for querying manageable devices to collect object data and an associated enterprise management information base (or "MIB") for storing object data in accordance with a specified MIB architecture.

2. Description of Related Art

The Internet community has defined an organizational framework of data and provides a naming authority allowing any company or group to define information within the framework in a way that allows any or all of this data to coexist. Under the control of the International Telegraph and Telephone Consultative Committee (or "CCITT") and the International Organization for Standardization (or "ISO"), the organizational framework has been constructed as a tree. The root of the tree is managed by CCITT and ISO. Extending from the root of the tree are a series of branches defined by CCITT and ISO. However, while the branch is initially defined by the managing authority, authority for the branch may then be given to another organization for defining the child branches for that branch. FIG. 1 illustrates the structure of the organizational framework defined by the Internet community and is included here so that the relationship of the enterprise MIB subject of the present application and the remainder of the Internet community will be clear.

Every piece of information within the organizational framework is configured in a formal grammar and referred to by its full name so that it can be unambiguously specified, thereby making information transfers within an interoperable network system possible. A series of dotted decimal notations, each separated by periods, specifies all of the branches needed to reach a particular item. For example, all items originating in a private enterprise would be headed by the notation "1.3.6.1.4.1". From a specific private enterprise, an item would be identified using the name 1.3.6.1.4.1.XXX.YY where "XXX" is an identifier assigned to that enterprise by the ISO and "YY" is an identifier assigned to that particular item by enterprise "XXX" under the authority of the ISO.

Simple Network Management Protocol (or "SNMP") is a protocol widely used within the Internet community for interoperable network management The SNMP protocol defines a set of commands that a management application may use to retrieve or change the value of items that a management agent is making available. The Internet community also maintains a series of documents which describe the communication protocols used by the community. These documents are called "Request for Comments" and are commonly referred to as "RFCs". Each RFC is assigned a number to identify the document. For example, RFC 1212 defines the formal grammar for a SNMP MIB.

A MIB is a data base that describes a set of items that management applications and agents use to report and control managed devices. A description of a MIB starts with a line that states the name of the MIB being defined. Typically, the name of the MIB is followed by an import statement which allows the MIB writer to specify information from other well known MIBs that are referred to in the MIB being defined. Within a MIB is a structure for organizing managed items. To form the structure, the MIB defines a group or groups for organizing related pieces of information. A group is defined by stating a name for the group and showing how the group fits into the tree. Typically, all group definitions are placed immediately following the IMPORTS statement. Groups may contain information in the form of items or "objects", sub-groups, or a combination of the two. Similarly, each sub-group is configured like a group.

Within a group or sub-group, data may be organized in one of two basic methods. A scalar item is a single piece of information that is within a group. For example, the total memory in a server is a scalar item. A table is a structure for organizing data that requires more information to uniquely identify a single data item within a group of similar items. An example of an item that is best organized in a table is an EISA board ID. It is necessary for someone requesting an EISA board ID to specify the EISA board to which they are referring.

Each item, either scalar or part of a table, defined in a MIB includes a description which explains the item. Typically, the description includes SYNTAX, ACCESS, STATUS and DESCRIPTION clauses. The SYNTAX clause specifies the type of information which the item contains. Information types typically specified by the SYNTAX clause include INTEGER, OCTET STRING, Counter and DisplayString. INTEGER specifies that the value of the item should be interpreted as a number. OCTET STRING specifies that the value of the item should be interpreted as a string of octets, each having a value between 0 and 255. Counter specifies that the item is an INTEGER that has an implied range of zero to FFFFFFFF. DisplayString specifies that the item is an OCTET STRING where each octet is restricted to a printable ASCII character.

The ACCESS clause specifies the ways the item may be used and shows the actions which the agent may support for the item. ACCESS may be read-only, read-write or not-accessible. Read-only means that the value of the item may be retrieved by a management application but may not be altered. Read-write means that the item may be read and/or altered by a management application. Not-accessible is given as the access for organizational constructs that do not represent data items. Not-accessible is used only for table features and should not be used for a scaler item. The STATUS clause specifies whether the item is required for an agent that supports the defined group. A STATUS of mandatory means that the item will always be present if the defined group is supported by the agent. A STATUS of optional means that a particular implementation has the option of supporting the item. The DESCRIPTION clause contains a double quote delimited text description of the item. Finally, the item definition ends by specifying how the item fits into the MIB tree. The group the item belongs to is given, followed by the unique branch number within the group for the item.

To organize a table requires the use of two additional operators, the SEQUENCE operator and the SEQUENCE OF operator. The SEQUENCE operator allows the definition of a new type that consists of several standard types in a specific order. The SEQUENCE OF operator allows the definition of a list of zero or more of the same type of elements. A table is formed by defining a SEQUENCE, typically called a table entry. A table is defined as a SEQUENCE OF the table entry type. As there is no data that is uniquely referred to by the name of the table or entry, the STATUS of the table and the table entry is not-accessible. The INDEX clause specifies the items that can be used to uniquely identify an element in the table.

A MIB may also contain trap definitions. A trap is a notification sent by the SNMP agent to a management console. The trap is sent to inform the management console about an event that has occurred on the managed system. The trap definition begins with the name of the trap, followed by the term TRAP-TYPE. An ENTERPRISE clause follows to indicate the MIB in which the trap is defined. An optional VARIABLES clause may also be included to specify additional information that will be sent in the trap. Typically, the additional information contained in the VARIABLES clause will be items defined in the MIB identified in the ENTERPRISE clause. A DESCRIPTION clause which explains the significance of the trap and the conditions that would cause it to be sent follows. Finally, the trap is given a number to identify it. The number will be unique within the scope of the ENTERPRISE. Both the enterprise name and the trap number are used by the management station to uniquely determine the identity of a received trap.

SUMMARY OF THE INVENTION

In one embodiment, the present invention is of a method of managing a plurality of networked manageable devices which include at least one file server having a system board, a drive array subsystem associated with the file server and a server manager installed in the file server for monitoring the system board from a manager console using a management information base or "MIB". First, second and third plurality of objects which describe the system board, the drive array subsystem and the server manager, respectively, are collected and assembled into a MIB. The assembled MIB is then used to manage the file server. In further aspects of this embodiment of the invention, the collected plurality of objects are organized into a first subMIB containing selected ones of the objects which describe components of the system board, a second subMIB containing selected ones of the plurality of objects which describe those components specific to a manufacturer, a third subMIB containing selected ones of the objects which describe a drive array subsystem associated with the file server and a fourth subMIB containing selected ones of the objects which describe a server manager installed on the system board. Various ones of the subMIBs may be further organized to contain a first child group which contains selected ones of the plurality of objects which describe a revision level of a software management agent installed on the system board, drive array subsystem or server manager, respectively, a second child group containing selected ones of the plurality of objects which describe components of the system board, drive array subsystem, or server manager, respectively, and a third child group containing selected ones of the plurality of objects which describes traps generated by the drive array subsystem or the server manager, respectively.

In further aspects of this embodiment of the invention, the manufacturer specific component child group of the system board may be further organized to include an interface child group which contains selected ones of the plurality of component objects which contain information specific to a software management agent installed in said system board, an asset management child group which contains selected ones of the plurality of component objects which contain asset management information, a security child group which contains selected ones of the plurality of component objects which contain information describing security features specific to the manufacturer and a system board child group which contains selected ones of the plurality of component objects which contain object instances describing the system board.

In still further aspects of this embodiment of the invention, the drive array subsystem component child group may be further organized to include an interface child group which contains selected ones of the plurality of component objects which contain information specific to the drive array subsystem software management agent, a controller child group which contains selected ones of the plurality of component objects which contain information specific to controllers and/or accelerator cards associated with the drive array subsystem, a logical drive child group which contains selected ones of the plurality of component objects which contain information specific to a logical drive associated with the drive array subsystem, a physical drive child group which contains selected ones of the plurality of component objects which contain information specific to a logical drive associated with the drive array subsystem and a spare drive child group which contains selected ones of the plurality of component objects which contain information specific to a spare drive associated with the drive array subsystem.

In still yet further aspects of this embodiment of the invention, the server manager component group may be further organized to include an interface child group containing selected ones of the plurality of component objects which contain information specific to a software management agent installed in the server manager, a controller child group containing selected ones of the plurality of component objects which contain configuration information specific to the server manager, an object child group containing selected ones of the plurality of objects whose values represent objects innately monitored by the server board and objects containing information describing the server board, an asynchronous communication child group containing selected ones of the plurality of objects which contain information reporting the status of asynchronous communication ports installed on the server board and an alert group containing selected ones of the plurality of objects which contain information regarding the off-the-network alerting capabilities of the server manager.

In another embodiment, the present invention is of a management information base (or "MIB") useful for managing a file server having a system board, a drive array subsystem associated with the file server and a server manager installed in the file server for monitoring the system board. The MIB is comprised of a first subMIB containing a plurality of objects describing the system board, a second subMIB containing a plurality of objects describing the drive array subsystem and a third subMIB containing a plurality of objects describing the server manager. The subMIBs may be further comprised of a first child group containing selected ones of the plurality of objects which describe a revision level of the software management agent installed on the system board, drive array subsystem, or server manager, respectively, and a second child group containing selected ones of the plurality of objects which describe the components of the system board, drive array subsystem or server manager, respectively. A third child group containing selected ones of the plurality of objects which describe traps may also be provided for the drive array subsystem or server manager.

In further aspects of this embodiment of the invention, the component child group for the drive array subsystem may be further comprised of a first component child group containing selected ones of the plurality of component objects containing information specific to a software management agent installed in said drive array subsystem, a second child group containing selected ones of the plurality of component objects containing information specific to controllers and/or accelerator cards associated with said drive array subsystem, a third child group which contains selected ones of the plurality of component objects containing information specific to a logical drive associated with the drive array subsystem and a fourth child group which contains selected ones of the plurality of component objects containing information specific to the spare drive associated with the drive array subsystem.

In still further aspects of this embodiment of the invention, the component child group for the server manager may further comprise a first component child group containing selected ones of the plurality of component objects which contain information specific to a software management agent installed in the server manager, a second component child group containing selected ones of the plurality of component objects which contain objects which describe the configuration of the system manager, a third component child group containing selected ones of the plurality of component objects which contain information specific to objects collected by the server manager, a fourth component child group containing selected ones of the plurality of component objects which contain information related to an asynchronous communication port of the server manager, and a fifth child group containing selected ones of the plurality of component objects which contain information related to off-the-network alert capabilities of the server manager.

BRIEF DESCRIPTION OF THE DRAWINGS

The present invention may be better understood, and its numerous objects, features and advantages will become apparent to those skilled in the art by reference to the accompanying drawing, in which:

FIG. 3 is an expanded block diagram of the computer management system of FIG. 2;

FIG. 4B is an inheritance tree illustrating a MIB revision group commonly configured for each subMIB of the enterprise MIB of FIG. 4A;

FIG. 4C is an inheritance tree illustrating a trap history group similarly configured for plural subMIBs of the enterprise MIB of FIG. 4A;

FIGS. 5C-1 through 5C-8 is an inheritance tree illustrating an EISA non-volatile memory child group of the component group of the subMIB of FIG. 5A;

FIG. 7B-1 through 7B-2 is an inheritance tree illustrating an interface child group of a component group of the subMIB of FIG. 7A;

FIG. 7C-1 through 7C-2 is an inheritance tree illustrating a controller child group of the component group of the subMIB of FIG. 7A;

FIG. 7F is an inheritance tree illustrating a physical drive child group of the component group of the subMIB of FIG. 7A;

FIG. 8C is an inheritance tree illustrating a controller child group of the component group of the subMIB of FIG. 8A;

FIG. 8D-1 through 8D-2 is an inheritance tree illustrating an object data child group of the component group of the subMIB of FIG. 8A;

DETAILED DESCRIPTION OF A PREFERRED EMBODIMENT

Figure 2:
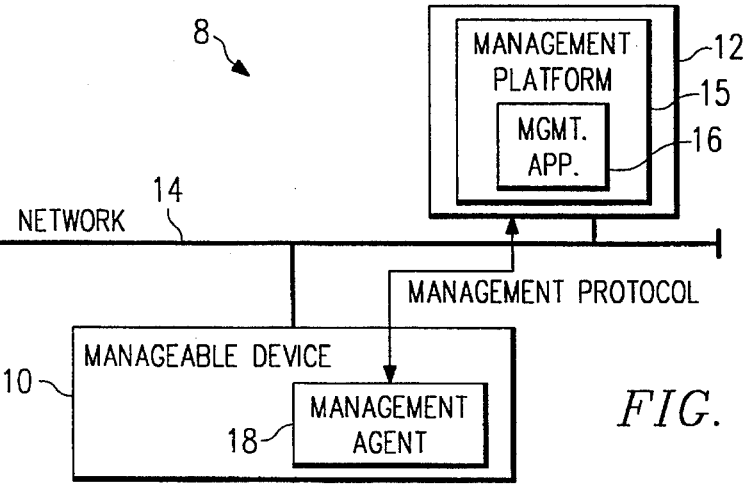
FIG. 2 is a block diagram illustrating a computer management system and associated MIB constructed in accordance with the teachings of the present invention.

Referring first to FIG. 2, and in accordance with the teachings of the present invention, a computer management system which uses a combination of "management" or "instrumentation" agents and an enterprise MIB to manage a manageable device or devices from a management console shall now be described in greater detail. The management system 8 includes at least one manageable device 10 to be managed at a manager station or console 12. Preferably, the manager console 12 should be a computer system having a 386 CPU, 6 Mbyte RAM, 30 Mbyte ROM, a VGA color or higher resolution graphics controller supported by Microsoft Windows, a network interface card compatible with the NetWare open data link interface (or "ODI"), a Microsoft Windows compatible mouse, a Microsoft Windows compatible printer and Microsoft Windows 3.0 or 3.1.

Although only one manageable device 10 is illustrated in FIG. 2, it is specifically contemplated any number or types of manageable devices 10 may be managed at the manager console 12. The manageable device or devices 10 may include any number or combination of intelligent hardware device capable of supporting a software configured management agent 18 therein for interacting with the management system 8 in a manner to be more fully described below. For example, a bridge for interconnecting similar LAN segments, a router for interconnecting dissimilar LANs, a concentrator connected to data terminal equipment (or "DTE") and a file server or other DTE are all manageable devices which may be managed by the management system. For ease of discussion, however, the remainder of this document will assume that the collection of manageable devices 10 interconnected with the manager console 12 for the management thereof consists of a single file server 10 containing plural manageable devices such as industry-standard architecture components, an EISA bus, an intelligent drive array subsystem and a server manager board. The manageable device 10 and the manager console 12 are interconnected by a network 14 which provides a communications pathway for information to be transferred between the two. For example, an ethernet or token ring type network would be suitable for use as the network 14. Furthermore, the network 14 may be a local area network (or "LAN"), a wide area network (or "WAN"), or, more typically, a collection of interconnected LANs and WANs, also known as an "internet".

Installed at the manager console 12 is shell software having a suitable management platform 15, for example, an application process interface (or "API") for the operation of the management application 16. For example, Microsoft Windows would be a suitable platform 15 from which the management application 16 may be launched. In one embodiment of the invention, the management application 16 may coexist with Netware Management System (or "NMS") software manufactured by Novell, Inc., Openview network manager software manufactured by Hewlett Packard or another third party network management systems. For example, it is specifically contemplated that the management application 16 may be launched from Novell's NetWare Management Map focussed on a selected server. Alternately, the management application 16 may operate independent from the NetWare Management System products if the file server 10 is running NetWare v.3.11 or higher.

Once launched, the management application 16 running on the platform 15 performs specific management tasks by interacting with the management agent 18. The management application 16 and the management agent 18 communicate over the network 14 using management application protocols within the TCP/IP protocol suite, preferably the Simple Network Management Protocol (or "SNMP"). Monitored data will be transferred from the managed device 10 to the management application 18 using the SNMP "get request" operation in which the current value(s) associated with a declared variable (or list of variables) relating to a managed object is requested or "polled" by the management application 16 and the "get-next-request" in which the next value associated with a variable, such as a table, that comprises a list of elements, is requested or "polled" by the management application 16. Asynchronous traps, for example, alerts and other fault conditions will be immediately transported from the managed device 10 to the management application 18 using the "trap" operation where a network administrator physically located at the manager console 12 would be notified, either audibly or visually, of the existence of, information regarding the cause of, and possible solutions to, the alert.

In this manner, the management agent 18 collects management information about the file server 10 or other manageable devices and provides that information, which is generally referred to as a management information base (or "MIB") to a network administrator physically located at the manager console 12. The management information provided to the network administrator can be used to monitor the performance of the file server 10 and to respond to alerts as they occur. In this manner, the network administrator can perform "on the network" management" management of the file server 10 or other manageable device. Other functions which can be performed by the network administrator using the management information include security management, fault analysis and configuration management.

Referring next to FIG. 3, the computer management system 8 will now be described in greater detail. As may now be seen, the file server 10 is now designated as a NetWare server, thereby indicating that the managed server 10 is running NetWare v3.11 or greater. Installed on the netware server 10 is an SNMP agent 28 for transporting data from a managed device or devices to the management application 16. The SNMP agent 28 is a collection of software capable of querying manageable devices and providing information to the management application 16 using operations defined as part of the SNMP protocol. Manageable devices such as ISA CMOS 20, the battery backed up RAM in the real time clock installed in the system board, EISA NVRAM 22, the battery backed up non-volatile memory containing the EISA configuration of the file server 10, server manager board 24, a management device which contains configuration and real time monitored information on the file server 10, and intelligent drive array controller 26, which contains configuration, real time monitor and performance array on the intelligent drive array 26, are instrumented for interfacing with the SNMP agent 28 using base system instrumentation agent 30, server manager instrumentation agent 32 and drive array instrumentation agent 34, respectively. Instrumentation agents 30, 32 and 34 are NetWare loadable modules (or "NLMs") used so that the information regarding the managed device can be transferred to the application 16. As will be more fully discussed below, these instrumentation agents for the managed devices support separate subMIBs for the managed devices, thereby permitting the organization of managed information described herein.

More specifically, the base system instrumentation agent 30 is NLM software connected to provide industry-standard architectural information about the system configuration. This information includes product and model information, processor type, diskette type, hard drive type, EISA board configuration, system ROM version, installed memory, video subsystem and serial and parallel port configurations. It may also provide product ID, serial number and security configuration.

The disk drive array instrumentation agent 32 is NLM software for managing the drive array controller 26. Again using SNMP, the drive array instrumentation agent 34 will gather information including controller configuration, Compaq 4-MB array accelerator write cache configuration and status, if installed, logical drive configuration and status, physical drive configuration and status and spare drive configuration and status.

Finally, the server manager instrumentation agent 32 is NLM software used to manage a server manager 24 and is necessary only if the file server 10 has a server manager board installed therein. A server manager board innately monitors and process objects indicative of computer system performance and actual and/or potential computer systems failures, determines alert conditions based upon the innately monitored and processed objects, reports alert conditions in either an in-band or out-of band mode and provides for corrective action to be taken from a remote location. The exact configuration of a server manager board is disclosed at length in the copending U.S. patent applications Ser. No. 07/720,259, filed Jun. 24, 1991, issued Nov. 22, 1994 as U.S. Pat. No. 5,367,670, entitled "Computer System Manager" and previously incorporated by reference. The information gathered by the server manager instrumentation agent 32 includes server manager board configuration information and monitored item information maintained on the server manager board.

From the SNMP agent, information which forms part of the MIB may be transported over the network 14 using the IPX or IP protocol stack to the manager console 12 where Novell SNMP DDE server software 36 is installed so that the management data can be received at or transmitted from the manager console. The manager console 12 is further provided with a Btreive database 38 where object information from the MIB gathered over time by the management application 16 may be stored for later access, either by the management application 16 or another application running on the manager console 12. For example, object information which would be transmitted to the btrieve database 38 for storage would be all alerts transmitted to the management application 16 in the form of traps where they would be assembled as an alert log and information received in response to the polling of monitored items which would be assembled in the btreive database 38 in a manner which would enable trend analysis and reporting.

Figure 4A:
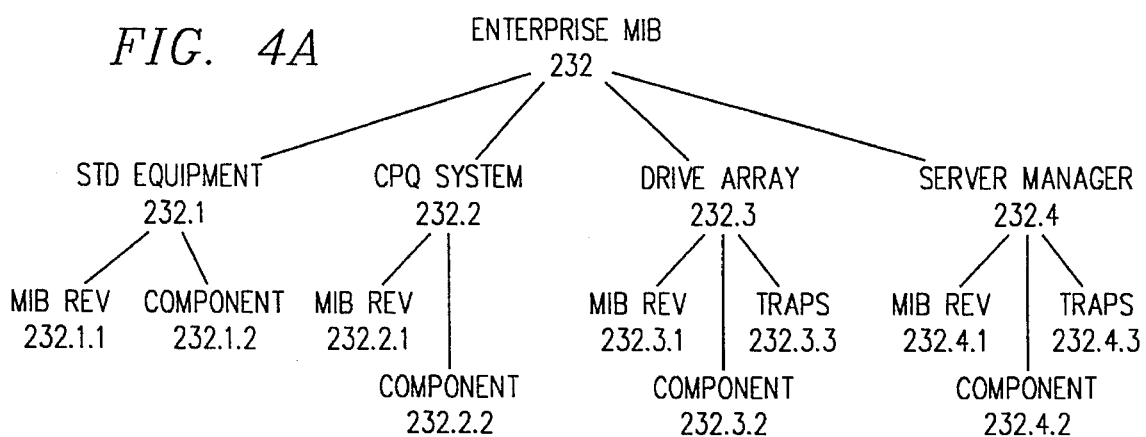
FIG. 4A is a tree illustrating the organization of an enterprise MIB used in conjunction with the computer management system and associated MIB of FIGS. 2 and 3.

Referring next to FIG. 4A, an enterprise MIB 232 subject of the present invention and located at branch 1..4.6.1.4.232 of the CCITT/ISO organization framework for data illustrated in FIG. 1 will now be described in greater detail. The enterprise MIB 232 defines the set of all manageable object instances and traps known to the agent, instrumentation agent and the user interface application included as part of the computer management system of FIGS. 2–3. The management application 16 uses the enterprise MIB 232's definition of object instances and traps to manage the manageable devices 10. The variables identified will be read by the management application 16 and be graphically displayed at the workstation 12. The asynchronous traps generated by the SNMP agent supported by the instrumentation will be collected and displayed by the application 16.

The enterprise MIB 232 is organized to include a number of subMIBs, each describing a component in a managed server. The subMIBS include a standard equipment subMIB located at branch 232.1, a manufacturer specific system subMIB located at branch 232.2, a drive array subMIB located at branch 232.3 and a server manager subMIB located at branch 232.4. Each subMIB 232.1, 232.2, 232.3, and 232.4 includes a mibRev childgroup located at branch 232.1.1, 232.2.1, 232.3.1 and 232.4.1, respectively, and a component child group located at branch 232.1.2, 232.2.2, 232.3.2 and 232.4.2, respectively. The drive array subMIB and the server manager subMIB also include a traps child group located at branch 232.3.3 and 232.4.3, respectively. Of these, the mibRev child group for a subMIB contains information about the revision of the enterprise 232 to which the SNMP agent conforms and includes an indication as to that subMIB's last revision, the component child group for a subMIB details all object instances for the components of that subMIB and the traps child group contains a trap log history which will enable the management application 16 to determine alerting events that have occurred within the computer system 8.

Referring next to FIG. 4B, the mibRev child group commonly configured for each subMIB of the enterprise MIB shall now be described in greater detail. Each mibRev child group is located at branch 232.M.1, where M=the subMIB containing that mibRev child group. In this embodiment of the invention, M=(1,2,3,4), thereby indicating that all of the subMIBS are provided with a mibREV child group. Each mibRev child group a major revision object located at branch 232.M.1.1 and a minor revision object located at branch 232.M.1.2. The management application 16 obtains this information from the management agent 18 to determine if they are both using the same definition for the MIB. If the major revision object indicates a revision change, a very significant change in the information supported by the subMIB has occurred and indicates that an upgrade should be made to ensure correct interpretation of data. For example, if the management application 16 and agent 18 for a subMIB are using a MIB definitions having different major revision level, the older of the two should be upgraded. However, if the minor revision object indicates a revision change, the revision should not significantly change the interpretation of data. The formal organization of the mibRev child group is as follows:

```
mibRevMajor     OBJECT-TYPE
    SYNTAX      INTEGER
    ACCESS      read-only
    STATUS      mandatory
    DESCRIPTION
        "The Major Revision level. A change in the
        major revision level represents a major change
        in the architecture of the MIB. A change in
        the major revision level may indicate a
        significant change in the information supported
        and/or the meaning of the supported
        information, correct interpretation of data may
        require a MIB document with the same major
        revision level."
    : := ( mibRev 1 )
mibRevMinor     OBJECT-TYPE
    SYNTAX      INTEGER
    ACCESS      read-only
    STATUS      mandatory
    DESCRIPTION
        "The Minor Revision level. A change in the
        minor revision level may represent some minor
        additional support, no changes to any pre-
        existing information has occurred."
    : := ( mibRev 2 )
```

©1992 Compaq Computer Corporation

Referring next to FIG. 4C, the traps child group, which is similarly configured for the drive array and server manager subMIBs of the enterprise MIB, shall now be described in greater detail. Each traps child group maintains information about the number of traps issued by the corresponding parent subMIB and maintains a table of immediately prior traps issued. In this manner, the management application 16, when accessing the management agent 18, may acquire recent status information regarding the manageable device 10. Each traps child group is located at branch 232.T.3, where T=the subMIB containing a traps child group. In this embodiment of the invention, T=(3,4), thereby indicating that a traps child group is provided for the drive array and server manager subMIBs. Each traps child group includes a trap packets object located at branch 232.T.3.1, a maximum size trap log object located at branch 232.T.3.2 and a trap log table located at branch 232.T.3.3. The trap log table has an entry N located at branch 232.T.3.3.N for each trap issued by the subMIB. For each entry N, the trap log table includes a log index object located at branch 232.T.3.3.N.1, a trap type object located at branch 232.T.3.3.N.2 and a trap time object located at branch 232.T.3.3.N.3. Finally, each subMIB having a traps child group includes a series of trap definitions specific to that subMIB which identifies to the management application 16 the exact type of trap maintained by the trap child group. Further details regarding the traps child group may be found by reference to the formal organizational framework of the traps child group set forth below:

```
trapPkts        OBJECT-TYPE
    SYNTAX      Counter
    ACCESS      read-only
    STATUS      mandatory
    DESCRIPTION
        "The total number of trap packets issued by the
        agent for the Server Manager enterprise since
        the Server Manager SNMP agent was loaded."
    : := ( trap 1 )
trapLogMaxSize  OBJECT-TYPE
    SYNTAX      INTEGER
    ACCESS      read-only
    STATUS      mandatory
    DESCRIPTION
        "The maximum number of entries that will
        currently be kept in the trap log. If the
        maximum size has been reached and a new trap
        occurs the oldest trap will be removed."
    : := ( trap 2 )
trapLog         OBJECT-TYPE
    SYNTAX      SEQUENCE OF TrapLogEntry
    ACCESS      not-accessible
    STATUS      mandatory
    DESCRIPTION
        "An ordered list of trap log entries
        (conceptually a queue). The trap log entries
        will be kept in the order in which they were
        generated with the most recent trap at index 1
        and the oldest trap entry at index
        trapLogMaxSize. If the maximum number size has
        been reached and a new trap occurs the oldest
        trap will be removed when the new trap is added
        so the trapMaxLogSize is not exceeded."
    : := ( trap 3 )
trapLogEntry    OBJECT-TYPE
    SYNTAX      TrapLogEntry
    ACCESS      not-accessible
    STATUS      mandatory
    DESCRIPTION
        "A description of a trap event."
    INDEX       ( trapLogIndex )
    : := ( trapLog 1 )
trapLogEntry    : := SEQUENCE (
    trapLogIndex    INTEGER,
    trapType        INTEGER,
    trapTime        OCTET STRING (SIZE (0 . . . 6))
)
trapLogIndex    OBJECT-TYPE
    SYNTAX      INTEGER
    ACCESS      read-only
    STATUS      mandatory
    DESCRIPTION
        "The value of this object uniquely identifies
        this trapLogEntry at this time. The most
        recent trap will have an index of 1 and the
        oldest trap will have an index of
        trapLogMaxSize. Because of the queue-like
        nature of the trapLog this particular trap
        event's index will change as new traps are
        issued."
    : := ( trapLogEntry 1 )
trapType        OBJECT-TYPE
    SYNTAX      INTEGER
    ACCESS      read-only
    STATUS      mandatory
    DESCRIPTION
        "The type of the trap event that this entry
        describes. This number refers to an entry in
        a list of traps enumerating the possible traps
        the Server Manager agent may issue."
    : := ( trapLogEntry 2 )
trapTime        OBJECT-TYPE
    SYNTAX      OCTET STRING (SIZE (0 . . . 6))
    ACCESS      read-only
    STATUS      mandatory
    DESCRIPTION
        "The time of the trap event that this entry
        describes. The time is given in year (first
        octet), month, day of month, hour, minute,
        second (last octet) order."
    : : (trapLogEntry 3 )
```

©1992 Compaq Computer Corporation

Figure 5A:
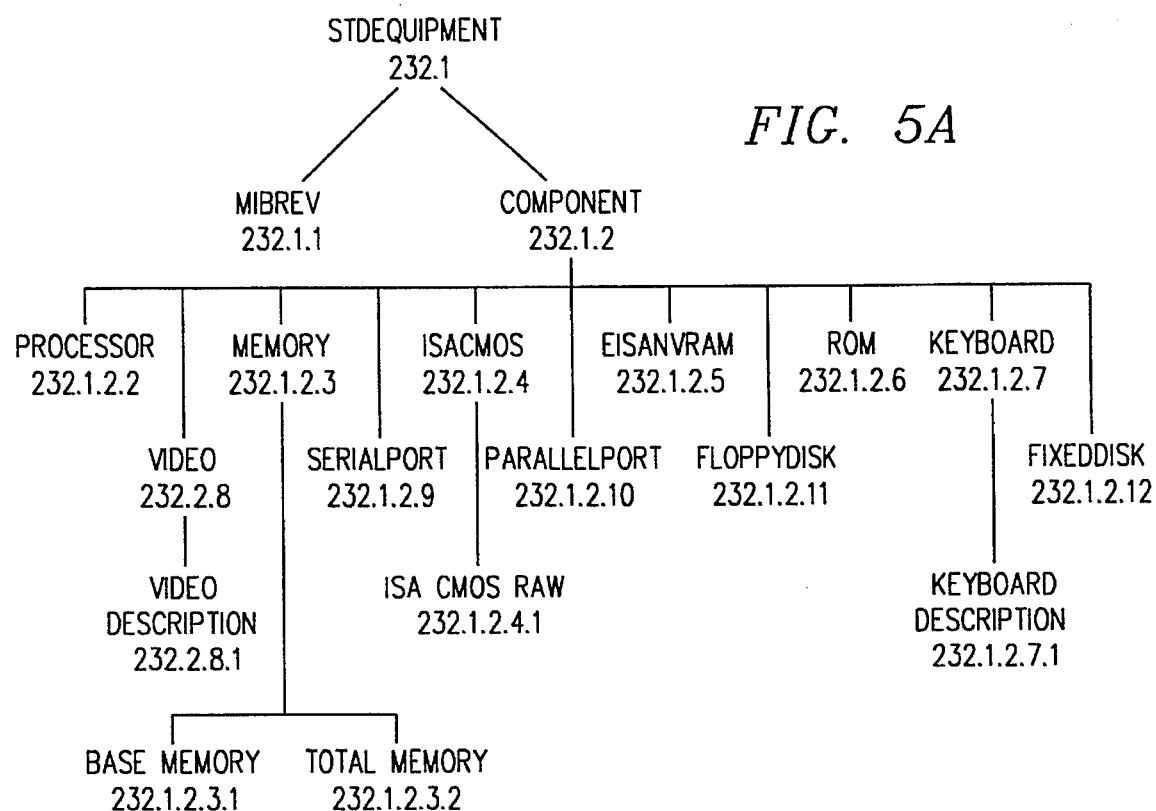
FIG. 5A is an inheritance tree illustrating a first subMIB of the enterprise MIB of FIG. 4A.

Referring next to FIG. 5A, the StdEquipment subMIB located at branch 232.1 will now be described in greater detail. The StdEquipment subMIB consists of data that describes the devices typically found on the system board of the file server 10 being managed. IMPORT statements used in the StdEquipment subMIB are as follows:

| Import | Defined by |
|---|---|
| enterprises | RFC1155SMI |
| DisplayString | RFC1158-MIB |
| OBJECT-TYPE | RFC-1212 |

As previously discussed, the StdEquipment subMIB includes two child groups, the mibRev child group located at branch 232.1.1 and the component child group located at branch 232.1.2. The mibRev child group contains information regarding the revision of the subMIB to which the SNMP agent conforms and is configured as previously described with respect to FIG. 4B and the component child group contains information describing equipment typically found on PC, ISA and EISA architectures. This information is contained in plural child groups of the component group. The component group's child groups are a processor group located at branch 232.1.2.2, a memory group located at branch 232.1.2.3, an ISA CMOS group located at branch 232.1.2.4, an EISA non-volatile memory group located at branch 232.1.2.5, a ROM group located at branch 232.1.2.6, a keyboard group located at branch 232.1.2.7, a video group located at branch 232.1.2.8, a serial port group located at branch 232.1.2.9, a parallel port group located at branch 232.1.2.10, a floppy disk group located at branch 232.1.2.11 and a fixed disk branch located at branch 232.1.2.12.

Figure 5B:
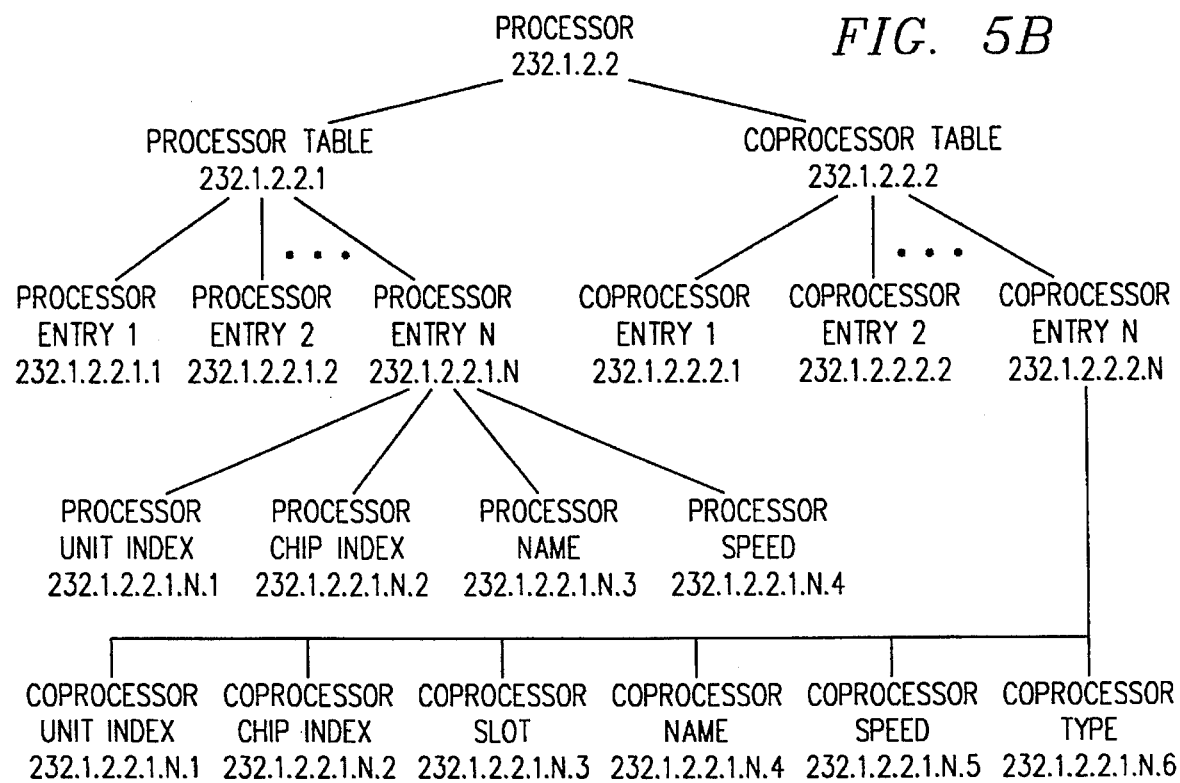
FIG. 5B is an inheritance tree illustrating a processor child group of a component group of the subMIB of FIG. 5A.

Referring next to FIG. 5B, the processor child group located at branch 232.1.2.2 will now be described in greater detail. As is well known to those skilled in the art, a processor is an electronic component that performs general purpose processing which may be used with or without a coprocessor and a coprocessor is a electronic that performs special purpose processing. The processor child group describes the processor and coprocessors in the file server 10 using a plurality of object instances. More specifically, the processor child group describes the processors and coprocessors in the file server 10 using two tables, a processor table located at branch 232.1.2.2.1 and a coprocessor table located at branch 232.1.2.2.2. The processor table includes an entry N located at branch 232.1.2.2.1.N for each of N processors in the system. Similarly, the coprocessor table includes an entry N located at branch 232.1.2.2.2.N for each of N coprocessors in the system. Each entry, whether in the processor or coprocessor table, provides identification, description and speed information for a particular processor or coprocessor.

Each processor entry 232.1.2.2.1.N contains four objects, a unit index object located at branch 232.1.2.2.1.N.1, a slot object located at branch 232.1.2.2.1.N.2, a name object located at branch 232.1.2.2.1.N.3 and a speed object located at branch 232.1.2.2.1.N.4, each of which is described at greater detail in the formal organization of the processor table set forth below:

```
processorTable       OBJECT-TYPE
    SYNTAX           SEQUENCE OF ProcessorEntry
    ACCESS           not-accessible
    STATUS           mandatory
    DESCRIPTION
        "A list of the processors in the system. The
        main processor (if such a concept is valid for
        this machine) should be the first entry in the
        table."
    : := ( processor 1 )
processorTable       OBJECT-TYPE
    SYNTAX           ProcessorEntry
    ACCESS           not-accessible
    STATUS           mandatory
    DESCRIPTION
        "A description of a processor in the system."
    INDEX            ( processorUnitIndex )
    : := ( processorTable 1 )
ProcessorEntry       : := SEQUENCE (
    processorUnitIndex   INTEGER,
    processorSlot        INTEGER,
    processorName        DisplayString (SIZE(0 . . . 255)),
    processorSpeed       INTEGER
)
processorUnitIndex   OBJECT-TYPE
    SYNTAX           INTEGER
    ACCESS           read-only
    STATUS           mandatory
    DESCRIPTION
        "This is a number that uniquely specifies a
        processor unit. A processing unit may be a set
        of processing chips that are on the same board
        or for other reasons work together as a unit.
processorSlot        OBJECT-TYPE
    SYNTAX           INTEGER
    ACCESS           read-only
    STATUS           mandatory
    DESCRIPTION
        "This value represents the slot that this
        processor is in. If the slot cannot be
        determined the value of zero will be returned."
    : := ( processorEntry 2 )
processorName        OBJECT-TYPE
    SYNTAX           DisplayString (SIZE (0 . . . 255)
    ACCESS           read-only
    STATUS           mandatory
    DESCRIPTION
        "This is a string that gives the name of
        the processor described in this entry.
        For example: 80386"
    : := ( processorEntry 3 )
processorSpeed       OBJECT-TYPE
    SYNTAX           INTEGER
    ACCESS           read-only
    STATUS           mandatory
    DESCRIPTION
        "This is speed in megahertz of the
        processor described in this entry. Zero
        will be entered if this value is not
        available."
    : := ( processorEntry 4 )
```

©1992 Compaq Computer Corporation

The coprocessor table, on the other hand, contains six objects, a unit index object located at branch 232.2.2.2.N.1, a chip index object located at branch 232.2.2.2.N.2, a slot object located at branch 232.2.2.2.N.3, a name object located at branch 232.2.2.2.N.4, a speed object located at branch 232.2.2.2.N.5 and a type object located at branch 232.2.2.2.N.6, each of which is described at greater detail in the formal organization of the coprocessor table set forth below:

```
coprocessorTable     OBJECT-TYPE
    SYNTAX           SEQUENCE OF CoprocessorEntry
    ACCESS           not-accessible
    STATUS           mandatory
    DESCRIPTION
        "A list of the coprocessors in the system."
    : := ( processor 2 )
```

-continued

```
coprocessorEntry     OBJECT-TYPE
    SYNTAX           CoprocessorEntry
    ACCESS           non-accessible
    STATUS           mandatory
    DESCRIPTION
        "A description of a coprocessor in the system.
        The coprocessorUnitIndex of any entry in this
        table will equal the processorUnitIndex of the
        corresponding processor in the processor
        table."
    INDEX            ( coprocessorUnitIndex,
                       coprocessorChipIndex )
    : := ( coprocessorTable 1 )
CoprocessorEntry     : :=SEQUENCE (
    coprocessorUnitIndex    INTEGER,
    coprocessorChipIndex    INTEGER,
    coprocessorSlot         INTEGER,
    coprocessorName         DisplayString
                            (SIZE 0 . . . 255)),
    coprocessorSpeed        INTEGER,
    coprocessorType         INTEGER
)
coprocessorUnitIndex  OBJECT-TYPE
    SYNTAX           INTEGER
    ACCESS           read-only
    STATUS           mandatory
    DESCRIPTION
        "This is a number that uniquely specifies a
        processor unit. A processing unit may be a set
        of processing chips that are on the same board
        for other reasons work together as a unit. The
        main processor unit (if there is one) will
        always have the lowest (first) index. this
        field can be used to associate processors with
        their corresponding coprocessors."
    : := ( coprocessorEntry 1 )
coprocessorChipIndex  OBJECT-TYPE
    SYNTAX           INTEGER
    ACCESS           read-only
    STATUS           mandatory
    DESCRIPTION
        "This is a number that uniquely specifies the
        processor chip. A processor chip is one
        specific processor that may or may not work
        with other processor chips in a processor unit.
        This field is used to distinguish between
        multiple coprocessors that are part of the same
        processor unit. For example, If a processor
        board contained a Intel 80386 processor with
        both a Intel 80387 and a Weitek 3167, both the
        80387 and the 3167 would have the same
        coprocessorUnitIndex (which would match the
        80386's different coprocessorChipIndex field
        values."
    : := ( coprocessorEntry 2 )
coprocessorSlot      OBJECT-TYPE
    SYNTAX           INTEGER
    ACCESS           read-only
    STATUS           mandatory
    DESCRIPTION
        "This value represents the slot that this
        coprocessor is in. If the slot cannot be
        determined the value of zero will be returned."
    : := ( coprocessorEntry 3 )
coprocessorName      OBJECT-TYPE
    SYNTAX           DisplayString (SIZE (0 . . . 255)
    ACCESS           read-only
    STATUS           mandatory
    DESCRIPTION
        "This is a string that gives the name of the
        processor described in this entry.
        For example:
        80387
        Weitek 3167"
    : := ( coprocessorEntry 4 )
coprocessorSpeed     OBJECT-TYPE
    SYNTAX           INTEGER
    ACCESS           read-only
    STATUS           mandatory
```

-continued

```
    DESCRIPTION
        "This is speed in megahertz of the processor
        described in this entry. Zero will be returned
        if this value is not available."
    : := ( coprocessorEntry 5 )
coprocessorType      OBJECT-TYPE
    SYNTAX           INTEGER (
                         other(1),
                         embedded(2),
                         external(3)
                     )
    ACCESS           read-only
    STATUS           mandatory
    DESCRIPTION
        "This value indicates if the coprocessor this
        entry is describing is embedded in the
        processor or external to the processor chip."
    : := ( coprocessorEntry 6 )
```

©1992 Compaq Computer Corporation

Returning momentarily to FIG. 5B, the memory child group located at branch 232.1.2.3 and ISA CMOS child group located at branch 232.1.2.4, respectively of the Std-Equipment subMIB will now be described in greater detail. The memory child contains a base memory object located at branch 232.1.2.3.1 and a total memory object located at branch 232.1.2.3.2 that describe the amount of base and total memory, respectively, installed on the file server 10. The formal organization of the memory child group is as follows:

```
baseMemory           OBJECT-TYPE
    SYNTAX           INTEGER
    ACCESS           read-only
    STATUS           mandatory
    DESCRIPTION
        "The amount of base memory in kilobytes. A
        kilobyte is 1024 bytes."
    : := ( memory 1 )
totalMemory          OBJECT-TYPE
    SYNTAX           INTEGER
    ACCESS           read-only
    STATUS           mandatory
    DESCRIPTION
        "The total amount of memory in kilobytes. A
        kilobyte is 1024 bytes"
    : := ( memory 2 )
```

©1992 Compaq Computer Corporation

The ISA CMOS group provides raw data regarding the CMOS variables common among industry standard PCs, including the ISA CMOS real time clock, security, and configuration which is interpretable by the manager application 16. More specifically, the ISA CMOS group contains a raw data object located at branch 232.1.2.4.1 configured as a continuous 64 byte octet string and formally organized in accordance with the following:

```
isaCmosRaw           OBJECT-TYPE
    SYNTAX           OCTET STRING (SIZE (0 . . . 64))
    ACCESS           read-only
    STATUS           mandatory
    DESCRIPTION
        "The contents of the ISA CMOS."
    : := ( isaCmos 1 )
```

©1992 Compaq Computer Corporation

Referring next to FIGS. 5C1-8, the EISA non-volatile memory (or "NVRAM") child group located at branch 232.1.2.5 will now be described in greater detail. The EISA NVRAM child group contains a set of tables that detail, by slot and function, the configuration information stored in an EISA bus architecture. The EISA NVRAM child group includes an EISA slot table located at branch 232.1.2.5.1, an EISA function table located at branch 232.1.2.5.2, an EISA memory table located at branch 232.1.2.5.3, an EISA interrupt table located at branch 232.1.2.5.4, an EISA data memory access (or "DMA") table located at branch 232.1.2.5.5, an EISA port table located at branch 232.1.2.5.6, an EISA free form table located at branch 232.1.2.5.7 and EISA initialization table located at branch 232.1.2.5.8.

The EISA slot table located at branch 232.1.2.5.1 contains an entry N located at branch 232.1.2.5.1.N for each configured card installed in the system. For each entry N, the EISA slot table contains a slot index object located at branch 232.1.2.5.1.N.1, a raw object located at branch 232.1.2.5.1.N.2, a board ID object located at branch 232.1.2.5.1.N.3, a board name object located at branch 232.1.2.5.1.N.4 and an EISA configuration utility revision level object located at branch 232.1.2.5.1.N.5.

The formal organization of the EISA slot table located at branch 232.1.2.5.1 is as follows:

```
eisaSlotTable   OBJECT-TYPE
    SYNTAX      SEQUENCE OF EisaSlotEntry
    ACCESS      not-accessible
    STATUS      mandatory
    DESCRIPTION
        "A list of EISA slot information entries."
    ::= ( eisaNvram 1 )

eisaSlotEntry   OBJECT-TYPE
    SYNTAX      EisaSlotEntry
    ACCESS      not-accessible
    STATUS      mandatory
    DESCRIPTION
        "A description of an EISA slot."
```

```
        INDEX       ( eisaSlotIndex )
        ::= ( eisaSlotTable 1 )

eisaSlotEntry   ::= SEQUENCE (
    eisaSlotIndex       INTEGER,
    eisaSlotRaw         OCTET STRING (SIZE (0..12)),
    eisaSlotBoardId     DisplayString (SIZE (0..7)),
    eisaSlotBoardName   DisplayString (SIZE (0..255)),
    eisaSlotCfUtilityRevDisplayString (SIZE (0..5))
)

eisaSlotIndex   OBJECT-TYPE
    SYNTAX      INTEGER
    ACCESS      read-only
    STATUS      mandatory
    DESCRIPTION
        "The EISA slot number for this entry
        describes."
    ::= ( eisaSlotEntry 1 )

eisaSlotRaw     OBJECT-TYPE
    SYNTAX      OCTET STRING (SIZE 0...12))
    ACCESS      read-only
    STATUS      mandatory
    DESCRIPTION
        The EISA slot data for the board in this slot.

This octet string is actually the set of
        register values returned by the get EISA slot
        information call in the following order:

AH, AL, BH, BL, CH, CL, DH, DL, DI (lsb), DI
        (msb), SI (lsb), SI (msb)

AH is the return code for the call and should
        be 0, any other value would indicate an error
        or an empty slot.

AL contains several bit flags about the product
        ID and slot type.

Bit 7:   0 = No duplicate ID
                             1 = Duplicate IDs
                    Bit 6:   0 = Product ID readable
                             1 = Product ID not readable
```

```
      Bit 5, 4: 00 = Expansion slot
                01 = Embedded device
                10 = Virtual device
                11 = Reserved
      Bit 3..0: This nibble indicates which CFG
                file is loaded when duplicate
                file names are present.
                0000 = No duplicate ID
                0001 = First duplicate ID
                0010 = Second duplicate ID
                0011 = Third duplicate ID
                  .
                  .
                  .
                1111 = Fifteenth duplicate ID
NOTE:     Bit 7 is the most significant bit,
          Bit 0 is the least significant.
```

BH contains the major revision level of the configuration utility.

BL contains the minor revision level of the configuration utility.

CH contains the most significant byte of the configuration file checksum.

CL contains the least significant byte of the configuration file checksum.

DH contains the number of device functions.

DL contains the combined function information:
```
      Bit 7:    reserved (0)
      Bit 6:    reserved (0)
```

Bit 5: slot has one or more port initialization entries.
Bit 4: slot has one or more port range entries.
Bit 3: slot has one or more DMA entries.
Bit 2: slot has one or more interrupt (IRQ) entries.
Bit 1: slot has one or more memory entries.
Bit 0: slot has one or more function type definitions.

NOTE: Bit 7 is the most significant bit, bit 0 is the least significant.

DI and SI contain the four byte compressed ID
DI (lsb) = Byte 0
DI (msb) = Byte 1
SI (lsb) = Byte 2
SI (msb) = Byte 3

For more information about the meaning of this information consult the EISA Technical Reference Guide.
"

::= ( eisaSlotEntry 2 )

eisaSlotBoardId    OBJECT-TYPE
    SYNTAX    DisplayString (SIZE (0..0))
    ACCESS    read-only
    STATUS    mandatory
    DESCRIPTION
        "A seven character board ID. The first three characters are the manufacturers ID followed by three character product ID followed by a one character revision level."
    ::= ( eisaSlotEntry 3 )

eisaSlotBoardName    OBJECT-TYPE
    SYNTAX    DisplayString (SIZE (0..255))
    ACCESS    read-only
    STATUS    mandatory
    DESCRIPTION "The product name (or other suitable description) of the board described in this entry. This field may be empty if no descriptive information is known about the board."
::= ( eisaSlotEntry 4 )

```
eisaSlotCfUtilityRev    OBJECT-TYPE
    SYNTAX    DisplayString (SIZE (0..5))
    ACCESS    read-only
    STATUS    mandatory
    DESCRIPTION
```
"The revision level of the EISA configuration utility that was used to configure the system. This should be the same version information displayed by the EISA configuration utility."
::= ( eisaSlotEntry 5 )

©1992 Compaq Computer Corporation

Continuing to refer to FIGS. 5C1-8, and, in particular, to FIG. 5C-2, the EISA function table will now be described in greater detail. The EISA function table located at branch 232.1.2.5.2 contains an entry N located at branch 232.1.2.5.2.N for each function performed by a configured card. For each entry N, the function table contains a slot index object located at branch 232.1.2.5.2.N.1, a function index object located at branch 232.1.2.5.2.N.2, a status object located at branch 232.1.2.5.2.N.3, a type object located at branch 232.1.2.5.2.N.4, an EISA configuration revision level object located at branch 232.1.2.5.2.N.5 and a selection object located at branch 232.1.2.5.2.N.6. The formal organization of the EISA function table is as follows:

```
eisaFunctionTable    OBJECT-TYPE
    SYNTAX    SEQUENCE OF EisaFunctionEntry
    ACCESS    not-accessible
    STATUS    mandatory
    DESCRIPTION
```

```
            "A list EISA function information entries."
    ::= ( eisaNvram 2 )

eisaFunctionEntry    OBJECT-TYPE
    SYNTAX    EisaFunctionEntry
    ACCESS    not-accessible
    STATUS    mandatory
    DESCRIPTION
        "A description of an EISA function."
    INDEX    (eisaFunctionSlotIndex, eisaFunctionIndex)
    ::= ( eisaFunctionTable 1 )

eisaFunctionEntry    ::=SEQUENCE (
    eisaFunctionSlotIndex    INTEGER,
    eisaFunctionIndex        INTEGER,
    eisaFunctionStatus       INTEGER,
    eisaFunctionType         DisplayString (SIZE
                                        (0..80)),
    eisaFunctionFileRev      DisplayString (SIZE
                                        (0..5)),
    eisaFunctionSelections   OCTET STRING (SIZE (0..26))
)

eisaFunctionSlotIndex    OBJECT-TYPE
    SYNTAX    INTEGER
    ACCESS    read-only
    STATUS    mandatory
    DESCRIPTION
        "The EISA slot number of the board that
        registered the function this entry describes."
    ::= ( eisaFunctionEntry 1 )

eisaFunctionIndex    OBJECT-TYPE
    SYNTAX    INTEGER
    ACCESS    read-only
    STATUS    mandatory
    DESCRIPTION
        "The number of the function this entry
        describes."
    ::= ( eisaFunctionEntry 2)

eisaFunctionStatus    OBJECT-TYPE
    SYNTAX    INTEGER (
        disabled (2),
        enabled (3)
```

```
            )
    ACCESS      read-only
    STATUS      mandatory
    DESCRIPTION
        "The status of the function described by this
        entry."
    ::= ( eisaFunctionEntry 3 )

eisaFunctionType    OBJECT-TYPE
    SYNTAX      DisplayString (SIZE (0..80))
    ACCESS      read-only
    STATUS      mandatory
    DESCRIPTION
        "The type of the function.  The type may be
        followed by one or more subtype description
        fields.  Some currently defined types are:

Type                    Meaning
        ------------------      ------------------------
        COM                     Communication device
        COM, ASY                ISA compatible 8250 based
                                serial port
        COM, ASY, FIFO          ISA compatible 16550 based
                                serial port (with fifo)
        COM, SYN                ISA compatible SDLC port
        CPU                     Microprocessor
        CPU, 8086               8 0 8 6   c o m p a t i b l e
                                microprocessor
        CPU, 80286              8 0 2 8 6   c o m p a t i b l e
                                microprocessor
        CPU, 80386SX            8 0 3 8 6 S X   c o m p a t i b l e
                                microprocessor
        CPU, 80386              8 0 3 8 6   c o m p a t i b l e
                                microprocessor
        CPU, 80486              8 0 4 8 6   c o m p a t i b l e
                                microprocessor
        JOY                     ISA  compatible  joystick
                                adapter
        KEY                     Keyboard
        KEY, nnn, KBD=xx        Standard Keyboard with nnn
                                keys for country xx
        MEM                     Memory board
        MFC                     Multifunction board
        MSD                     Mass storage device
```

| | |
|---|---|
| MSD, DSKCTL | ISA compatible fixed disk controller |
| MSD, FPYCTL | ISA compatible floppy disk controller |
| MSD, TAPCTL | Primary tape controller |
| NET | Network board |
| NPX | Numeric coprocessor |
| NPX, 287 | Intel 287 numeric coprocessor |
| NPX, 387 | Intel 387 numeric coprocessor |
| NPX, 387SX | Intel 387SX numeric coprocessor |
| NPX, W1167 | Weitek 1167 numeric coprocessor |
| NPX, W3167 | Weitek 3167 numeric coprocessor |
| OSE | Operating system/environment |
| OTH | Other |
| PAR | ISA compatible parallel port |
| PAR, BID | Bidirectional parallel port |
| PTR | Pointing device |
| PTR, 8042 | 8042 pointing device (mouse) interface |
| SYS | System board |
| VID | Video board |
| VID, MDA | ISA compatible monochrome adapter |
| VID, MDA, MGA | Hercules monochrome adapter |
| VID, CGA | CGA, no write sync during retrace required |
| VID, CGA, RTR | CGA, write sync during retrace required |
| VID, EGA | ISA compatible EGA adapter |
| VID, VGA | ISA compatible VGA adapter |

This list is not intended to be complete. Other types may be found in this field. This list describes some of the more common types found, other types should be similarly recognizable to someone sufficiently knowledgeable about computer hardware."
::= ( eisaFunctionEntry 4 )

```
eisaFunctionCfgFileRev   OBJECT-TYPE
    SYNTAX    DisplayString (SIZE (0..5))
    ACCESS    read-only
    STATUS    mandatory
    DESCRIPTION
        "The revision of the EISA configuration .CFG
        file used to configure this board."
    ::= ( eisaFunctionEntry 4 )

eisaFunctionSelections   OBJECT-TYPE
    SYNTAX    OCTET STRING (SIZE (0..26))
    ACCESS    read-only
    STATUS    mandatory
    DESCRIPTION
        "The selections that were chosen to create this
        function."
    ::= ( eisaFunctionEntry 6 )
```

©1992 Compaq Computer Corporation

Continuing to refer to FIG. 5C1-8 and, in particular to FIG. 5C-3, the remaining tables included in EISA NVRAM child group will now be described in greater detail. The remaining tables ( the EISA memory table, the EISA interrupt table, the EISA DMA table, the EISA port table, the EISA free form table and the EISA initialization table) detail the resources used by each function of each configured card. More specifically, for each EISA memory configuration installed, the memory table located at branch 232.1.2.5.3 has an entry N which includes a slot index object located at branch 232.1.2.5.3.N.1, a function index object located at branch 232.1.2.5.3.N.2, an allocation index object located at branch 232.1.2.5.3.N.3, an address start object located at branch 232.1.2.5.3.N.4, a size object located at branch 232.1.2.5.3.N.5, a share object located at branch 232.1.2.5.3.N.6, a memory type object located at branch 232.1.2.5.3.N.7, a cache type object located at branch 232.1.2.5.3.N.8, an access object located at branch 232.1.2.5.3.N.9, a decode object located at branch 232.1.2.5.3.N.10 and a data size object located at branch 232.1.2.5.3.N.11. The formal organization of the memory table located at branch 232.1.2.5.3 is as follows:

table located at branch 232.1.2.5.3 is as follows:

```
eisaMemoryTable     OBJECT-TYPE
    SYNTAX    SEQUENCE OF EisaMemoryEntry
    ACCESS    not-accessible
    STATUS    mandatory
    DESCRIPTION
        "A list of EISA function memory configuration
        entries."
    ::= ( eisaNvram 3 )

eisaMemoryEntry     OBJECT-TYPE
    SYNTAX    EisaMemoryEntry
    ACCESS    not-accessible
    STATUS    mandatory
    DESCRIPTION
        "A description of an EISA function memory
        configuration."
    INDEX     ( eisaMemorySlotIndex,
                eisaMemoryFunctionIndex,
                eisaMemoryAllocationIndex )
    ::= ( eisaMemoryTable 1 )

EisaMemoryEntry       ::= SEQUENCE (
    eisaMemorySlotIndex           INTEGER,
    eisaMemoryFunctionIndex       INTEGER,
    eisaMemoryAllocationIndex     INTEGER,
    eisaMemoryStartAddress        INTEGER,
    eisaMemorySize                INTEGER,
    eisaMemoryShare               INTEGER,
    eisaMemoryType                INTEGER,
    eisaMemoryCache               INTEGER,
    eisaMemoryAccess              INTEGER,
    eisaMemoryDecode              INTEGER,
    eisaMemoryDataSize            INTEGER
)

eisaMemorySlotIndex OBJECT-TYPE
```

```
    SYNTAX     INTEGER
    ACCESS     read-only
    STATUS     mandatory
    DESCRIPTION
        "The EISA slot number of the board that
        registered the memory configuration this entry
        describes."
    ::= ( eisaMemoryEntry 1 )

eisaMemoryFunctionIndex   OBJECT-TYPE
    SYNTAX     INTEGER
    ACCESS     read-only
    STATUS     mandatory
    DESCRIPTION
        "The function in which this memory
        configuration was registered."
    ::= ( eisaMemoryEntry 2 )

eisaMemoryAllocationIndex    OBJECT-TYPE
    SYNTAX     INTEGER
    ACCESS     read-only
    STATUS     mandatory
    DESCRIPTION
        "The index for this memory allocation entry in
        the EISA function block."
    ::= ( eisaMemoryEntry 3 )

eisaMemoryStartAddress    OBJECT-TYPE
    SYNTAX     INTEGER
    ACCESS     read-only
    STATUS     mandatory
    DESCRIPTION
        "The starting address of the memory
        configuration."
    ::= ( eisaMemoryEntry 4 )

eisaMemorySize OBJECT-TYPE
    SYNTAX     INTEGER
    ACCESS     read-only
    STATUS     mandatory
    DESCRIPTION
        "The size in bytes of the memory
        configuration."
    ::= ( eisaMemoryEntry 5 )
```

```
eisaMemoryShare     OBJECT-TYPE
    SYNTAX      INTEGER (
                nonshareable(1),
                shareable(2)
                )
    ACCESS      read-only
    STATUS      mandatory
    DESCRIPTION
        "This   value   indicates   if   the   memory   is
        shareable."
    ::= ( eisaMemoryEntry 6 )

eisaMemoryType OBJECT-TYPE
    SYNTAX      INTEGER (
                systemBaseOrExtended(1),
                expanded(2), virtual(3),
                other(4)
                )
    ACCESS      read-only
    STATUS      mandatory
    DESCRIPTION
        "The type of memory."
    ::= ( eisaMemoryEntry 7 )

eisaMemoryCache     OBJECT-TYPE
    SYNTAX      INTEGER (
        notCached(1),
        cached(2)
        )
    ACCESS      read-only
    STATUS      mandatory
    DESCRIPTION
        "The value indicates if the memory is cached.
    ::= ( eisaMemoryEntry 8 )

eisaMemoryAccess    OBJECT-TYPE
    SYNTAX      INTEGER (
        readOnly(1),
        readWrite(2)
        )
    ACCESS      read-only
    STATUS      mandatory
    DESCRIPTION
        "The type of access permitted for this memory."
    ::= ( eisaMemoryEntry 9)
```

```
eisaMemoryDecode    OBJECT-TYPE
    SYNTAX     INTEGER
    ACCESS     read-only
    STATUS     mandatory
    DESCRIPTION
        The memory decode size (the number of address
        lines supported)."
    ::= ( eisaMemoryEntry 10 )

eisaMemoryDataSize  OBJECT-TYPE
    SYNTAX     INTEGER
    ACCESS     read-only
    STATUS     mandatory
    DESCRIPTION
        "The data access size for the memory in bits."
    ::= ( eisaMemoryEntry 11)
```

©1992 Compaq Computer Corporation

Figures 1, 5C:
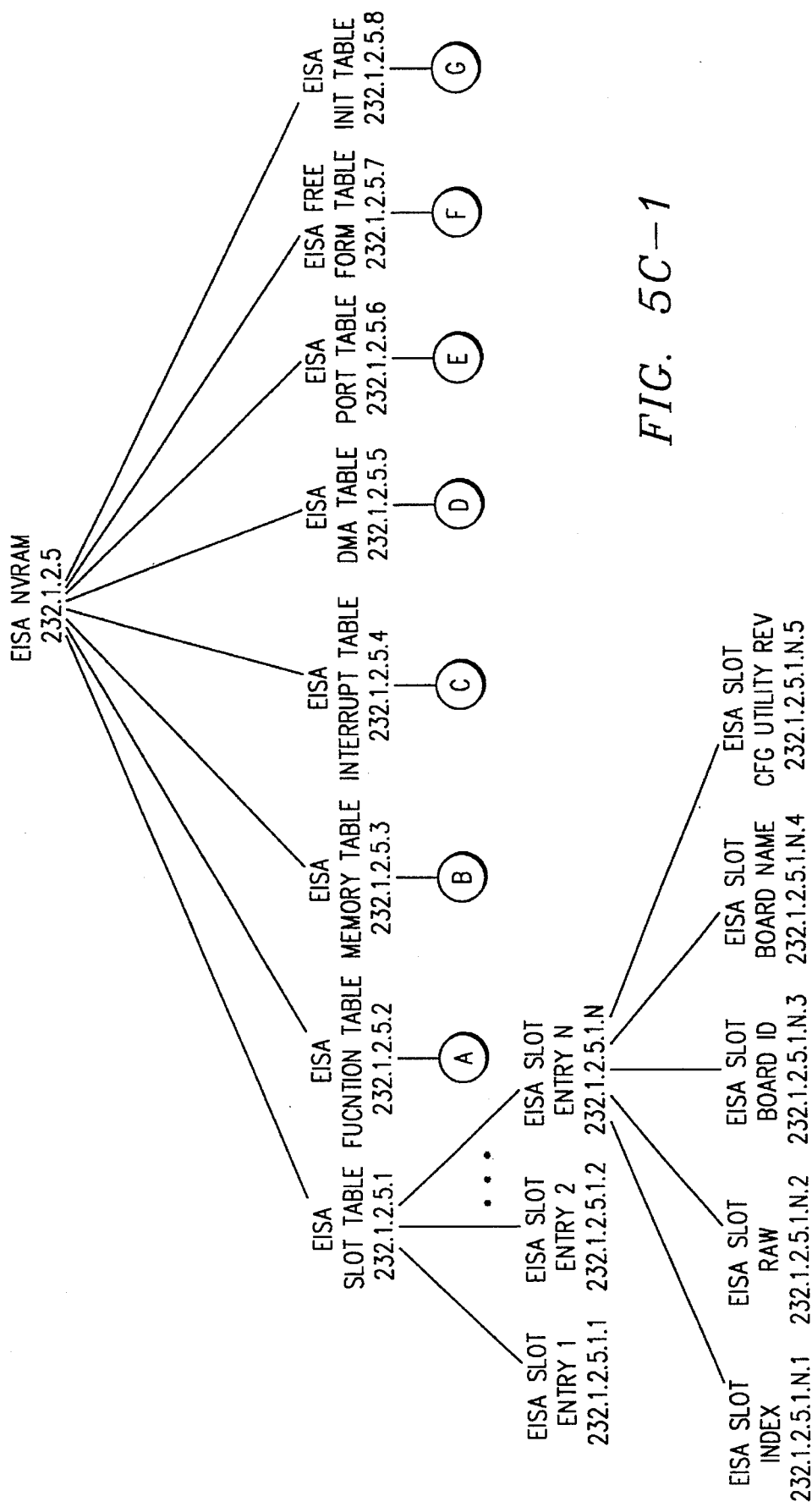
Figures 4, 5C:
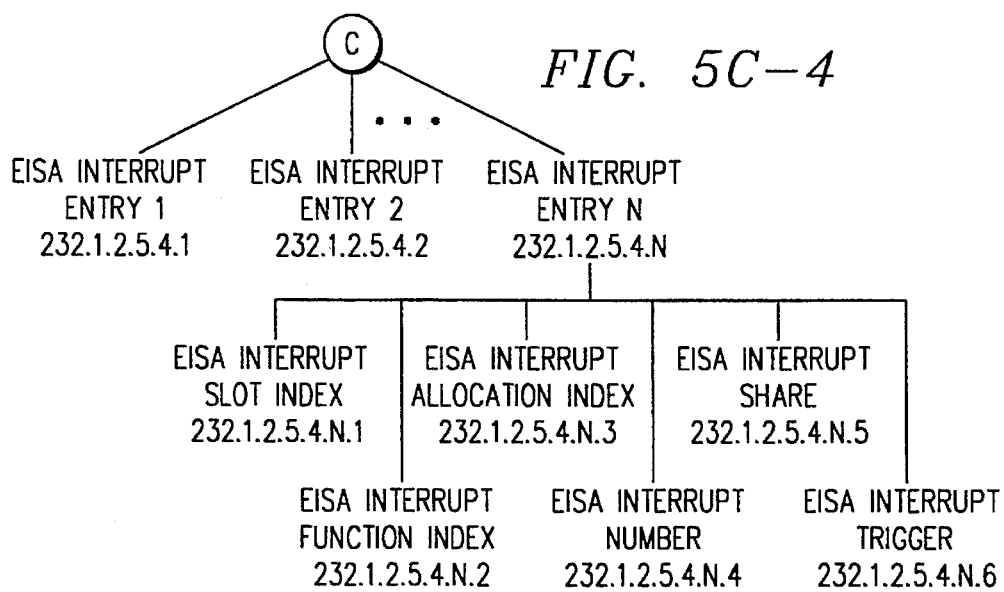

Referring next to FIG. 5C-4, the EISA interrupt table will now be described in greater detail. The EISA interrupt table located at branch 232.1.2.5.4 includes an entry N for each interrupt configuration N. Each entry N includes a slot index object located at branch 232.1.2.5.4.N.1, a function index object located at branch 232.1.2.5.4.N.2, an allocation index object located at branch 232.1.2.5.4.N.3, a number object located at branch 232.1.2.5.4.N.4, a share object located at branch 232.1.2.5.4.N.5 and a trigger object located at branch 232.1.2.5.4.N.6. Additional information regarding the interrupt table is detailed in the formal organization set forth below:

```
eisaInterruptTable        OBJECT-TYPE
    SYNTAX        SEQUENCE OF EisaInterruptEntry
    ACCESS        not-accessible
    STATUS        mandatory
    DESCRIPTION
        "A list of EISA function interrupt
        configuration entries."
    ::= ( eisaNvram 4 )
eisaInterruptEntry        OBJECT-TYPE
    SYNTAX        EisaInterruptEntry
    ACCESS        not-accessible
    STATUS        mandatory
    DESCRIPTION
        "A description of an EISA function interrupt
        configuration."
    INDEX        ( eisaInterruptSlotIndex,
                   eisaInterruptFunctionIndex,
                   eisaInterruptAllocationIndex )
    ::= ( eisaInterruptTable 1 )
EisaInterruptEntry        ::= SEQUENCE (
    eisaInterruptSlotIndex          INTEGER,
    eisaInterruptFunctionIndex      INTEGER,
    eisaInterruptAllocationIndex    INTEGER,
    eisaInterruptNumber             INTEGER,
    eisaInterruptShare              INTEGER,
    eisaInterruptTrigger            INTEGER
eisaInterruptSlotIndex    OBJECT-TYPE
    SYNTAX        INTEGER
    ACCESS        read-only
    STATUS        mandatory
    DESCRIPTION
        "The EISA slot number of the board
        that registered the interrupt
        configuration this entry describes."
    ::= ( eisaInterruptEntry 1 )
eisaInterruptFunction Index    OBJECT-TYPE
    SYNTAX        INTEGER
    ACCESS        read-only
    STATUS        mandatory
    DESCRIPTION
        "The function in which this interrupt
        configuration was registered."
    ::= ( eisaInterruptEntry 2 )
eisaInterruptAllocationIndex    OBJECT-TYPE
    SYNTAX        INTEGER
    ACCESS        read-only
    STATUS        mandatory
    DESCRIPTION
        "The index for this interrupt allocation entry
        in the EISA function block."
    ::= ( eisaInterruptEntry 3 )
eisaInterruptNumber        OBJECT-TYPE
    SYNTAX        INTEGER
    ACCESS        read-only
    STATUS        mandatory
    DESCRIPTION
        "The interrupt described in this entry."
    ::= ( eisaInterruptEntry 4 )
eisaInterruptShare        OBJECT-TYPE
    SYNTAX        INTEGER (
        nonshareable(1),
        shareable(2)
        )
    ACCESS        read-only
```

-continued

```
    STATUS        mandatory
    DESCRIPTION
        "This value indicates if the interrupt is
        shareable."
    ::= ( eisaInterruptEntry 5 )
eisaInterruptTrigger    OBJECT-TYPE
    SYNTAX        INTEGER
        edged(1),
        level(2)
        )
    ACCESS        read-only
    STATUS        mandatory
    DESCRIPTION
        "This value indicates if the interrupt is edge
        or level triggered."
    ::= ( eisaInterruptEntry 6 )
```

©1992 Compaq Computer Corporation

Figures 5, 5C:
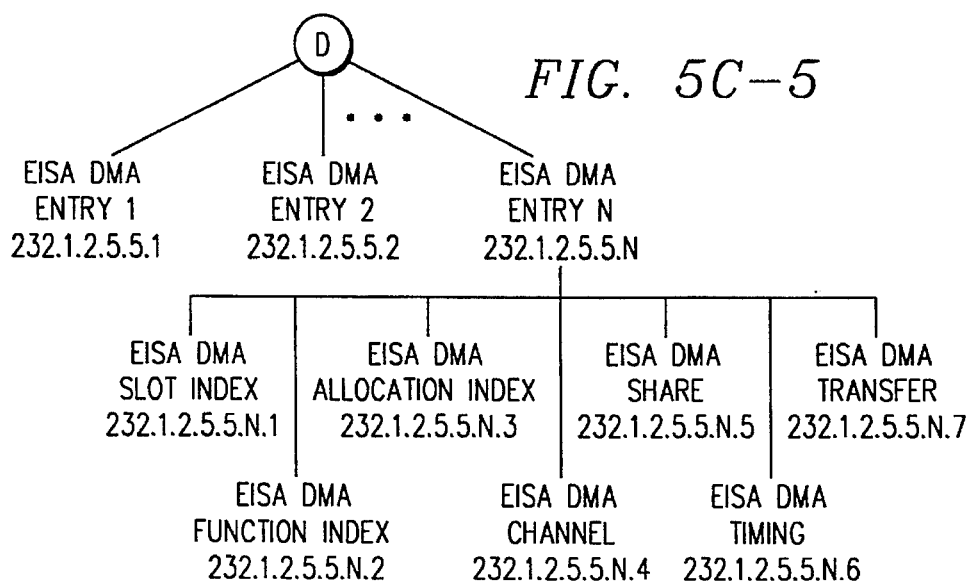

Referring next to FIG. 5C-5, the EISA DMA table will now be described in greater detail. The EISA DMA table includes N entries, each having a slot index object at branch 232.1.2.5.5.N.1, a function index object at branch 232.1.2.5.5.N.2, an allocation index at branch 232.1.2.5.5.N.3, a DMA channel object at branch 232.1.2.5.5.N.4, a share object at branch 232.1.2.5.5.N.5, a timing object at branch 232.1.2.5.5.N.6 and a transfer size object at branch 232.1.2.5.6.N.6. Further details regarding each of the entry objects for the EISA DMA table are as follows:

```
eisaDmaTable        OBJECT-TYPE
    SYNTAX        SEQUENCE OF EisaDmaEntry
    ACCESS        not-accessible
    STATUS        mandatory
    DESCRIPTION
        "A list of EISA function DMA configuration
        entries."
    ::= ( eisaNvram 5 )
eisaDmaEntry        OBJECT-TYPE
    SYNTAX        EisaDmaEntry
    ACCESS        not-accessible
    STATUS        mandatory
    DESCRIPTION
        "A description of an EISA function DMA
        configuration."
    ::= ( eisaDmaTable 1 )
EisaDmaEntry        ::= SEQUENCE (
    eisaDmaSlotIndex          INTEGER,
    eisaDmaFunctionIndex      INTEGER,
    eisaDmaAllocationIndex    INTEGER,
    eisaDmaChannel            INTEGER,
    eisaDmaShare              INTEGER,
    eisaDmaTiming             INTEGER,
    eisaDmaTransferSize       INTEGER
    )
eisaDmaSlotIndex        OBJECT-TYPE
    SYNTAX        INTEGER
    ACCESS        read-only
    STATUS        mandatory
    DESCRIPTION
        "The EISA slot number of the board that
        registered the DMA configuration this entry
        describes."
    ::= ( eisaDmaEntry 1 )
eisaDmaFunctionIndex        OBJECT-TYPE
    SYNTAX        INTEGER
    ACCESS        read-only
    STATUS        mandatory
    DESCRIPTION
        "The function in which this DMA configuration
        was registered."
    ::= ( eisaDmaEntry 2 )
eisaDmaAllocationIndex        OBJECT-TYPE
```

```
                -continued

SYNTAX       INTEGER
    ACCESS       read-only
    STATUS       mandatory
    DESCRIPTION
        "The index for this DMA channel allocation
        entry in the EISA function block."
    ::= ( eisaDmaEntry 3 )
eisaDmaChannelIndex   OBJECT-TYPE
    SYNTAX       INTEGER
    ACCESS       read-only
    STATUS       mandatory
    DESCRIPTION
        "The DMA channel described in this entry."
    ::= ( eisaDmaEntry 4 )
eisaDmaShare         OBJECT-TYPE
    SYNTAX       INTEGER (
        nonshareable(1),
        shareable(2)
        )
    ACCESS       read-only
    STATUS       mandatory
    DESCRIPTION
        "This value indicates if the DMA channel is
        shareable."
    ::= ( eisaDmaEntry 5 )
eisaDmaTiming        OBJECT-TYPE
    SYNTAX       INTEGER (
        eisaTiming(1),
        typeA(2),
        typeB(3),
        burstTypeC(4)
        )
    ACCESS       read-only
    STATUS       mandatory
    DESCRIPTION
        "This value indicates the timing (transfer
        rate) associated with this configuration of the
        DMA channel."
    ::= ( eisaDmaEntry 6 )
eisaDmaTransferSize    OBJECT-TYPE
    SYNTAX       INTEGER
    ACCESS       read-only
    STATUS       mandatory
    DESCRIPTION
        "This value indicates the transfer size in bits
        used over this DMA channel."
    ::= ( eisaDmaEntry 7 )
```

©1992 Compaq Computer Corporation

Figures 5, 5C, 6:
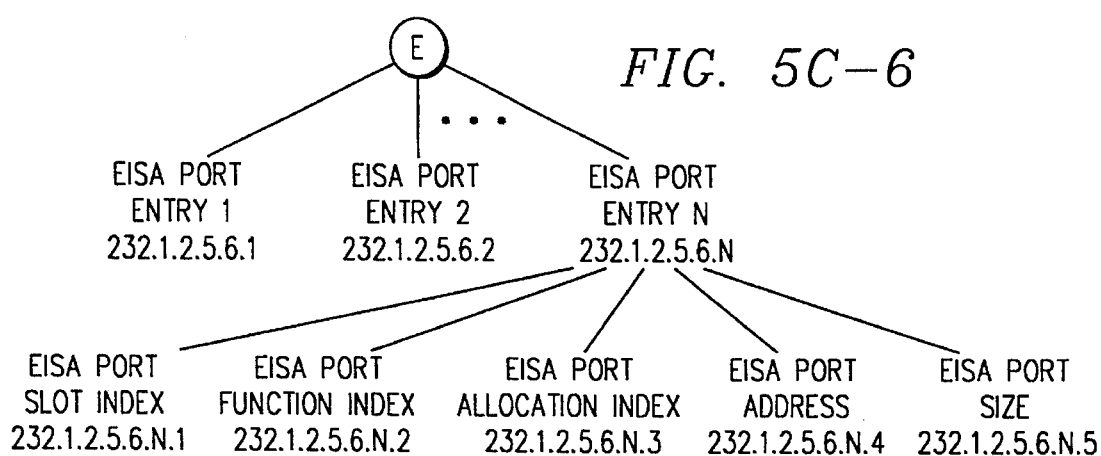
Figures 5, 5C, 6, 7:
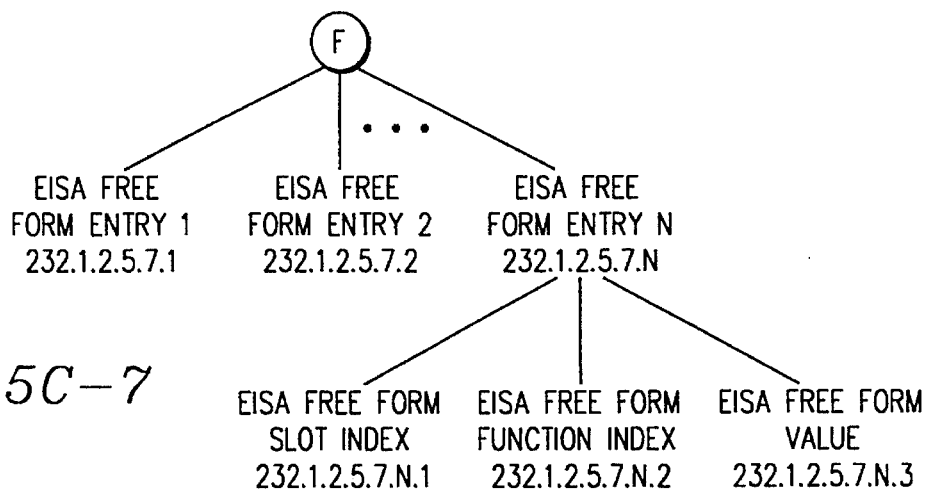
Figures 5, 5C, 6, 7, 8:
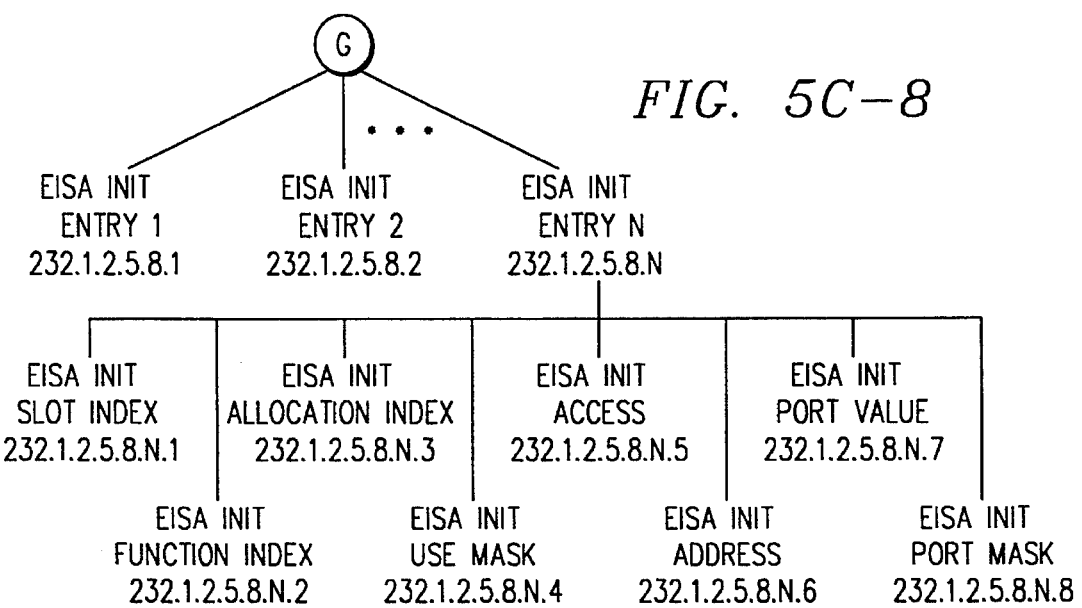

Referring next to FIG. 5C-6, the EISA port table will now be described in greater detail. The EISA port table includes N entries, each having a slot index object at branch 232.1.2.5.6.N.1, a function index object at branch 232.1.2.5.6.N.2, an allocation index at branch 232.1.2.5.6.N.3, an address object at branch 232.1.2.5.6.N.4 and a size object at branch 232.1.2.5.6.N.5. Further details regarding each of the entry objects for the EISA port table are as follows:

```
eisaPortTable       OBJECT-TYPE
    SYNTAX       SEQUENCE OF EisaPortEntry
    ACCESS       not-accessible
    STATUS       mandatory
    DESCRIPTION
        "A list of EISA function port I/O configuration
        entries."
    ::= ( eisaNvram 6 )
eisaPortEntry       OBJECT-TYPE
    SYNTAX       EisaPortEntry
    ACCESS       not-accessible
    STATUS       mandatory
    DESCRIPTION
        "A description of an EISA function Port I/O
        configuration."
```

```
                -continued

INDEX        (eisaPortSlotIndex, eisaPortFunctionIndex,
                  eisaPortAllocationIndex
    ::= ( eisaPortTable 1 )
EisaPortEntry    ::= SEQUENCE (
    eisaPortSlotIndex        INTEGER,
    eisaPortFunctionIndex    INTEGER,
    eisaPortAllocationIndex  INTEGER,
    eisaPortAddress          INTEGER,
    eisaPortShare            INTEGER,
    eisaPortSize             INTEGER
    )
eisaPortSlotIndex     OBJECT-TYPE
    SYNTAX       INTEGER
    ACCESS       read-only
    STATUS       mandatory
    DESCRIPTION
        "The EISA slot number of the board that
        registered the I/O port configuration this
        entry describes."
    ::= ( eisaPortEntry 1 )
eisaPortFunctionIndex    OBJECT-TYPE
    SYNTAX       INTEGER
    ACCESS       read-only
    STATUS       mandatory
    DESCRIPTION
        "The function in which this I/O port range
        configuration was registered."
    ::= ( eisaPortEntry 2 )
eisaPortAllocationIndex    OBJECT-TYPE
    SYNTAX       INTEGER
    ACCESS       read-only
    STATUS       mandatory
    DESCRIPTION
        "The index for this I/O port range allocation
        entry in the EISA function block."
    ::= ( eisaPortEntry 3 )
eisaPortAddress      OBJECT-TYPE
    SYNTAX       INTEGER
    ACCESS       read-only
    STATUS       mandatory
    DESCRIPTION
        "The I/O port address being described in
        this entry."
    ::= ( eisaPortEntry 4 )
eisaPortShare        OBJECT-TYPE
    SYNTAX       INTEGER (
        nonshareable(1),
        shareable(2)
    ACCESS       read-only
    STATUS       mandatory
    DESCRIPTION
        "This value indicates if the Port channel is
        shareable."
    ::= ( eisaPortEntry 5 )
eisaPortSize         OBJECT-TYPE
    SYNTAX       INTEGER
    ACCESS       read-only
    STATUS       mandatory
    DESCRIPTION
        "The number of sequential ports starting at the
        eisaPortAddrIndex that are be configured."
    ::= ( eisaPortEntry 6 )
```

©1992 Compaq Computer Corporation

Referring next to FIG. 5C-7, the EISA free form table will now be described in greater detail. The EISA free form table includes N entries, each having a slot index object at branch 232.1.2.5.7.N.1, a function index object at branch 232.1.2.5.7.N.2, and a value object at branch 232.1.2.5.7.N.3. Further details regarding each of the entry objects for the EISA free form table are as follows:

```
eisaFreeFormTable    OBJECT-TYPE
    SYNTAX       SEQUENCE OF EisaFreeFormEntry
```

-continued

```
    ACCESS         not-accessible
    STATUS         mandatory
    DESCRIPTION
        "A list of EISA function free form entries."
    : := ( eisaNvram 7 )
eisaFreeFormEntry      OBJECT-TYPE
    SYNTAX         EisaFreeFormEntry
    ACCESS         not-accessible
    STATUS         mandatory
    DESCRIPTION
        "A description of an EISA function free form."
    INDEX       ( eisaFreeFormSlotIndex,
                  eisaFreeFormFunctionIndex )
    : := ( eisaFreeFormTable 1 )
EisaPortEntry          : := SEQUENCE (
    eisaFreeFormSlotIndex       INTEGER,
    eisaFreeFormFunctionIndex   INTEGER,
    eisaFreeFormValue           OCTET STRING
                                (SIZE (0 . . . 25))
)
eisaFreeFormSlotIndex    OBJECT-TYPE
    SYNTAX         INTEGER
    ACCESS         read-only
    STATUS         mandatory
    DESCRIPTION
        "The EISA slot number of the board that
        registered the free form information this entry
        describes."
    : := ( eisaFreeFormEntry 1 )
eisaFreeFormFunctionIndex    OBJECT-TYPE
    SYNTAX         INTEGER
    ACCESS         read-only
    STATUS         mandatory
    DESCRIPTION
        "The function in which this free form was
        registered."
    : := ( eisaFreeFormEntry 2 )
eisaFreeFormValue      OBJECT-TYPE
    SYNTAX         OCTET STRING (SIZE (0 . . . 205)
    ACCESS         read-only
    STATUS         mandatory
    DESCRIPTION
        "The free form value."
    : := ( eisaFreeFormEntry 3 )
```

©1992 Compaq Computer Corporation

Referring next to FIG. 5C-8, the EISA initialization table will now be described in greater detail. The EISA initialization table includes N entries, each having a slot index object at branch 232.1.2.5.8.N.1, a function index object at branch 232.1.2.5.8.N.2, an allocation index object at branch 232.1.2.5.8.N.3, a use mask object at branch 232.1.2.5.8.N.4, an access object at branch 232.1.2.5.8.N.5, an address object at branch 232.1.2.5.8.N.6, a port value object at branch 232.1.2.5.8.N.7 and a port mask object at branch 232.1.2.5.8.N.8. Further details regarding each of the entry objects for the EISA initialization table are as follows:

```
eisaInitTable       OBJECT-TYPE
    SYNTAX         SEQUENCE OF EisaInitEntry
    ACCESS         not-accessible
    STATUS         mandatory
    DESCRIPTION
        "A list of EISA function port initialization
        entries."
    : := ( eisaNvram 8 )
eisaInitEntry       OBJECT-TYPE
    SYNTAX         EisaInitEntry
    ACCESS         not-accessible
    STATUS         mandatory
    DESCRIPTION
        "A description of an EISA function port
        initialization."
    INDEX          (eisaInitSlotIndex, eisaInitFunctionIndex,
                    eisaInitAllocationIndex)
    : := ( eisaInitTable 1 )
EisaInitEntry       : := SEQUENCE (
    eisaInitSlotIndex           INTEGER,
    eisaInitFunctionIndex       INTEGER,
    eisaInitAllocationIndex     INTEGER,
    eisaInitUseMask             INTEGER,
    eisaInitAccess              INTEGER,
    eisaInitAddress             INTEGER,
    eisaInitPortValue           INTEGER,
    eisaInitPortMask            INTEGER
)
eisaInitSlotIndex       OBJECT-TYPE
    SYNTAX         INTEGER
    ACCESS         read-only
    STATUS         mandatory
    DESCRIPTION
        "The EISA slot number of the board that
        registered the port initialization this entry
        describes."
    : := ( eisaInitEntry 1 )
eisaInitFunctionIndex   OBJECT-TYPE
    SYNTAX         INTEGER
    ACCESS         read-only
    STATUS         mandatory
    DESCRIPTION
        "The function in which this port initialization
        was registered."
    : := ( eisaInitEntry 2 )
eisaInitAllocationIndex   OBJECT-TYPE
    SYNTAX         INTEGER
    ACCESS         read-only
    STATUS         mandatory
    DESCRIPTION
        "The index for this port initialization entry
        in the EISA function block."
    : := ( eisaInitEntry 3 )
eisaInitUseMask         OBJECT-TYPE
    SYNTAX         INTEGER (
            useValueOnly(1),
            useValueAndMask(2)
    ACCESS         read-only
    STATUS         mandatory
    DESCRIPTION
        "This indicates if a mask will be used when
        performing initialization."
    : := ( eisaInitEntry 4 )
eisaInitAccess          OBJECT-TYPE
    SYNTAX         INTEGER (
            eightBitAddress(1),
            sixteenBitAddress(2)
            thirtyTwoBitAddress (3)
    ACCESS         read-only
    STATUS         mandatory
    DESCRIPTION
        "This value indicates the number of bits this
        entry initializes."
    : := ( eisaInitEntry 5 )
eisaInitAddress         OBJECT-TYPE
    SYNTAX         INTEGER
    ACCESS         read-only
    STATUS         mandatory
    DESCRIPTION
        "This value indicates the port address
        this entry initializes."
    : := ( eisaInitEntry 6 )
eisaInitPortValue       OBJECT-TYPE
    SYNTAX         INTEGER
    ACCESS         read-only
    STATUS         mandatory
    DESCRIPTION
        "This value indicates the value this entry
        initializes the port to."
    : := ( eisaInitEntry 7 )
eisaInitPortMask        OBJECT-TYPE
    SYNTAX         INTEGER
    ACCESS         read-only
    STATUS         mandatory
```

-continued

```
DESCRIPTION
    "This value indicates the mask to use when
    performing initialization."
: := ( eisaInitEntry 8 )
```

©1992 Compaq Computer Corporation

Figure 5D:
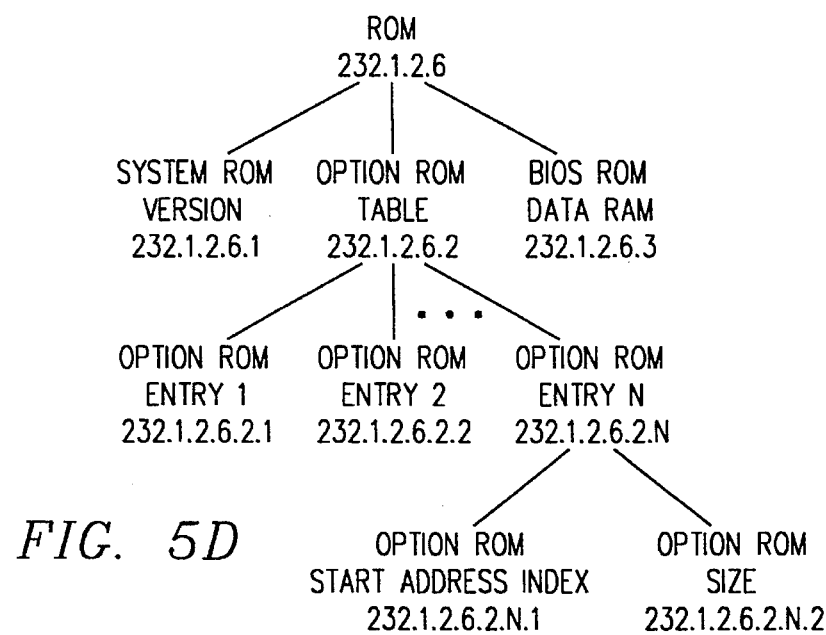
FIG. 5D is an inheritance tree illustrating a ROM child group of the component group of the subMIB of FIG. 5A.

Referring now to FIG. 5D, the ROM child group will now be described in greater detail. The ROM group located at branch 232.1.2.6 describes the system ROM, both version and date using a version object located at branch 232.1.2.6.1, and uses an N entry option ROM table, each entry having an address index object located at branch 232.1.2.6.2.N.1 and a size object located at branch 232.1.2.6.2.N.2 which describes the starting address and size of each option ROM in the system. The formal organization of the ROM group is as follows:

```
systemRomVersion    OBJECT-TYPE
    SYNTAX          DisplayString (SIZE (0 . . . 255))
    ACCESS          read-only
    STATUS          mandatory
    DESCRIPTION
        "The system ROM manufacturer, family, and
        version information."
    : := ( rom 1 )
optionRomTable      OBJECT-TYPE
    SYNTAX          SEQUENCE OF OptionSlotEntry
    ACCESS          not-accessible
    STATUS          optional
    DESCRIPTION
        "A table of option ROM descriptions."
    : := ( rom 2 )
optionRomEntry      OBJECT-TYPE
    SYNTAX          OptionRomEntry
    ACCESS          not-accessible
    STATUS          optional
    DESCRIPTION
        "An option ROM description."
    INDEX           ( optionRomStartAddrIndex )
    : := ( optionRomTable 1 )
OptionRomEntry      : :=SEQUENCE (
    optionRomStartAddrIndex     INTEGER,
    optionRomSize               INTEGER
    )
optionRomStartAddrIndex    OBJECT-TYPE
    SYNTAX          INTEGER
    ACCESS          read-only
    STATUS          optional
    DESCRIPTION
        "The starting address of the option ROM."
    : := ( optionRomEntry 1 )
optionRomSize       OBJECT-TYPE
    SYNTAX          INTEGER
    ACCESS          read-only
    STATUS          optional
    DESCRIPTION
        "The size in bytes of the option ROM."
    : := ( optionRomEntry 2 )
biosRomDataRaw      OBJECT-TYPE
    SYNTAX          OCTET STRING (SIZE (0 . . . 256))
    ACCESS          read-only
    STATUS          optional
    DESCRIPTION
        "The BIOS ROM data area. This may be the
        current contents a copy of the BIOS ROM data
        area from when the SNMP agent was loaded."
    : := ( rom 3 )
```

©1992 Compaq Computer Corporation

Returning momentarily to FIG. 5A, the keyboard child group will now be described in greater detail. The keyboard group is located at branch 232.1.2.7 contains a description object located at branch 232.1.2.7.1 which describes the keyboard attached to the system and which is organized as follows:

```
keyboarddescription    OBJECT-TYPE
    SYNTAX          DisplayString (SIZE (0 . . . 255))
    ACCESS          read-only
    STATUS          mandatory
    DESCRIPTION
        "A description of the keyboard"
    : := ( keyboard 1)
```

©1992 Compaq Computer Corporation

The video group is located at branch 232.1.2.8 and includes a description object located at branch 232.1.2.8.1 which describes the video adaptor and display and is configured as follows:

```
videodescription    OBJECT-TYPE
    SYNTAX          DisplayString (SIZE (0 . . . 255))
    ACCESS          read-only
    STATUS          mandatory
    DESCRIPTION
        "A description of the video system in the
        computer. This may include the manufacturer,
        board name, modes supported, etc . . ."
    : := ( video 1 )
```

©1992 Compaq Computer Corporation

Figure 5E:
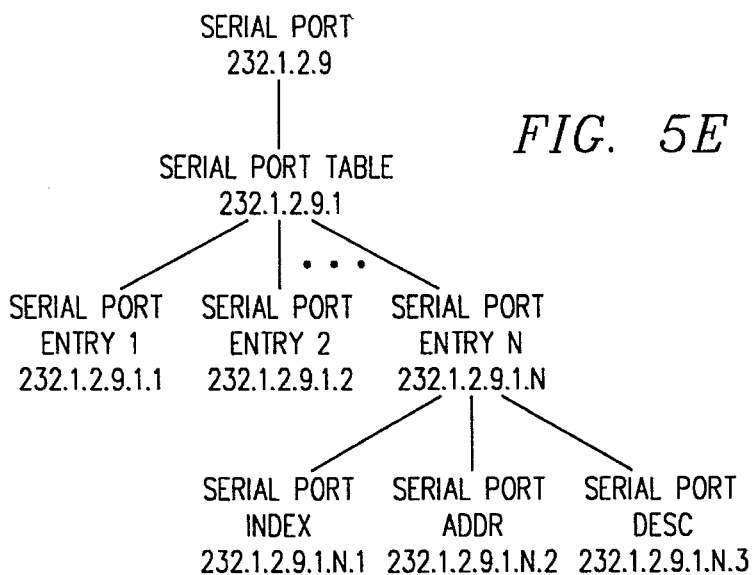
FIG. 5E is an inheritance tree illustrating a serial port child group of the component group of the subMIB of FIG. 5A.

Referring now to FIG. 5E, the serial port child group will now be described in greater detail. The serial port group is located at branch 232.1.2.9 and includes a table located at branch 232.1.2.9.1 which contains N entries, each containing configuration information for one of the serial ports installed in the system. The configuration information is contained in an index object located at branch 232.1.2.9.1.N.1, an address object located at branch 232.1.2.9.1.N.2 and a description object located at branch 232.1.2.9.1.N.3. The serial port group is organized as follows:

```
serialPortTable     OBJECT-TYPE
    SYNTAX          SEQUENCE OF SerialPortEntry
    ACCESS          not-accessible
    STATUS          mandatory
    DESCRIPTION
        "A table of serial port descriptions."
    : := ( serialPort 1 )
serialPortIndex     OBJECT-TYPE
    SYNTAX          INTEGER
    ACCESS          read-only
    STATUS          mandatory
    DESCRIPTION
        "A description of a serial port."
    INDEX           ( serialPortIndex )
    : := ( serialPortTable 1 )
SerialPortEntry     : := SEQUENCE
    serialPortIndex         INTEGER,
    serialPortAddr          INTEGER,
    serialPortDesc          DisplayString (SIZE (0 . . . 255))
    serialPortIndex         OBJECT-TYPE
    SYNTAX          INTEGER
    ACCESS          read-only
    STATUS          mandatory
    DESCRIPTION
        "An index that uniquely specifies this entry."
    : := ( serialPortEntry 1)
serialPortAddr      OBJECT-TYPE
    SYNTAX          INTEGER
    ACCESS          read-only
    STATUS          mandatory
```

-continued

```
DESCRIPTION
      "The I/O port address used by this serial
      port."
   : := ( serialPortEntry 2 )
serialPortDesc    OBJECT-TYPE
   SYNTAX         INTEGER
   ACCESS         read-only
   STATUS         mandatory
   DESCRIPTION
      "A text description of further information
      known about the serial port. This may be an
      empty string if no further information is
      known."
   : := ( serialPortEntry 3 )
```

©1992 Compaq Computer Corporation

Figure 5F:
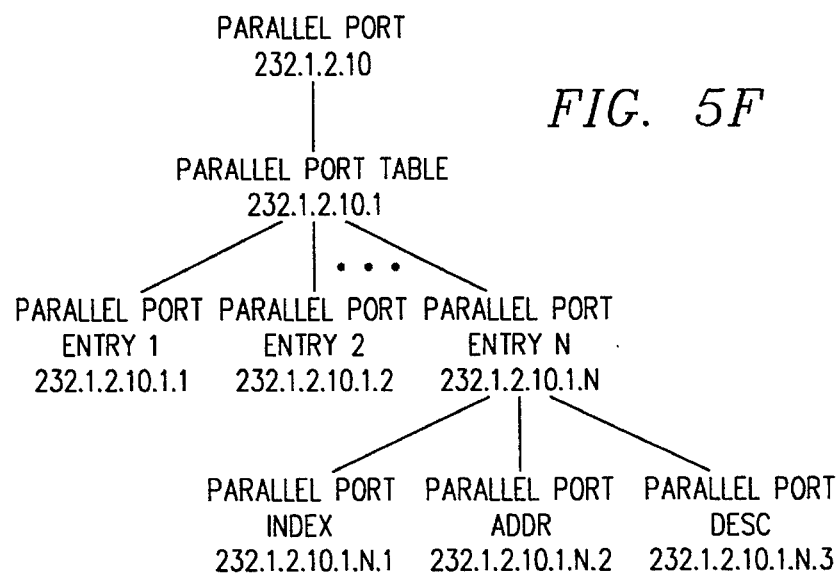
FIG. 5F is an inheritance tree illustrating a parallel port child group of the component group of the subMIB of FIG. 5A.

Referring now to FIG. 5F, the parallel port child group will now be described in greater detail. The parallel port group is located at branch 232.1.2.10 and includes a table located at branch 232.1.2.10.1 which contains N entries, each containing configuration information for one of the parallel ports installed in the system. The configuration information is contained in an index object located at branch 232.1.2.10.1.N.1, an address object located at branch 232.1.2.10.1.N.2 and a description object located at branch 232.1.2.10.1.N.3. The parallel port group is organized as follows:

```
parallelPortTable    OBJECT-TYPE
   SYNTAX            SEQUENCE OF ParallelPortEntry
   ACCESS            not-accessible
   STATUS            mandatory
   DESCRIPTION
      "A table of parallel port descriptions."
   : := ( parallelport 1 )
parallelPortEntry    OBJECT-TYPE
   SYNTAX            ParallelPortEntry
   ACCESS            not-accessible
   STATUS            mandatory
   DESCRIPTION
      "A description of a parallel port."
   INDEX           ( parallelPortIndex )
   : := ( parallelPortTable 1 )
ParallelPortEntry    : :-SEQUENCE (
   parallelPortIndex    INTEGER,
   parallelPortAddr     INTEGER,
   parallelPortDesc     DisplayString (SIZE (0 . . . 255))
)
parallelPortIndex    OBJECT-TYPE
   SYNTAX            INTEGER
   ACCESS            read-only
   STATUS            mandatory
   DESCRIPTION
      "An index that uniquely specifies this entry."
   : := ( parallelPortEntry 1 )
parallelPortAddr    OBJECT-TYPE
   SYNTAX            INTEGER
   ACCESS            read-only
   STATUS            mandatory
   DESCRIPTION
      "The I/O port address used by this parallel
      port."
   : := ( parallelPortEntry 2 )
parallelPortDesc    OBJECT-TYPE
   SYNTAX            displaystring (SIZE (0 . . . 255))
   ACCESS            read-only
   STATUS            mandatory
   DESCRIPTION
      "A text description of further information
      known abut the parallel port. This may be an
      empty string if no further information is
      known."
   : := (parallelPortEntry 3 )
```

©1992 Compaq Computer Corporation

Figure 5G:
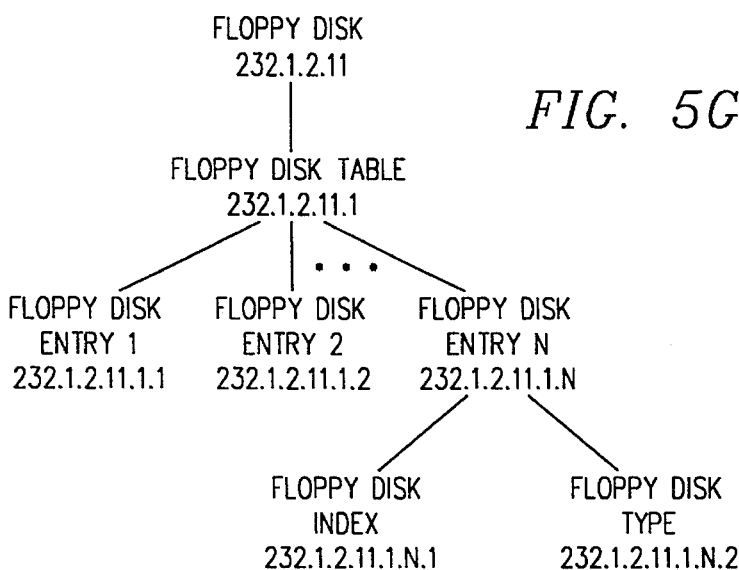
FIG. 5G is an inheritance tree illustrating a floppy disk child group of the component group of the subMIB of FIG. 5A.

Referring now to FIG. 5G, the floppy diskette child group will now be described in greater detail. The floppy diskette group is located at branch 232.1.2.11 and includes a table located at branch 232.1.2.11.1 which contains N entries, each of which describes a floppy diskette drive installed in the system. The description of a floppy diskette drive is contained in an index object located at branch 232.1.2.11.1.N.1 and a type object located at branch 232.1.2.11.1.N.2. The floppy diskette group is organized as follows:

```
floppyDisketteTable    OBJECT-TYPE
   SYNTAX              SEQUENCE OF FloppyDisketteEntry
   ACCESS              not-accessible
   STATUS              mandatory
   DESCRIPTION
      "A table of floppy drive descriptions."
   : := ( floppydiskette 1 )
floppyDisketteEntry    OBJECT-TYPE
   SYNTAX              FloppyDisketteEntry
   ACCESS              not-accessible
   STATUS              mandatory
   DESCRIPTION
      "A floppy drive description."
   INDEX             ( floppydisketteindex )
   : := ( floppyDisketteTable 1 )
FloppyDisketteEntry)    : := SEQUENCE (
   floppyDisketteIndex    INTEGER,
   floppyDisketteType     INTEGER
)
floppyDisketteIndex    OBJECT-TYPE
   SYNTAX              INTEGER
   ACCESS              read-only
   STATUS              mandatory
   DESCRIPTION
      "An index that uniquely specifies this entry.
      If possible, this field will map directly to
      the drive letter (1 for A:, 2 for B:)."
   : := ( floppyDisketteEntry 1 )
floppyDiskettetype    OBJECT-TYPE
   SYNTAX             INTEGER (
      drive360k(1),
      drive1200k(2),
      drive720k(3),
      drive1440k(4)
   ACCESS             read-only
   STATUS             mandatory
   DESCRIPTION
      "The type (capacity) of the floppy drive. The
      following values are valid:
      drive360k (1) This is a 360 kilobyte, 5.25
      inch floppy drive.
      drive1200k (2) This is a 1.2 megabyte, 5.25
      inch floppy drive.
      drive720k (3) This is a 720 kilobyte, 3.5 inch
      floppy drive.
      drive1440k (4) This is a 1.44 megabyte, 3.5
      inch floppy drive."
   : := ( floppyDisketteEntry 2 )
```

©1992 Compaq Computer Corporation

Figure 5H:
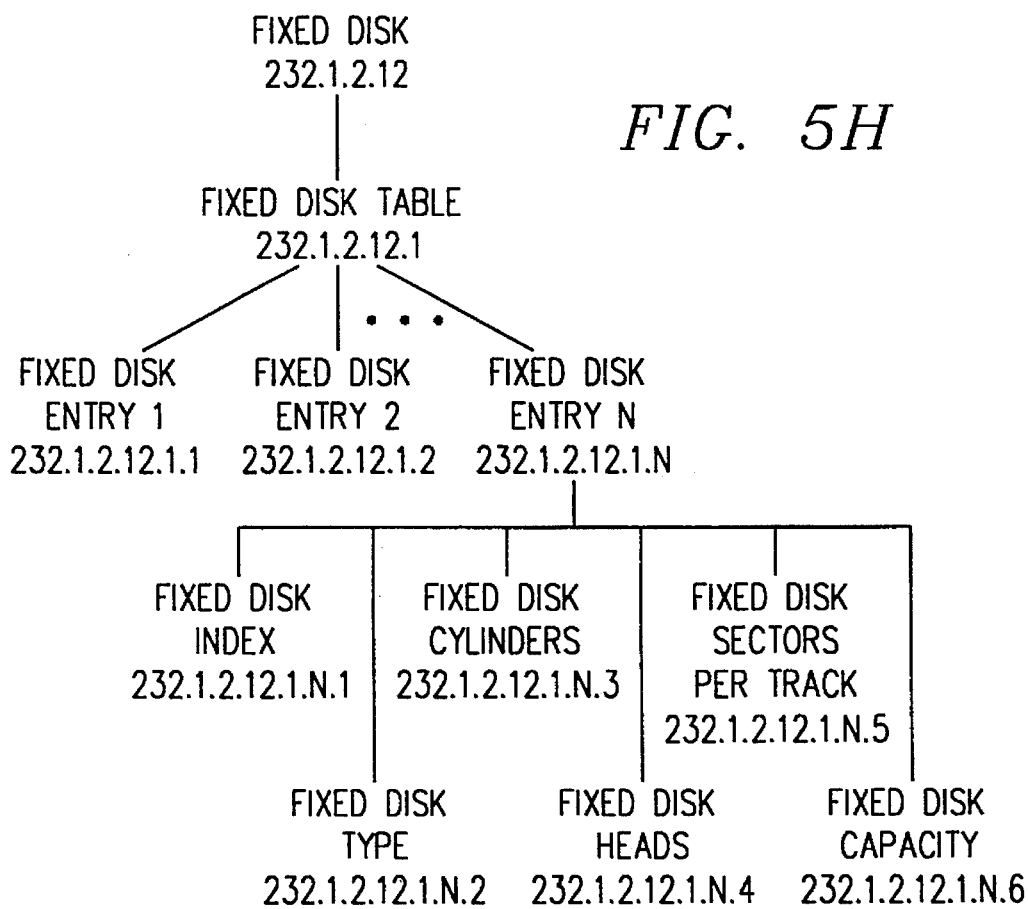
FIG. 5H is an inheritance tree illustrating a fixed disk child group of the component group of the subMIB of FIG. 5A.

Referring now to FIG. 5H, the fixed disk child group will now be described in greater detail. The fixed disk group is located at branch 232.1.2.12 and includes a table located at branch 232.1.2.12.1 which contains N entries, each of which describes the configuration of a fixed disk drive installed in the system which is accessible through a ST506 compatible interface. The description of a fixed disk drive is contained in an index object located at branch 232.1.2.12.1.N.1, a type object located at branch 232.1.2.12.1.N.2, a cylinders object located at branch 232.1.2.12.1.N.3, a heads object located at branch 232.1.2.12.1.N.4, a sectors per track object located at branch 232.1.2.12.1.N.5 and a capacity object located at branch 232.1.2.12.1.N.6. The floppy diskette group is organized as follows:

```
fixedDiskTable          OBJECT-TYPE
    SYNTAX              SEQUENCE OF FixedDiskEntry
    ACCESS              not-accessible
    STATUS              mandatory
    DESCRIPTION
        "A table of ST-506 interface accessible fixed
        disk descriptions."
    : := ( fixeddisk 1 )
fixedDiskEntry          OBJECT-TYPE
    SYNTAX              fixedDiskEntry
    ACCESS              not-accessible
    STATUS              mandatory
    DESCRIPTION
        "A fixed disk description."
    INDEX       ( fixedDiskIndex )
    : := ( fixedDiskTable 1)
FixedDiskEntry          ::= SEQUENCE (
    fixedDiskIndex              INTEGER,
    fixedDiskType               INTEGER,
    fixedDiskCylinders          INTEGER,
    fixedDiskHeads              INTEGER,
    fixedDiskSectorsPerTrack    INTEGER,
    fixedDiskCapacity           INTEGER
)
fixedDiskIndex          OBJECT-TYPE
    SYNTAX              INTEGER
    ACCESS              read-only
    STATUS              mandatory
    DESCRIPTION
        "An index that uniquely specifies this entry.
        Each possible index value indicates a special
        drive as shown in the table below:
        fiskDiskIndex       IDE/ESDI Controller     Drive Unit 1               Primary                 1
            2               Primary                 2
            3               Secondary               1
            4               Secondary               2
        Any other index value would be implementation
        specific."
    : := ( fixedDiskEntry 1 )
fixedDiskType           OBJECT-TYPE
    SYNTAX              INTEGER
    ACCESS              read-only
    STATUS              mandatory
    DESCRIPTION
        "The drive type."
    : := ( fixedDiskEntry 2 )
fixedDiskCylinders      OBJECT-TYPE
    SYNTAX              INTEGER
    ACCESS              read-only
    STATUS              mandatory
    DESCRIPTION
        "The number of cylinders on the drive."
    : := ( fixedDiskEntry 3 )
fixedDiskHeads          OBJECT-TYPE
    SYNTAX              INTEGER
    ACCESS              read-only
    STATUS              mandatory
    DESCRIPTION
        "The number of heads on the drive."
    : := ( fixedDiskEntry 4 )
fixedDiskSectorsPerTrack    OBJECT-TYPE
    SYNTAX              INTEGER
    ACCESS              read-only
    STATUS              mandatory
    DESCRIPTION
        "The number of sectors per tract on the drive."
    : := ( fixedDiskEntry 5 )
fixedDiskCapacity       OBJECT-TYPE
    SYNTAX              INTEGER
    ACCESS              read-only
    STATUS              mandatory
    DESCRIPTION
        "The capacity of the drive in megabytes."
    : := ( fixedDiskEntry 6 )
```

©1992 Compaq Computer Corporation

Figure 6B:
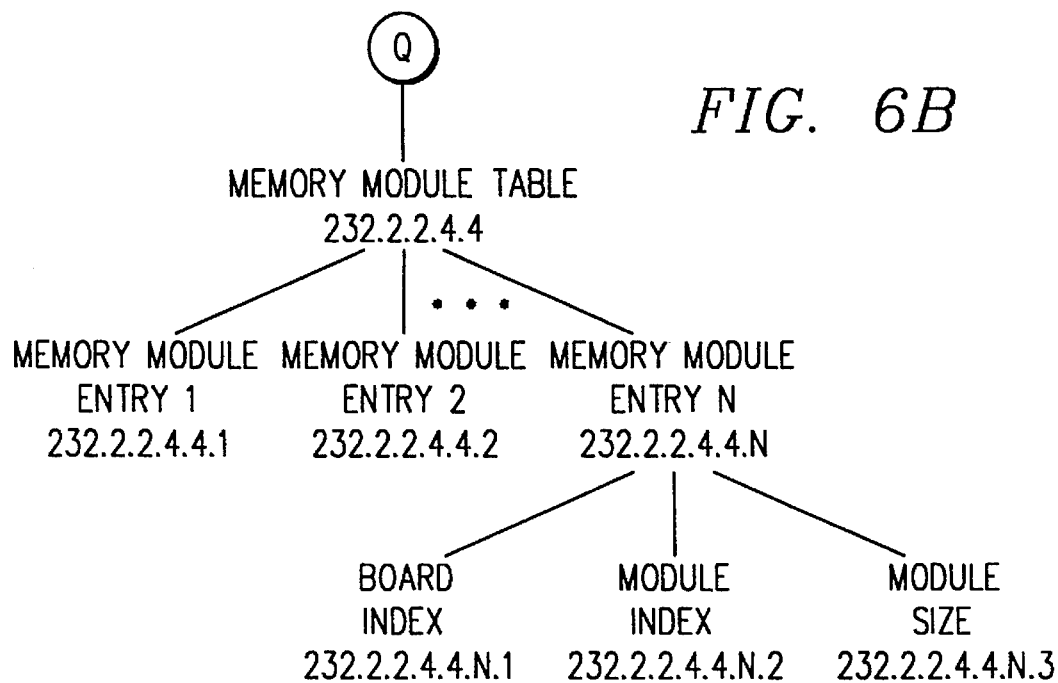
FIG. 6B is an inheritance tree illustrating a system board child group of a component group of the subMIB of FIG. 6A.
Figure 6A:
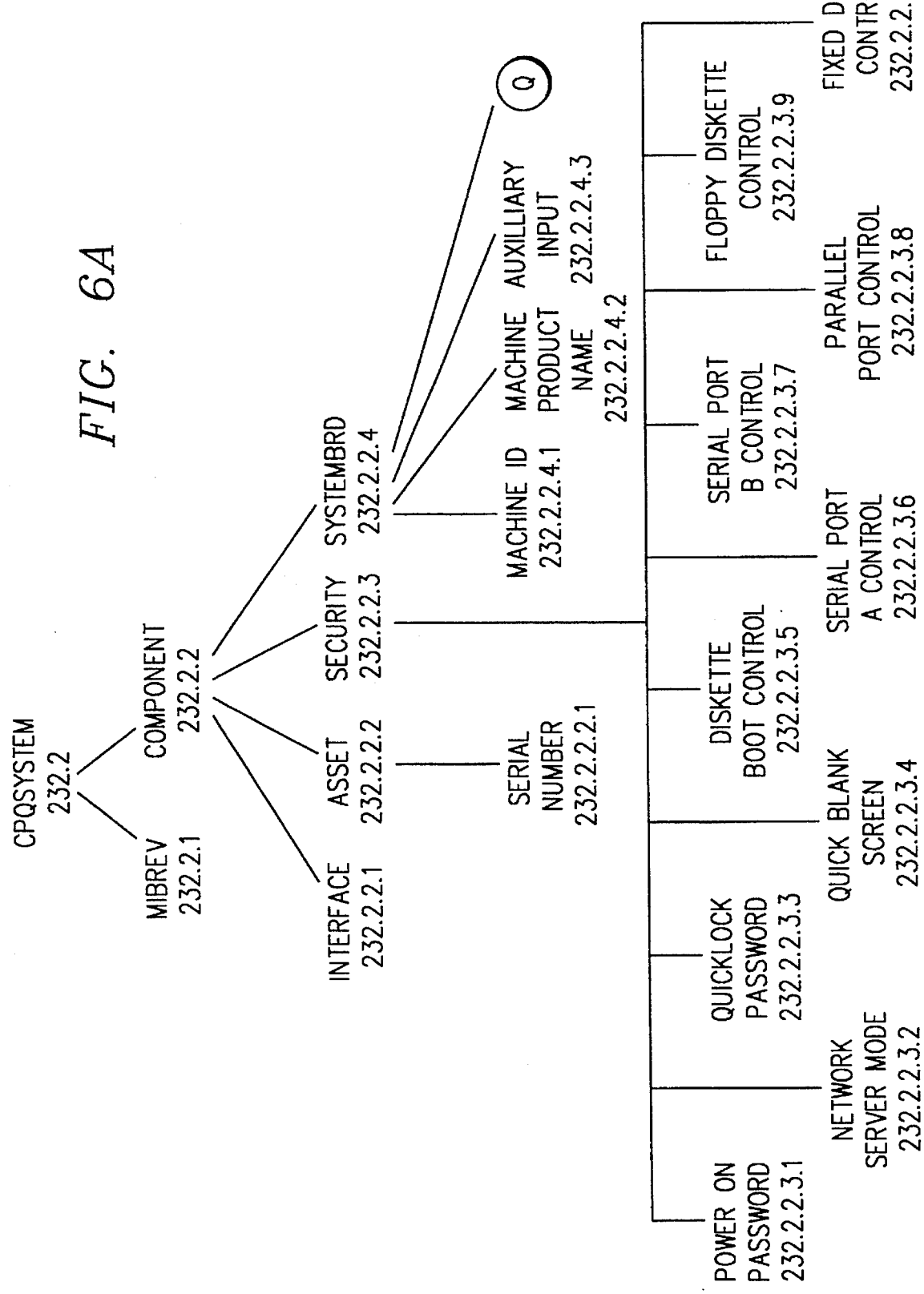
FIG. 6A is an inheritance tree illustrating a second subMIB of the enterprise MIB of FIG. 4A.

Referring next to FIG. 6A, the Compaq system subMIB 232.2 which consists of data describing system board information specific to computer systems manufactured by Compaq Computer Corporation shall now be described in greater detail. IMPORTS used in the system subMIB 232.2 are as follows:

| Import | Defined by |
| --- | --- |
| enterprises | RFC1155-SMI |
| Counter | RFC1155-SMI |
| Gauge | RFC1155-SMI |
| TimeTicks | RFC1155-SMI |
| DisplayString | RFC1158-MIB |
| OBJECT-TYPE | RFC-1212 |

The system subMIB includes two child groups, a mibRev group located at branch 232.2.1 and a component group located at branch 232.2.2. The mibRev child group contains information regarding the revision of the subMIB to which the SNMP agent conforms and is configured as previously described in FIG. 4b.

The component child group contains information describing Compaq extensions to standard PC, ISA and EISA architectures. This information is contained in plural child groups of the component group. The component group's child groups are an interface child group containing information specific to the host software that supports runtime object instances, located at branch 232.2.2.1, an asset child group located at branch 232.2.2.2, a security child group located at branch 232.2.2.3 and a system board child group located at branch 232.2.2.4.

The asset child group located at branch 232.2.2.2 contains the serial numbers of any hardware, for example, file server 10, manufactured by Compaq Computers which support asset management and is comprised of a single object, referred to as a serial number object, located at branch is organized according to the following:

```
systemSerialNumber      OBJECT-TYPE
    SYNTAX              DisplayString (SIZE (0 . . . 255))
    ACCESS              read-only
    STATUS              mandatory
    DESCRIPTION
        "The serial number of the system unit. The
        string will be empty if the system does not
        report the serial number function."
```

©1992 Compaq Computer Corporation

The security child group located at branch 232.2.2.3 contains object instances describing how security features installed on computers manufactured by Compaq Computer Corporation installed in the system are configured. The security group includes 10 objects, a power on password object located at branch 232.2.2.1, a network server mode object located at branch 232.2.2.2, a quick lock password object located at branch 232.2.2.3, a quick blank screen object located at branch 232.2.2.4, a diskette boot control object located at branch 232.2.2.5, a primary serial port access control object located at branch 232.2.2.6, a secondary serial port access control object located at branch 232.2.2.7, a parallel port access control object located at branch 232.2.2.8, a floppy diskette control object located at branch 232.2.2.9, a fixed disk control object located at branch 232.2.2.10. The security child group is organized according to the following framework:

```
powerOnPassword      OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the power on password feature."
    : := ( security 1 )
networkServerMode    OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the network server mode feature."
    : := ( security 2 )
quickLockPassword    OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the quicklock password feature."
    : := ( security 3 )
quickBlankScreen     OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the quicklock blank screen
        feature."
    : := ( security 4 )
disketteBootcontrol  OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the diskette boot control
        feature."
    : := ( security 5 )
serialPortAControl   OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the access control for the
        primary serial port interface embedded in the
        Compaq system board."
    : := ( security 6 )
serialPortBControl   OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the access control for the
        secondary serial port interface embedded in the
        Compaq system board."
    : := ( security 7 )
parallelPortControl  OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the access control for the
        parallel port interface embedded in the Compaq
        system board."
    : := ( security 8 )
floppyDisketteControl   OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the access control for the floppy
        diskette interface embedded in the Compaq
        system board."
    : := ( security 9 )
fixedDiskControl     OBJECT-TYPE
    SYNTAX         INTEGER      (
        other(1),
        disabled(2),
        enabled (3)
        )
    ACCESS         read-only
    STATUS         mandatory
    DESCRIPTION
        "The state of the access control for the fixed
        disk interface embedded in the Compaq system
        board."
    : := ( security 10 )
```

©1992 Compaq Computer Corporation

The system board child group located at branch 232.2.2.4 describes features of a Compaq Computer Corporation type system board such as machine ID, product name and others. Such features are described in three objects, a machine ID object located at branch 232.2.2.4.1, a machine product name object located at branch 232.2.2.4.2 and an auxiliary input object located at branch 232.2.2.4.3 and a memory module table located at branch 232.2.2.4.4. Further details regarding the aforementioned objects are set forth in the organizational structure for the system board group set forth below:

```
machineId            OBJECT-TYPE
    SYNTAX         INTEGER
    ACCESS         read-only
    STATUS         mandatory
    DESCRIPTION
        "The machine ID."
    : := ( systemBoard 1 )
machineProductName   OBJECT-TYPE
    SYNTAX         DisplayString (SIZE (0 . . . 255))
    ACCESS         read-only
    STATUS         mandatory
    DESCRIPTION
        "The machine product name."
    : := ( systemBoard 2 )
auxiliaryInput       OBJECT-TYPE
    SYNTAX         INTEGER      (
```

```
                    -continued
            other(1),
            disabled(2),
            enabled (3)
            )
        ACCESS      read-only
        STATUS      mandatory
        DESCRIPTION
            "The state of the auxiliary input (pointing)
            device."
        : := ( systemBoard 4 )
```

©1992 Compaq Computer Corporation

Referring next to FIG. 6B, the memory module table of the system board child group will now be described in greater detail. The memory module table is located at branch 232.2.2.4.4 and describes the memory board installed in the file server 10. The memory module table includes N branches, one for each memory board installed in the file server 10. Each entry includes a board index object located at branch 232.2.2.4.4.N.1, a module index located at branch 232.2.2.4.4.N.2 and a module size object located at branch 232.2.2.4.4.N.3. The memory module table is organized as follows:

```
memoryModuleTable    OBJECT-TYPE
    SYNTAX      SEQUENCE OF MemoryModuleEntry
    ACCESS      not-accessible
    STATUS      optional
    DESCRIPTION
        "The table of memory module descriptions."
    : := ( systemBoard 5 )
memoryModuleEntry    OBJECT-TYPE
    SYNTAX      MemoryModuleEntry
    ACCESS      not-accessible
    STATUS      optional
    DESCRIPTION
        "A memory module description."
    : := ( memoryModuleTable 1 )
MemoryModuleEntry    : := SEQUENCE    (
    memoryBoardIndex    INTEGER,
    memoryModuleIndex   INTEGER,
    memoryModuleSize    INTEGER
)
memoryBoardIndex    OBJECT-TYPE
    SYNTAX      INTEGER
    ACCESS      read-only
    STATUS      optional
    DESCRIPTION
        "The slot in which the memory board is
        installed."
    : := ( memoryModuleEntry 1 )
memoryModuleIndex    OBJECT-TYPE
    SYNTAX      INTEGER
    ACCESS      read-only
    STATUS      optional
    DESCRIPTION
        "The memory module number."
    : := ( memoryModuleEntry 2 )
memoryModuleSize    OBJECT-TYPE
    SYNTAX      INTEGER
    ACCESS      read-only
    STATUS      optional
    DESCRIPTION
        "Module memory size in kilobytes. A kilobyte
        of memory is defined as 1024 bytes."
    : := ( memoryModuleEntry 2 )
```

©1992 Compaq Computer Corporation

Figure 7A:
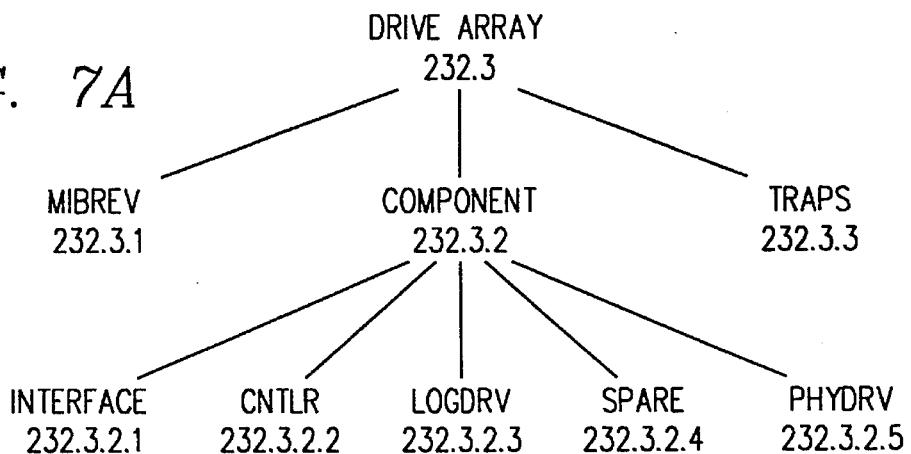
FIG. 7A is an inheritance tree illustrating a third subMIB of the enterprise MIB of FIG. 4A.

Referring next to FIG. 7A, the drive array subMIB located at branch 232.3 will now be described in greater detail. The drive array subMIB details the intelligent drive array and includes data which describes the drive array subsystem, including the internal intelligent drive array (or "IDA"), external IDA and accelerated IDA, including configuration and status information about the controllers, logical drives, physical drives, spare drives, 4 MB array accelerator write cache board typically included in an intelligent drive array. Information regarding the relationship of the intelligent drive array and the host operating system is also included in the drive array subMIB.

The drive array subMIB includes three child groups, a mibREV group located at branch 232.3.1, a component group located at branch 232.3.2, and a traps group located at branch 232.3.3. The mibRev child group contains information regarding the revision of the subMIB to which the SNMP agent conforms and is configured as previously described in FIG. 4B and the trap group contains information regarding traps issued from the drive array subMIB and is configured as previously described in FIG. 4c. Trap definitions specific to the traps child group located at branch 232.2.3 are as follows:

```
logDrvStatusChange    TRAP-TYPE
    ENTERPRISE      driveArray
    VARIABLES       ( logDrvStatus )
    DESCRIPTION
        "A logDrvStatusChange trap signifies
        that the sending SNMP agent has
        detected a change in the
        logDrvStatus of a Compaq Drive Array
        logical drive. The variable
        logDrvStatus indicates the new
        logical drive status."
    : := 1
spareStatusChange    TRAP-TYPE
    ENTERPRISE      driveArray
    VARIABLES       ( spareStatus )
    DESCRIPTION
        "A spareStatusChange trap signifies
        that the sending SNMP agent has
        detected a change in the spareStatus
        of a Compaq Drive Array spare. The
        variable spareStatus indicates the
        new spare drive status."
    : := 2
phyDrvStatusChange    TRAP-TYPE
    ENTERPRISE      driveArray
    VARIABLES       ( phyDrvStatus )
    DESCRIPTION
        "A phyDrvStatusChange trap signifies
        that the sending SNMP agent has
        detected a change in the
        phyDrvStatus of a Compaq Drive Array
        physical drive. The variable
        phyDrvStatus indicates the new
        physical drive status."
    : := 3
phyDrvThreshExceededTrap    TRAP-TYPE
    ENTERPRISE      driveArray
    VARIABLES       ( phyDrvThreshExceeded )
    DESCRIPTION
        "A phyDrvThreshExceededTrap trap
        signifies that the sending SNMP
        agent has detected factory threshold
        associated with one of the drive
        attributes on a Compaq Drive Array
        physical drive has been exceeded.
    : := 4
phyDrvStatusChange    TRAP-TYPE
    ENTERPRISE      driveArray
    VARIABLES       ( accelStatus , accelErrCode )
    DESCRIPTION
        "A accelStatusChange trap signifies
        that the sending SNMP agent has
        detected a change in the accelStatus
        of the COMPAQ 4MB Array Accelerator
        Write Cache."
    : := 5
accelBadData    TRAP-TYPE
    ENTERPRISE      driveArray
    VARIABLES       ( accelBadData )
```

-continued

```
DESCRIPTION
    "An accelBadData trap signifies that
    the sending SNMP agent has detected
    a COMPAQ 4MB Array Accelerator Write
    Cache that has lost battery power.
    If data was being stored in the
    accelerator memory it has been
    lost."
    : := 6
accelBatteryFailed    TRAP-TYPE
    ENTERPRISE    driveArray
    VARIABLES     ( accelBatteryStatus )
    DESCRIPTION
        "An accelBatteryFailed trap
        signifies that the sending SNMP
        agent has detected a COMPAQ 4MB
        Array Accelerator Write Cache that
        had a cache battery failure."
    : := 7
```

©1992 Compaq Computer Corporation

The component group contains a series of child groups, each of which describe a particular part of a drive array subsystem. These child groups include an interface group located at branch 232.3.2.1, a controller group located at branch 232.3.2.2, a logical drive group located at branch 232.3.2.3, a spare drive group located at branch 232.3.2.4 and a physical drive group located at branch 232.3.2.5.

Figure 1:
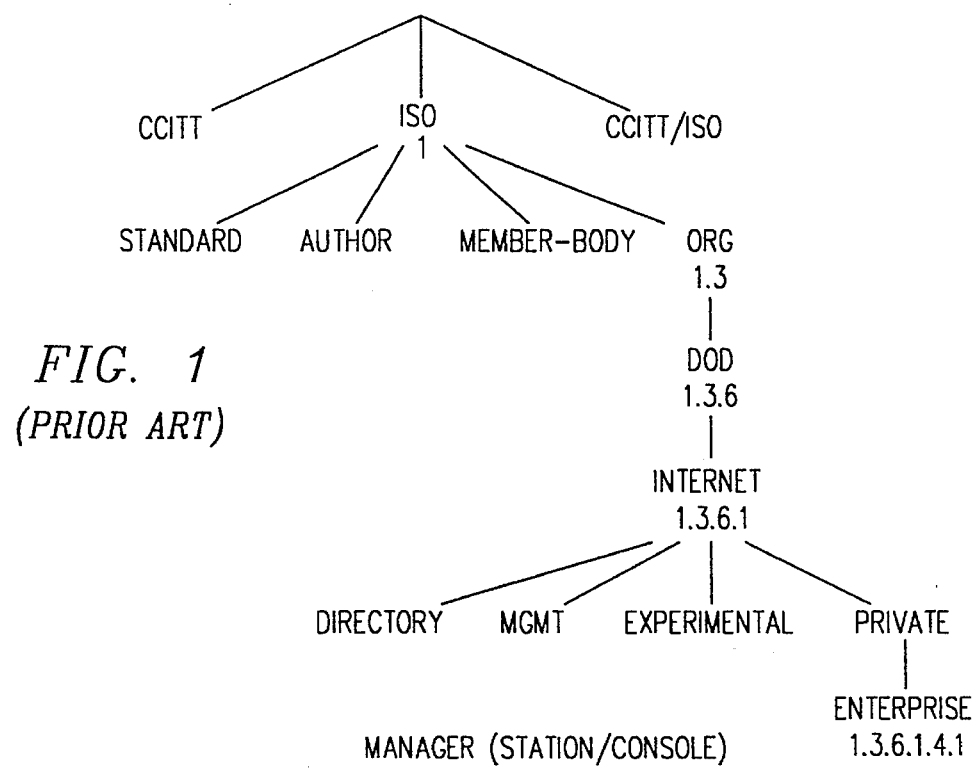
FIG. 1 is a tree illustrating the organizational framework defined by CCITT and ISO for an interoperable network of data.
Figures 1, 7B:
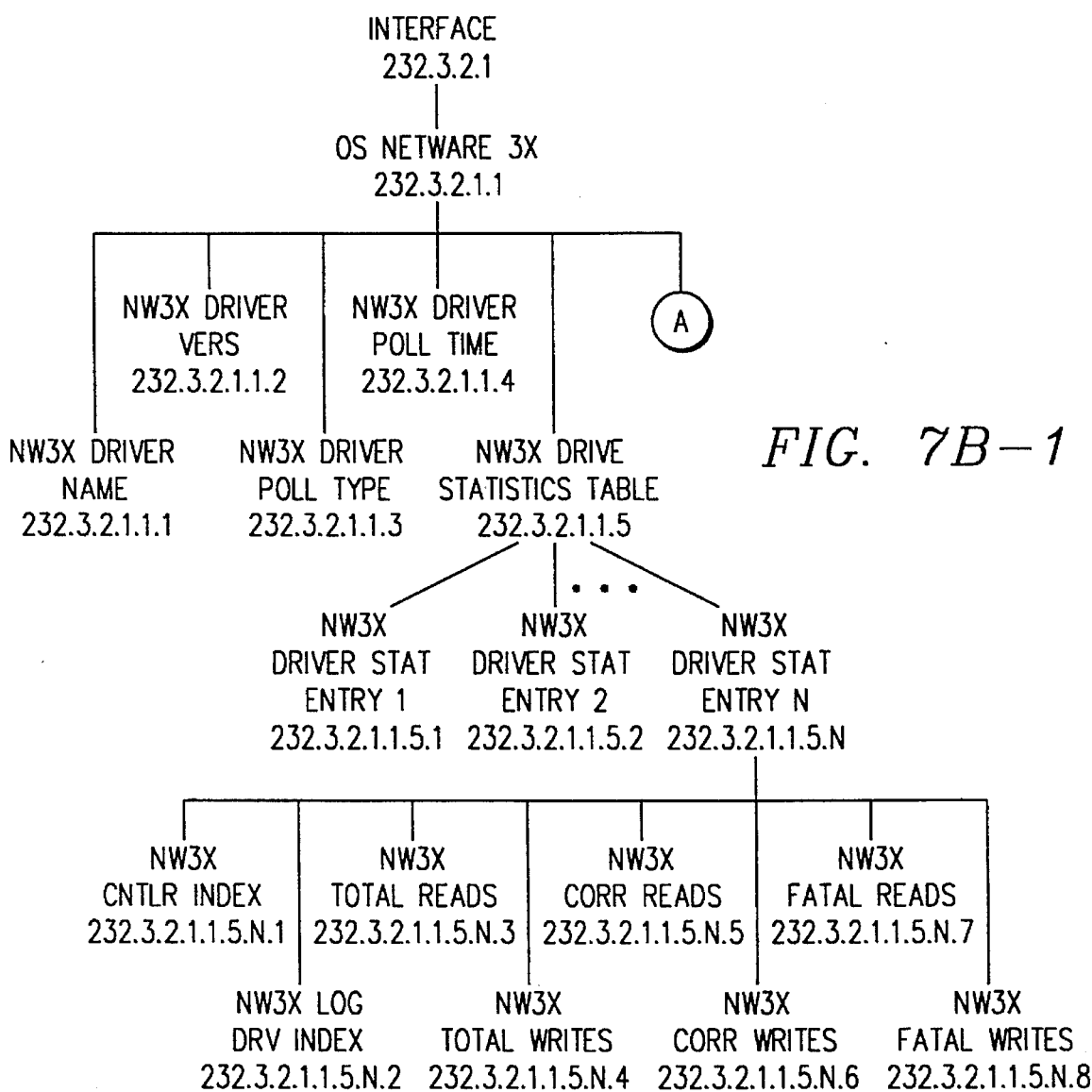
Figures 2, 7B:
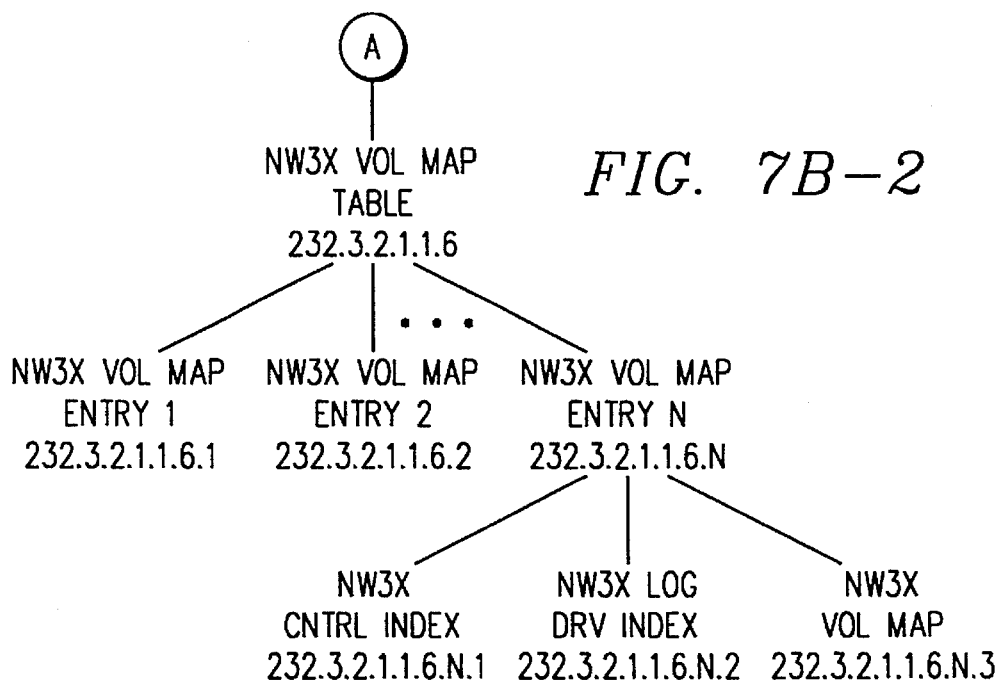

Referring next to FIGS. 7B-1 through 7B-2 in general and FIG. 7B-1 in particular, the interface child group located at branch 232.3.2.1 will now be described in greater detail. The interface group contains at least one child group which contains information describing how the drive array subsystem interfaces with a particular host operating system. In the embodiment of the invention disclosed herein, a single child group describing the interface with a NetWare operating system is disclosed. It is contemplated, however, that as additional host operating system are instrumented, more child groups will be created. The osNetWare3x group is located at branch 232.3.2.1.1 and describes the driver module of the drive array controller in its software interface with the NetWare v3.x operating system using four objects, a driver name object located at branch 232.3.2.1.1.1, a driver version object located at branch 232.3.2.1.1.2, a driver poll type object located at branch 232.3.2.1.1.3 and a driver poll time object located at branch 232.3.2.1.1.4, and two tables, a drive statistics table located at branch 232.3.2.1.1.5 and a volume map table located at branch 232.3.2.1.1.6.

The objects included as part of the osNetware3x group are formally organized as follows:

```
nw3xDriverName    OBJECT-TYPE
    SYNTAX      DisplayString (SIZE (0 . . . 255))
    ACCESS      read-only
    STATUS      mandatory
    DESCRIPTION
        "COMPAQ Array Controller Driver Interface Name
        This is the name of the device driver for the
        COMPAQ Array controllers. For example, the
        name for the NetWare driver is CPQDA386.DSK."
    : := ( osNetWare3x 1 )
nw3xDriverVers    OBJECT-TYPE
    SYNTAX      DisplayString (SIZE (0 . . . 5))
    ACCESS      read-only
    STATUS      mandatory
    DESCRIPTION
        "COMPAQ Array Controller Driver Interface
        Version
        This is the version number of the device for
        the COMPAQ Array Controllers."
    : := ( osNetWare3x 2 )
nw3xDriverPollType    OBJECT-TYPE
    SYNTAX      INTEGER    (
        other(1),
        polled (2),
        demand(3)
    )
    ACCESS      read-only
    STATUS      mandatory
    DESCRIPTION
        "COMPAQ Array Controller Driver Interface Poll
        Type
        The SNMP instrument agent collects information
        from the device driver in two ways:
                Polled (2)    Indicates that the
                              information is
                              periodically requested and
                              stored by the server based
                              agent and is available
                              when requested.
                Demand (3)    Indicates that the
                              information is collected
                              at the time of the
                              request.
    : := ( osNetWare3x 3 )
nw3xDrivePollTime    OBJECT-TYPE
    SYNTAX      INTEGER
    ACCESS      read-only
    STATUS      mandatory
    DESCRIPTION
        "COMPAQ Array Controller Driver Interface Poll
        Time
        If the Poll Type is Polled, this value shows
        how frequently, in seconds, the instrument
        agent requests Information from the device
        driver.
        For example, if the Poll Type is Polled and the
        Poll Time is two, the instrument agent will
        poll the device driver every two seconds.
        To change the Poll Time for Novell NetWare, you
        need to unload and then reload the instrument
        agent using the following commands:
            UNLOAD CPQDASA
            LOAD CPQDASA (/uN)
        The parameter /U specifies the frequency of
        updates in seconds. The variable n represents
        the Number of seconds that the NLM should wait
        before collecting new data. The minimum is one
        second. The maximum value is 300 seconds (five
        minutes)."
    : := ( osNetWare3x 4 )
```

©1992 Compaq Computer Corporation

The drive statistics table for the osNetWare3x group includes N entries, each including a controller index object located at branch 232.3.2.1.1.5.N.1, a logical drive index object located at branch 232.3.2.1.1.5.N.2, a total reads object located at branch 232.3.2.1.1.5.N.3, a total writes object located at branch 232.3.2.1.1.5.N.4, a corrected reads object located at branch 232.3.2.1.1.5.N.5, a corrected writes object located at branch 232.3.2.1.1.5.N.6, a fatal reads object located at branch 232.3.2.1.1.5.N.7 and a fatal writes object located at branch 232.3.2.1.1.5.N.8. The formal organization of the drive statistics table is as follows:

branch 232.3.2.1.1.5.N.5, a corrected writes object located at branch 232.3.2.1.1.5.N.6, a fatal reads object located at branch 232.3.2.1.1.5.N.7 and a fatal writes object located at branch 232.3.2.1.1.5.N.8. The formal organization of the drive statistics table is as follows:

```
nw3xDriverStatTable OBJECT-TYPE
      SYNTAX    SEQUENCE OF Nw3xDriveStatEntry
      ACCESS    not-accessible
      STATUS    mandatory
      DESCRIPTION
            "COMPAQ Array Controller Driver Statistics
            Table
            This is a table of logical drive statistics
            which are gathered by the device driver."
      ::= ( osNetWare 3x 5 )

nw3xDriverStatEntry OBJECT-TYPE
      SYNTAX    Nw3xDriverStatEntry
      ACCESS    not-accessible
      STATUS    mandatory
      DESCRIPTION
            "COMPAQ Array Controller Driver Statistics
            Table Entry
            One entry in the driver statistics table.  Each
            entry represents a logical drive for which the
            statistics are kept."
      INDEX     ( nw3DriveStatTable 1 )

Nw3xDriverStatEntry ::=SEQUENCE
(
            nw3xCntlrIndex         INTEGER,
            nw3xLogDrvIndex        INTEGER,
      nw3xTotalReads               Counter,
      nw3xTotalWrites              Counter,
      nw3xCorrReads                Counter,
      nw3xCorrWrites               Counter,
      nw3xFatalReads               Counter,
      nw3xFatalWrites              Counter
)

nw3xCntlrIndex     OBJECT-TYPE
      SYNTAX     INTEGER
      ACCESS     read-only
```

```
        STATUS     mandatory
        DESCRIPTION
                "COMPAQ Array Controller Index
                This maps the logical drives into their
                respective controllers. This controller index
                matches the controller group entries."
        ::= ( nw3xDriverStatEntry 1 )

nw3xLogDrvIndex      OBJECT-TYPE
        SYNTAX     INTEGER
        ACCESS     read-only
        STATUS     mandatory
        DESCRIPTION
                "COMPAQ Array Logical Drive Index
                This is the logical drive number which keeps
                track of multiple instances of logical drives
                which are on the same controller. For each
                controller index value, the logical drive index
                starts at 1 and increments for each logical
                drive."
        ::= ( nw3xDriverStatEntry 2 )

nw3xTotalWrites      OBJECT-TYPE
        SYNTAX     Counter
        ACCESS     read-only
        STATUS     mandatory
        DESCRIPTION
                        "COMPAQ Array Logical Drive Total Writes
                        This shows the total number of writes
                        performed by the IDA device driver to this
                        logical drive. This number is reset each
                        time the device driver is loaded for this
                        logical drive."
        ::= ( memoryModuleEntry 2 )

nw3xCorrReads    OBJECT-TYPE
        SYNTAX     Counter
        ACCESS     read-only
        STATUS     mandatory
        DESCRIPTION
                "COMPAQ Array Logical Drive Corrected Reads
                This is the total number of read commands sent
                to the specified logical drive which had to be
                corrected by fault tolerance. This number is
``` reset each time the device driver is loaded for this logical drive.

If the number of corrected reads is higher than normal for a particular system, check the physical drive screen for abnormal activity. There may be a problem with a drive. If you suspect that a problem exists, schedule server down time to run COMPAQ DIAGNOSTICS on the monitored system."
    ::= ( nw3xDriverStatEntry 5 )

nw3xCorrWrites OBJECT-TYPE
    SYNTAX    Counter
    ACCESS    read-only
    STATUS    mandatory
    DESCRIPTION
        "COMPAQ Array Logical Drive Corrected Writes
        This is the total number of write commands sent to the specified logical drive which had to be corrected by fault tolerance. This number is reset each time the device driver is loaded for this logical drive.

If the number of corrected writes is higher than normal for a particular system, check the physical drive screen for abnormal activity. There may be a problem with a drive. If you suspect that a problem exists, schedule server down time to run `COMPAQ DIAGNOSTICS on the monitored system."
    ::= ( nw3xDriverStatEntry 6 )

nw3xFatalReads OBJECT-TYPE
    SYNTAX    Counter
    ACCESS    read-only
    STATUS    mandatory
    DESCRIPTION
        "COMPAQ Array Logical Drive Fatal Reads
        This is the total number of read commands sent to the specified logical drive which failed.

This number is reset each time the device driver is loaded for this logical drive.

The drive array was unable to correct these reads. Check the drive status to see if any of the drives have failed. If a drive has failed you will need to replace the drive."
::= ( nw3xDriverStatEntry 7 )

nw3xFatalWrites     OBJECT-TYPE
    SYNTAX     Counter
    ACCESS     read-only
    STATUS     mandatory
    DESCRIPTION
        "COMPAQ Array Logical Drive Fatal Writes
        This is the total number of write commands sent to the specified logical drive which failed. This number is reset each time the device driver is loaded for this logical drive.

The drive array was unable to correct these writes. Check the drive status to see if any of the drives have failed. If a drive has failed you will need to replace the drive."
    ::= ( nw3xDriverStatEntry 8 )

©1992 Compaq Computer Corporation

Figures 1, 7C:
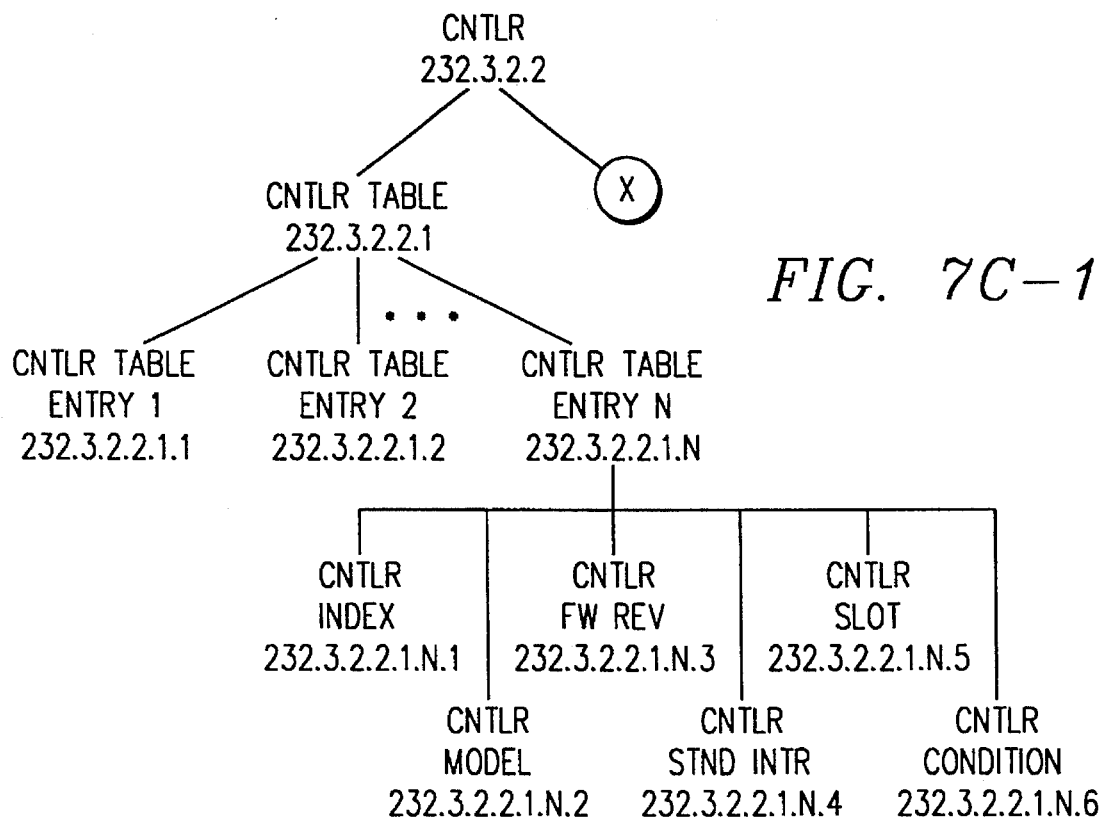
Figures 2, 7C:
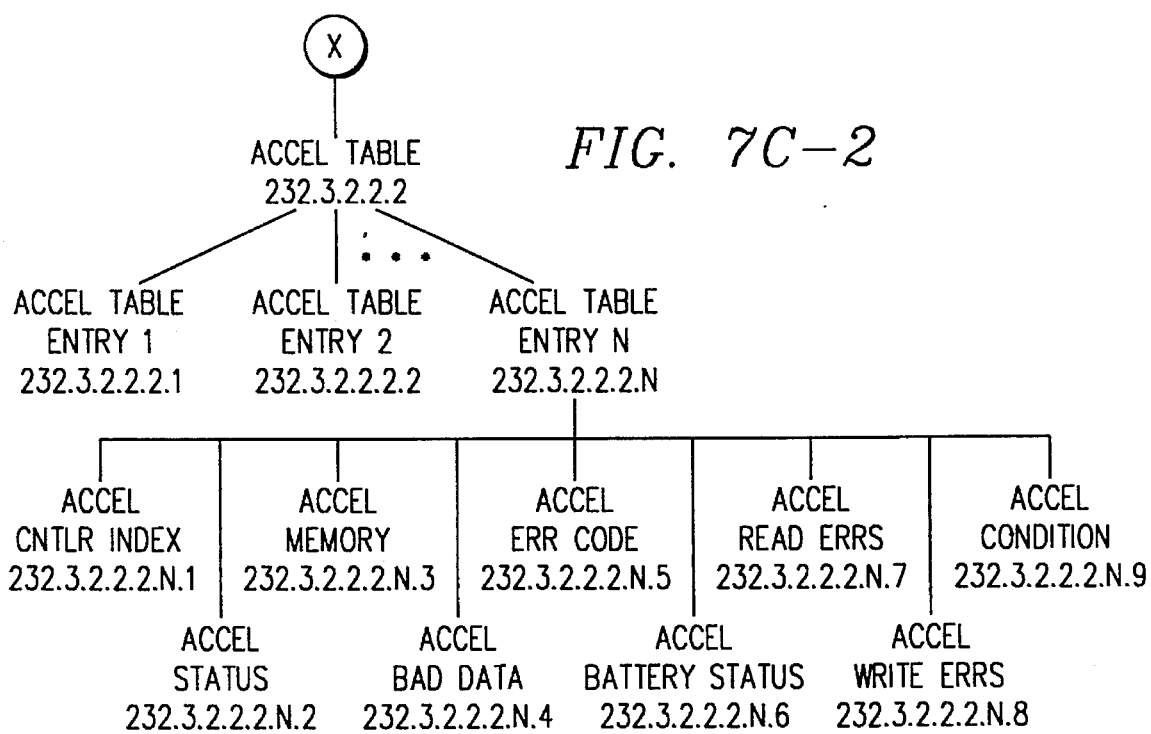

No referring specifically to FIG. 7C-2, the volume map table for the osNetWare3x group includes N entries, each including a controller index object located at branch 232.3.2.1.1.6.N.1, a logical drive index object located at branch 232.3.2.1.1.6.N.2 and a volume map located at branch 232.3.2.1.1.6.N.3. The formal organization of the volume map table is as follows:

```
nw3xVolMapTable    OBJECT-TYPE
    SYNTAX       SEQUENCE OF Nw3xVolMapEntry
    ACCESS       not-accessible
    STATUS,      mandatory
    DESCRIPTION
        "Volume Map Table
        This is a table of NetWare volumes which map
        into the logical drives."
    : := ( osNetWare3x 6 )
nw3xVolMapEntry    OBJECT-TYPE
    SYNTAX       Nw3xVolMapEntry
    ACCESS       not-accessible
    STATUS       mandatory
    DESCRIPTION
        "Volume Map Table Entry
        One entry in the volume map table. Each entry
        represents a logical drive for which the volume
        map is kept."
    INDEX        ( nw3xVolCntlrIndex,
                   nw3xVolLogDrvIndex )
    : := ( nw3xVolMapTable 1 )
Nw3xVolMapEntry    : := SEQUENCE
    (
        nw3xVolCntlrIndex          INTEGER,
        nw3xVolLogDrvIndex         INTEGER,
        nw3xVolMap                 OCTET STRING
    )
nw3xVolCntlrIndex    OBJECT-TYPE
    SYNTAX       INTEGER
    ACCESS       read-only
    STATUS       mandatory
    DESCRIPTION
        "COMPAQ Array Controller Index
        This maps the logical drives into their
        respective controllers. This controller index
        matches the controller group entries."
    : := ( nw3xVolMapEntry 1 )
nw3xVolLogDrvIndex       OBJECT-TYPE
    SYNTAX       INTEGER
    ACCESS       read-only
    STATUS       mandatory
    DESCRIPTION
        "COMPAQ Array Logical Drive Index
        This is the logical drive number which keeps
        track of multiple instances of logical drives
        which are on the same controller. For each
        controller index value, the logical drive index
        starts at 1 and increments f or each logical
        drive."
    : := ( nw3xVolMapEntry 2 )
nw3xVolMap         OBJECT-TYPE
    SYNTAX       OCTET STRING (SIZE (0 . . . 255))
    ACCESS       read-only
    STATUS       mandatory
    DESCRIPTION
        "NetWare Volume Map
        This is a data structure containing the volume
        mappings for this logical drive. There are 8
        entries in a volume mapping. Each entry has
        the following format. An entry can be null
        indicating no mapping exists.
                    BYTE      Name(16)
                    BYTE      Segment"
    : := ( nw3xVolMapEntry 3 )
```

©1992 Compaq Computer Corporation

Referring next to FIGS. 7C-1 through 7C-2, the controller child group located at branch 232.3.2.2 will now be described in greater detail. The controller group, which contains the configuration and statistical information relating to the drive array controllers and controller accelerator boards, includes a controller table located at branch 232.3.2.2.1 and an accelerator table located at branch 232.3.2.2.2. The controller table includes an entry N for each controller installed in the system. For each entry N, the controller table includes 6 objects, an index object located at branch 232.3.2.2.1.N.1, a model object located at branch 232.3.2.2.1.N.2, a firmware revision object located at branch 232.3.2.2.1.N.3, a standard interface object located at branch 232.3.2.2.1.N.4, a slot object located at branch 232.3.2.2.1.N.5 and a condition object located at branch 232.3.2.2.1.N.6. The formal organization of the controller table is as follows:

at branch 232.3.2.2.1.N.6. The formal organization of the controller table is as follows:

```
cntlrTable      OBJECT-TYPE
     SYNTAX     SEQUENCE OF CntlrEntry
     ACCESS     not-accessible
     STATUS     mandatory
     DESCRIPTION
          "COMPAQ Array Controller Table
          A table of controller entries."
     ::= ( cntlr 1 )

cntlrEntry      OBJECT-TYPE
     SYNTAX     CntlrEntry
     ACCESS     not-accessible
     STATUS     mandatory
     DESCRIPTION
          "COMPAQ Array Controller Entry
          A controller entry."
     INDEX      ( cntlrIndex )
     ::= ( cntlrTable 1 )

CntlrEntry       ::= SEQUENCE
(
     cntlrIndex          INTEGER,
     cntlrModel          INTEGER,
     cntlrFWRev          DisplayString,
     cntlrStndIntr       INTEGER,
     cntlrSlot           INTEGER,
     cntlrCondition      INTEGER
)

cntlrIndex OBJECT-TYPE
     SYNTAX     INTEGER
     ACCESS     read-only
     STATUS     mandatory
     DESCRIPTION
               "COMPAQ Array Controller Index
               This value is a logical number whose
          meaning is OS
               dependent. Each physical controller has
one unique
               controller number associated with it."
     ::= ( cntlrEntry 1 )
```

```
cntlrModel      OBJECT-TYPE
    SYNTAX      INTEGER
    (
        other(1),
        ida(2),
        idaExpansion(3),
        ida-2(4)
    )
    ACCESS      read-only
    STATUS      mandatory
    DESCRIPTION
        "COMPAQ Array Controller Module
        The type of controller card.  The valid types
        are:
```

IDA (2)            COMPAQ 32-Bit Intelligent Drive Array Controller. The physical drives are located inside the system.

IDA Expansion (3)    COMPAQ 32-Bit Intelligent Drive Array Expansion Controller. The physical drives are located in the Array Expansion System that is connected to the system by a cable.

IDA - 2 (4)       COMPAQ Intelligent Drive Array Controller-2 (IDA-2). The physical drives are located inside the system Other (1)         You may need to upgrade your driver software and/or instrument agent(s). You have a drive array controller in the system that the instrument agent does not recognize."

::= ( cntlrEntry 2 )

cntlrFWRev    OBJECT-TYPE
    SYNTAX    DisplayString (SIZE (0..5))
    ACCESS    read-only
    STATUS    mandatory
    DESCRIPTION
        "COMPAQ Array Controller Firmware Revision
        The firmware revision of the COMPAQ Drive Array
        Controller. This value can be used to help
        identify a particular revision of the
        controller."
    ::= ( cntlrEntry 3 )

cntlrStndIntr    OBJECT-TYPE
    SYNTAX    INTEGER
    (
        other(1),
        primary(2),
        secondary(3),
        disabled(4)
        unavailable(5)
    )
    ACCESS    read-only
    STATUS    mandatory
    DESCRIPTION
        "The status of the Standard Interface Revision The standard Interface is how DOS communicates
        with a drive. Run the COMPAQ EISA
        Configuration Utility to change the Standard
        Interface setting.

The following values are valid for Standard
        Interface:

Unavailable (5)    This controller does
                               not support a
                               Standard Interface.
                               DOS cannot access
                               these drives. For

|  |  |
|---|---|
|  | example, the COMPAQ 32-Bit Intelligent Drive Array Expansion Controller does not support a Standard Interface. |
| Disabled (4) | The Standard Interface is not enabled for communication. DOS will not be able to access these drives. |
| Primary (2) | The Standard Interface is using the primary address for communication. DOS can access this drive and use this drive as the primary boot device if it has been configured for this purpose. |
| Secondary (3) | The Standard Interface is using the secondary address for communication. DOS can access these drives, but cannot boot from them. |
| Other (1) | The device driver may not be loaded for this controller. The instrument agent could not read the information from the device. Please load the device driver." |

```
    ::= ( cntlrEntry 4 )

cntlrSlot OBJECT-TYPE
    SYNTAX      INTEGER
```

```
    ACCESS     read-only
    STATUS     mandatory
    DESCRIPTION
        "COMPAQ Array Controller Slot This identifies the physical slot where the
        COMPAQ Array Controller resides in the system.
        For example, if this value is three, then the
        COMPAQ Array Controller is located in the slot
        three of your computer."
    ::= ( cntlrEntry 5)

cntlrCondition OBJECT-TYPE
    SYNTAX     INTEGER
    (
        other(1),
        ok(2),
        degraded(3),
        failed(4)
    )
    ACCESS     read-only
    STATUS     mandatory
    DESCRIPTION
        "The condition of the device.  This value
        represents the overall condition of this
        controller, and any associated logical drives,
        physical drives, and array accelerators."
    ::= ( cntlrEntry 6)
```

©1992 Compaq Computer Corporation

Similarly, the accelerator table includes an entry N for each accelerator installed in the system. For each entry N, the accelerator table includes 9 objects, an controller index object located at branch 232.3.2.2.2.N.1, a status object located at branch 232.3.2.2.2.N.2, a memory object located at branch 232.3.2.2.2.N.3, a bad data object located at branch 232.3.2.2.2.N.4, an error code object located at branch 232.3.2.2.2.N.5, a battery status object located at branch 232.3.2.2.2.N.6, a read errors status located at branch 232.3.2.2.2.N.7, a write errors object located at branch 232.3.2.2.2.N.8 and a condition object located at branch 232.3.2.2.2.N.9. The formal organization of the accelerator table is as follows:

```
accelTable      OBJECT-TYPE
    SYNTAX      SEQUENCE OF AccelEntry
    ACCESS      not-accessible
    STATUS      mandatory
    DESCRIPTION
        "Array Accelerator Board Table A table of accelerator board entry."
    ::= ( cntlr 2 )

accelEntry      OBJECT-TYPE
    SYNTAX      AccelEntry
    ACCESS      not-accessible
    STATUS      mandatory
    DESCRIPTION
        "Array Accelerator Board An accelerator board entry."
    INDEX       ( acelCntlrIndex )
    ::= ( accelTable 1 )

AccelEntry      ::= SEQUENCE
(
    accelcntlrIndex            INTEGER,
    accelStatus                INTEGER,
    accelMemory                INTEGER,
    accelBadData               INTEGER,
    accelErrCode               INTEGER,
    accelBatteryStatus         INTEGER,
    accelReadErrs              Counter,
    accelWriteErrs             Counter,
    accelCondition             INTEGER accelCntlrIndex    OBJECT-TYPE
    SYNTAX      INTEGER
    ACCESS      read-only
    STATUS      mandatory
    DESCRIPTION
        "Array Accelerator Board Controller Index
```

This value is a logical number whose meaning is OS dependent. The value has a direct mapping to the controller table index such that controller 'i' has accelerator table entry 'i'."
    ::= ( accelEntry 1 )

accelStatus    OBJECT-TYPE
    SYNTAX    INTEGER
    (
        other(1),
        invalid(2),
        enabled(3),
        tmpDisabled(4)
        permDisabled(5)
    )
    ACCESS    read-only
    STATUS    mandatory
    DESCRIPTION
        "Array Accelerator Board Status This describes the status of the COMPAQ 4MB Array Accelerator Write Cache.

This status can be:

| | |
|---|---|
| Enabled (3) | Indicates that write cache operates are currently configured and enabled for least one logical drive. |
| Temporarily Disabled (4) | Indicates that write cache operations have been temporarily disabled. View the Array Accelerator Board Error Code object instance to determine why | the write cache operations [handwritten: operations] have been temporarily disabled.

Permanently Disabled (5)   Indicates that write cache operations have been permanently disabled. View the Array Accelerator Board Error Code object instance to determine why the write cache operations have been disabled.

Invalid (2)   Indicates that an Array Accelerator board has not been installed in this system.

Other (1)   Indicates that the instrument agent does not recognize the status of the Array Accelerator. You may need to upgrade the instrument agent."

::= ( accelEntry 2 )

accelMemory   OBJECT-TYPE
    SYNTAX   INTEGER
    ACCESS   read-only
    STATUS   mandatory
    DESCRIPTION
        "Write Cache Memory Revision This shows the amount of memory allocated for the write cache in kilobytes. Because data is kept in duplicate (mirrored), the actual amount of usable memory is half the amount shown."
::= ( accelEntry 3 )

```
accelBadData    OBJECT-TYPE
    SYNTAX    INTEGER
    (
        other(1),
        none(2),
        possible(3),
    )
    ACCESS    read-only
    STATUS    mandatory
    DESCRIPTION
        "Array Accelerator Board Bad Data
```

The following values are valid:

Possible (3)    Indicates that at power up, the battery packs were not sufficiently charged. Because the batteries did not retain sufficient charge when the system resumed power, the board has not retained any data that may have been stored. If no data was on the board, no data was lost. Several things may have caused this condition:

If the system was without power for eight days, and the battery packs were on (battery packs only activate if system looses power unexpectedly), any data that may have been stored in the batteries was lost.

|  |  |
|---|---|
|  | There may be a problem with the battery pack. See the Battery Status for more information. |
|  | This message will also appear is the Array Accelerator board is replaced with a new board that has discharged batteries. No data has been lost in this case, and posted writes will automatically be enabled when the batteries reach full charge. |
| None (2) | Indicates that no data loss occurred. At power up, the battery packs were properly charged. |

```
     ::= ( accelEntry 4 )

accelErrCode    OBJECT-TYPE
    SYNTAX    INTEGER
    (
        other(1),
        invalid(2),
        badConfig(3),
        lowBattery(4),
        disembleCmd(5),
        noResources(6),
        notConnected(7),
        badMirrorData(8),
        readErr(9),
        writeErr(10),
        configCmd(11)
    )
    ACCESS    read-only
    STATUS    mandatory
    DESCRIPTION
        "Array Accelerator Board Error Code Use this to determine the status of the write
        cache operations.
```

The status can be:

Invalid (2) — Indicated that write cache operations are currently configured and enabled for at least one logical drive. No write cache errors have occurred.

Bad Configuration (3) — Indicates that write cache operations are temporarily disabled. The Array Accelerator board was configured for a different controller. This error could be caused if boards were switched from one system to an other. Return the COMPAQ EISA Configuration Utility and insure that the board has been properly configured for this system. Note: If data from another system was stored on the board, rerunning EISA Configuration will cause the data to be lost.

Low Battery Power (4) — Indicates that write cache operations are temporarily disabled due to insufficient battery power. Please view the Batter Status object instance for more information.

| | |
|---|---|
| Disable Command Issued (5) | Indicates that write cache operations are temporarily disabled. The device driver issues this command when the server is taken down. This condition should not exist when the system regains power. |
| No Resources Available (6) | Indicates that write cache operations are temporarily disabled. The controller does not have sufficient resources to perform write cache operations. For example, when a replaced drive is being rebuilt, there will not be sufficient resources. Once the operation that requires the resources has completed, this condition will clear and write cache operations will resume. |
| Board Not Connected (7) | Indicates that write cache operations are temporarily disabled. The Array Accelerator board has been configured but is not currently attached to the controller. Check the alignment of the board and connections. |

| | |
|---|---|
| Bad Mirror Data (8) | Indicates that write cache operations have been permanently disabled. The Array Accelerator board stores mirrored copies of all data. If data exists on the board when the system is first powered up, the board performs a data compare test between the mirrored copies. If the data does not match, an error has occurred. Data may have been lost. Your board may need servicing. |
| Read Failure (9) | Indicates that write cache operations have been permanently disabled. The Array Accelerator board stores mirror copies of all data. While reading the data from the board, memory parity errors have occurred. both copies were corrupted and cannot be retrieved. Data has been lost, and you should service the board. |
| Write Failure (10) | Indicates that write cache operations have been permanently disabled. This error occurs when an unsuccessful attempt was made to write | data to the Array Accelerator board. Data could not be written to write cache memory in duplicate due to the detection of parity errors. This error does not indicate data loss. You should service the Array Accelerator board.

Config Command (11) Indicates that write cache operations have been permanently disabled. The configuration of the logical drives has changed. you need to reconfigure the Array Accelerator board.

Other Indicates that the instrument agent does not recognize the error code. You may need to update your software."

```
        ::= ( accelEntry 5)

accelBatteryStatus   OBJECT-TYPE
    SYNTAX     INTEGER
    (
        other(1),
        ok(2),
        recharging(3),
        failed(4)
        degraded(5)
    )
    ACCESS     read-only
    STATUS     mandatory
    DESCRIPTION
        "Battery Status
```

This monitors the status of each battery pack on the board. The batteries can only recharge when the system is powered on The following values are valid:

ok (2)           Indicates that a particular battery pack is fully charged.

Failed (4)      The battery pack is below the sufficient voltage level and has not recharged in 36 hours. Your Array Accelerator board needs to be serviced.

Charging (3)    The battery power is less than 75%. The Drive Array Controller is attempting to recharge the battery. A battery can take as long as 36 hours to fully recharge. After 36 hours, if the battery has not recharged, it is considered failed.

Degraded (5)    The battery is still operating, however, one of the batteries in the pack has failed to recharge properly. Your Array Accelerator board should be serviced as soon as possible.

Other (1)       Indicates that the instrument agent does not recognize battery status. You may need to update your software."

::= ( accelEntry 6 )

```
accelReadErrs  OBJECT-TYPE
    SYNTAX      Counter
    ACCESS      read-only
    STATUS      mandatory
    DESCRIPTION
        "Read Errors This show the total number of read memory
        parity errors that were detected while reading
        from the Array Accelerator board. The mirrored
        copy of data on the board can be accessed to
        obtain correct data if a parity errors occurs.

Memory parity errors occur when the system
        detects that information has not been
        transferred correctly. A parity bit is
        included for each byte of information stored in
        memory. When the microprocessor reads or
        writes data, the system counts the value of the
        bits in each byte. If the total does not match
        the system's corruption, or lack of refresh may
        cause memory parity errors."
    ::- (accelEntry 7)

accelWriteErrs  OBJECT-TYPE
    SYNTAX      Counter
    ACCESS      read-only
    STATUS      mandatory
    DESCRIPTION
        "Write Errors This shows the total number of write memory
        parity errors that were detected while writing
        to the Array Accelerator board.

Write parity errors occur when the system
        detects that information has not been
        transferred to the Array Accelerator
        board correctly. A parity bit is included for
        each byte of information stored in memory.
        When the microprocessor reads or writes data,
        the system counts the value of the bits in each
        byte. If the total does not match the system's
        expectations, a parity error has occurred."
    ::= ( accelEntry 8 )
```

```
accelCondition OBJECT-TYPE
    SYNTAX    INTEGER
    (
        other(1)
        ok(2)
        degraded(3)
        failed(4)
    )
    ACCESS    read-only
    STATUS    mandatory
    DESCRIPTION
        "The condition of the device.  This value
        represents the overall condition of this array
        accelerator."
    ::= ( accelEntry 9 )
```

©1992 Compaq Computer Corporation

Figure 7E:
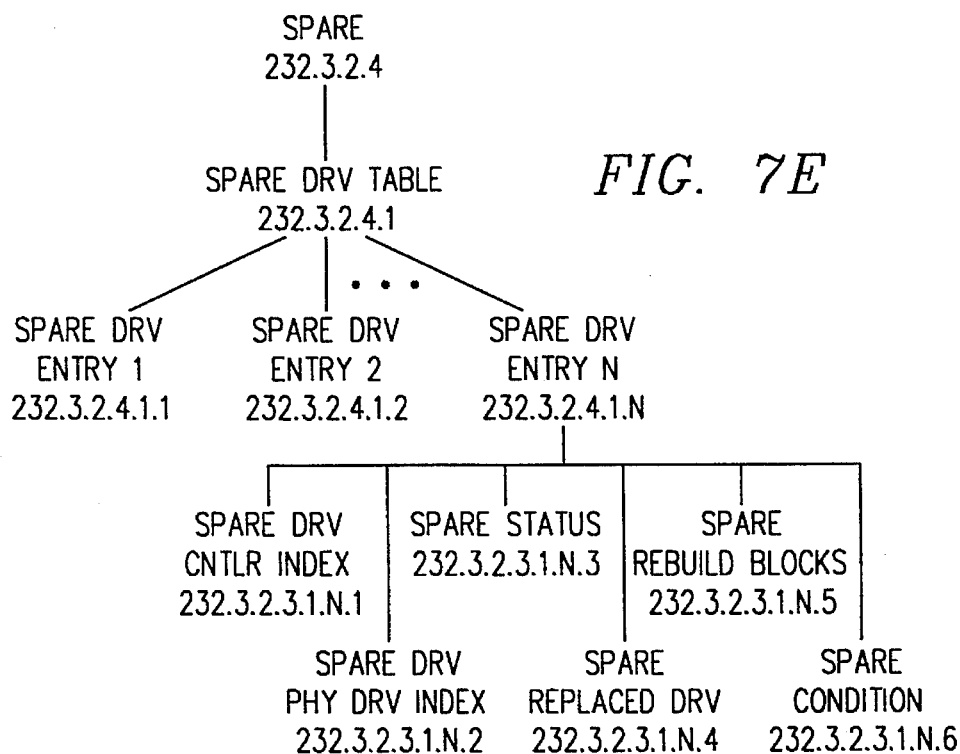
FIG. 7E is an inheritance tree illustrating a spare drive child group of the component group of the subMIB of FIG. 7A.
Figure 7D:
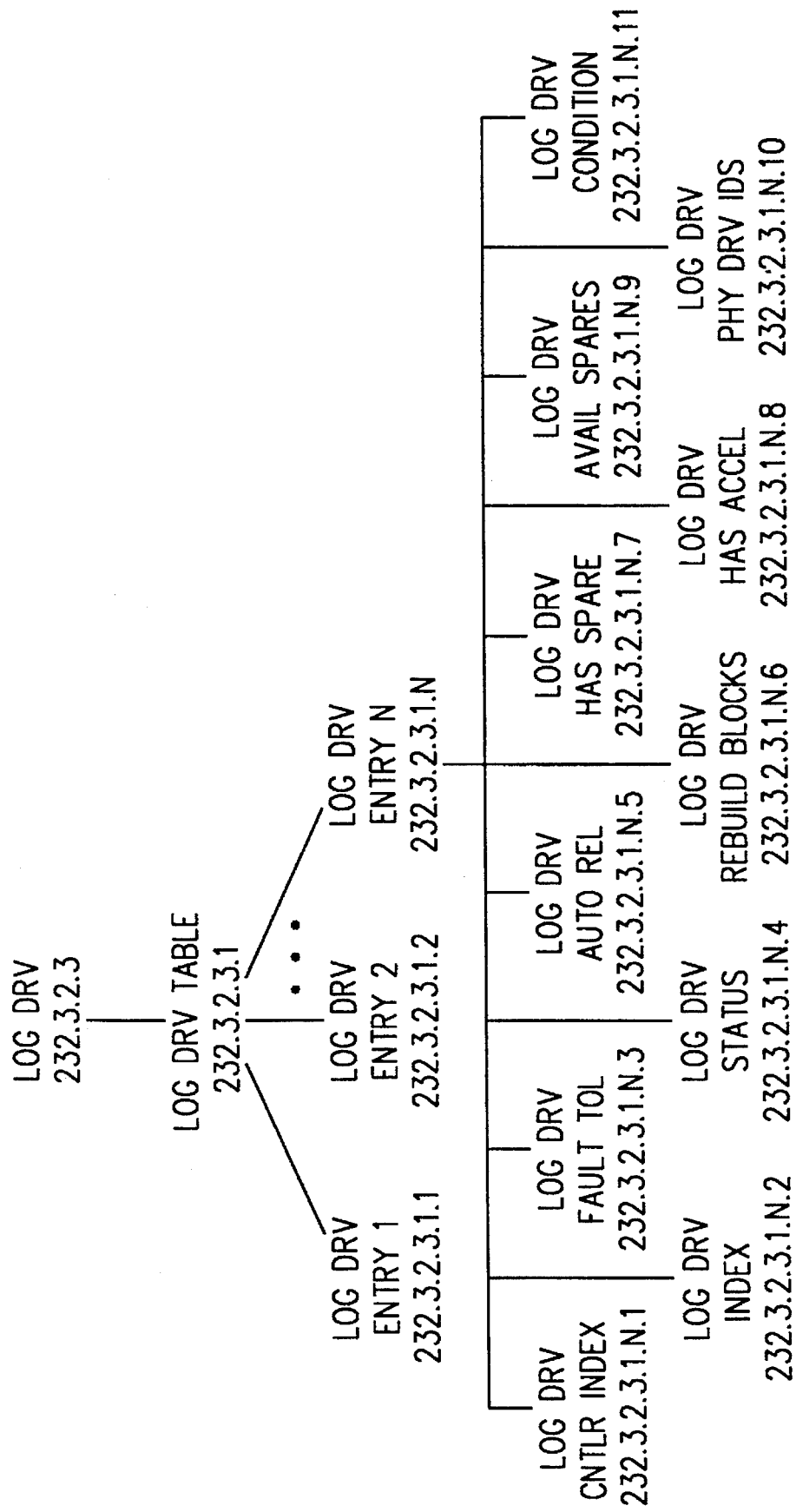
FIG. 7D is an inheritance tree illustrating a logical drive child group of the component group of the subMIB of FIG. 7A.

Referring next to FIG. 7D, the logical drive child group located at branch 232.3.2.3 will now be described in greater detail. The logical drive child group contains configuration and statistical information regarding the logical drives associated with the drive array controller in the form of objects which describe the size, status, fault tolerance and other characteristics of the logical drives of the array. More specifically, the logical drive child group contains a logical drive table located at branch 232.3.2.3.1. The logical drive table includes an entry N for each logical drive associated with the drive array. and, for each entry N, the logical drive table includes a controller index object located at branch 232.3.2.3.1.N.1, a drive index object located at branch 232.3.2.3.1.N.2, a fault tolerance object located at branch 232.3.2.3.1.N.3, a status object located at branch 232.3.2.3.1.N.4, an auto reliability object located at branch 232.3.2.3.1.N.5, a rebuild blocks available object located at branch 232.3.2.3.1.N.6, an accelerator board object located at branch 232.3.2.3.1.N.7, an available spares object located at branch 232.3.2.3.1.N.8, a drive size object located at branch 232.3.2.3.1.N.9, a physical drive ID located at branch 232.3.2.3.1.N.10 and a drive condition object located at branch 232.3.2.3.1.N.11. The formal organization of the logical drive table is as follows:

```
logDrvTable          OBJECT-TYPE
    SYNTAX      SEQUENCE OF LogDrvEntry
    ACCESS      not-accessible
    STATUS      mandatory
    DESCRIPTION
        "Drive Array Logical Drive Table A table of logical drive entries."
    ::= ( logDrv 1 )

logDrvEntry          OBJECT-TYPE
    SYNTAX      LogDrvEntry
    ACCESS      not-accessible
    STATUS      mandatory
    DESCRIPTION
        "Drive Array Logical Drive Entry A logical drive entry."
    INDEX       ( logDrvCntlrIndex,
                logDrvIndex )
    ::= ( logDrvTable 1 )

LogDrvEntry    ::=SEQUENCE
(
    logDrvCntlrIndex     INTEGER,
    logDrvIndex          INTEGER,
    logDrvFaultTol       INTEGER,
    logDrvStatus         INTEGER,
    logDrvAutoRel        INTEGER,
    logDrvRebuildBlocks  Counter,
    logDrvHasAccel       INTEGER,
    logDrvAvailSpares    OCTET STRING,
    logDrvSize           INTEGER,
    logDrvPhyDrvIDs      OCTET STRING,
    logDrvCondition      INTEGER
```

)

```
logDrvCntlrIndex   OBJECT-TYPE
    SYNTAX     INTEGER
    ACCESS     read-only
    STATUS     mandatory
    DESCRIPTION
        "Drive Array Logical Drive Controller Index This maps the logical drives into their
        respective controllers. Controller index 'i'
        under the controller group owns the associated
        drives in the logical drive group which use
        that index."
    ::= ( logDrvEntry 1 )

logDrvIndex   OBJECT-TYPE
    SYNTAX     INTEGER
    ACCESS     read-only
    STATUS     mandatory
    DESCRIPTION
        "Drive Array Logical Drive Index This is the logical drive number which keeps
        track of multiple instances of logical drives
        which are on the same controller. For each
        controller index value, the logical drive index
        starts at 1 and increments for each logical
        drive."
    ::= ( logDrvEntry 2 )

logDrvFaultTol OBJECT-TYPE
    SYNTAX     INTEGER
    (
        other(1),
        none(2),
        mirroring(3),
        dataGuard(4),
        distribDataGuard(5)
    )
    ACCESS     read-only
    STATUS     mandatory
    DESCRIPTION
        "Logical Drive Fault Tolerance
```

This shows the fault tolerance mode of the logical drive. To change the fault tolerance mode, run the COMPAQ EISA Configuration Utility.

The following values are valid for the Logical Drive Fault Tolerance:

None (2)  Fault tolerance is not enabled. If a physical drive reports an error, the data cannot be recovered by the COMPAQ Drive Array Controller.

Mirroring (3)  For each physical drive, there is a second physical drive containing identical data. If a drive fails, the data can be retrieved from the mirror drive.

Data Guard (4)  One of the physical drives is used as a data guard drive and contains the exclusive OR of the data on the remaining drives. If a failure is detected, the COMPAQ Drive Array Controller rebuilds the data using the data guard information plus information from the other drives.

Distributed Data Guard (5)  Distributed Data Guarding, sometimes referred to as RAID 5, is similar to Data Guarding, but instead of storing the parity information on one drive, the information is distributed across all of the drives. If a failure is detected, the COMPAQ Drive Array Controller rebuilds the data using the data guard information from all the drives."

```
        ::= ( logDrvEntry 3 )

logDrvStatus    OBJECT-TYPE
    SYNTAX      INTEGER
    (
        other(1),
        ok(2),
        failed(3),
        unconfigured(4),
        recovering(5),
        readyForRebuild(6),
        rebuilding(7),
        wrongDrive(8),
        badConnect(9),
        overheating(10),
        shutdown(11)
    )
    ACCESS      read-only
    STATUS      mandatory
    DESCRIPTION
        "Logical Drive Status
```

The logical drive can be in one of the following states:

| | |
|---|---|
| ok (2) | Indicates that the logical drive is in normal operation mode. |

| | |
|---|---|
| Failed (3) | Indicates that more physical drives have failed than the fault tolerance mode of the logical drive can handle without data loss. |
| Unconfigured (4) | Indicates that the logical drive is not configured. |
| Recovering (5) | Indicates that the logical drive is using Interim Recovery Mode. In Interim Recovery Mode, at least one physical drive has failed, but the logical drive's fault tolerance mode lets the drive continue to operate with no data loss. |
| Ready Rebuild (6) | Indicates that the logical drive is ready for Automatic Data Recovery. During Automatic Data Recovery, fault tolerance algorithms restore data to the replacement drive. |
| Wrong Drive (8) | Indicates that the wrong physical drive was replaced after a physical drive failure. |
| Bad Connect (9) | Indicates that a physical drive is not responding. |

| | |
|---|---|
| Overheating | Indicates that the drive array enclosure that contains the logical drive is overheating. The drive array is still functioning, but should be shutdown. |
| Shutdown (11) | Indicates that the drive array enclosure that contains the logical drive has overheated. The logical drive is no longer functioning." |

```
    ::= (logDrvEntry4 )

logDrvAutoRel   OBJECT-TYPE
    SYNTAX      INTEGER
    ACCESS      read-write
    STATUS      mandatory
    DESCRIPTION
        "COMPAQ Array Controller Logical Drive Auto-
        Reliability Delay This value indicates how many seconds the
        logical drive will wait with no requests before
        beginning Auto-Reliability Monitoring.  for
        example, the default value is five, sot he
        logical drive will begin Auto-Reliability
        Monitoring if it receives no requests for five
        seconds.  If the value is zero, the logical
        drive will not perform Auto-Reliability
        Monitoring.  Auto-Reliability only operates if
        the logical drive is configured in one of the
        fault tolerance modes If the logical drive receives a request while
        performing Auto Reliability Monitoring, the
        drive will stop performing Auto-Reliability
        Monitoring to process the request.  Once it has
        staisfied [satisfied] all incoming requests, the drive will
        wit for the Auto-Reliability Delay to expire
``` before returning to Auto-Reliability Monitoring.

Auto-Reliability Monitoring is a process to insure the highest level of data reliability. In this process each disk is scanned to verify that all of the sectors in the drive array are readable. If the auto-Reliability Monitoring process detects any bad sectors on the drives, it automatically remaps these bad sectors where possible."
::= ( logDrvEntry 5 )

logDrvRebuildingBlocks    OBJECT-TYPE
    SYNTAX    Counter
    ACCESS    read-only
    STATUS    mandatory
    DESCRIPTION
        "Logical Drive Rebuild Blocks Left After a failed physical drive has been replaced, the physical drive must have its data rebuilt. This value show how many blocks of data still need to be rebuilt. When the value reaches zero, the rebuilding process is complete. The drive array continues to operate in interim recovery mode while a drive is rebuilding.

This value is only valid if the Logical Drive Status is rebuilding (7)."
::= ( logDrvEntry 6)

logDrvHasAccel OBJECT-TYPE
    SYNTAX    INTEGER
    (
        other(1),
        unavailable(2),
        enabled(3),
        disabled(4)
    )
    ACCESS    read-only
    STATUS    mandatory
    DESCRIPTION
        "Logical Drive Has Array Accelerator Board This indicates whether the logical drive has an Array Accelerator board configured and enabled. The following values are valid:

| | |
|---|---|
| Enabled (3) | Indicates that the Array Accelerator board is configured and enabled for this logical drive. Run the COMPAQ EISA Configuration Utility to change this value. |
| Disabled (4) | Indicates that the Array Accelerator board is configured but not enabled for this logical drive. Run the COMPAQ EISA Configuration Utility to change this value. |
| Unavailable (2) | Indicates that there is no Array Accelerator board configured for this logical drive. |
| Other (1) | Indicates that the instrument agent does not recognize the Array Accelerator board. You may need to upgrade your software." |

```
    ::= ( logDrvEntry 7 )

logDrvAvailSpares   OBJECT-TYPE
    SYNTAX    OCTET STRING
    ACCESS    read-only
    STATUS    mandatory
    DESCRIPTION
        "Drive Array Logical Drive Available Spares
```

This indicates if this logical drive has one or more spares designated for it that are not currently in use by another drive. Each octet present will be a physical drive ID that is an available spare for this logical drive. These are the same ID's which can be used as indexes into the physical drive table. An octet string of length zero indicates that there are no available spares for this logical drive."
::= ( logDrvEntry 8 )

logDrvSize     OBJECT-TYPE
    SYNTAX     INTEGER
    ACCESS     read-only
    STATUS     mandatory
    DESCRIPTION
        "Logical Drive Size This is the size of the logical drive in megabytes. This value is calculated using the value 1,048,576 (2^20) as a megabyte. Drive manufacturers sometimes use the number 1,000,000 as a megabyte when giving drive capacities so this value may differ from the advertised size of a drive."
    ::= ( logDrvEntry 9 )

logDrvPhyDrvIDs     OBJECT-TYPE
    SYNTAX     OCTET STRING
    ACCESS     read-only
    STATUS     mandatory
    DESCRIPTION
        "Drive Array Logical Drive Physical Drive IDs This lists the physical drive IDs which are associated with this logical drive. These are the same IDs which can be used as indices into the physical drive table. Each byte of the string is an index."
    ::= ( logDrvEntry 10 )

logDrvcondition     OBJECT-TYPE
    SYNTAX     INTEGER
    (
        other(1),

```
        ok(2),
        degraded(3),
        failed(4)
)
ACCESS    read-only
STATUS    mandatory
DESCRIPTION
        "The condition of the device.  This value
        represents the overall condition of this
        logical drive and any associated physical
        drives."
::= ( logDrvEntry 11 )
```

©1992 Compaq Computer Corporation

Referring next to FIG. 7E, the spare drive child group located at branch 232.3.2.4 will now be described in greater detail. The spare drive group contains statistical and configuration information regarding the spare drives associated with the drive array controller in the form of objects which describe the spare drive or drives that may be present on an external IDA. Spare drives are available for any particular logical drive until allocated for use. Examples of information which would be contained in the objects of the spare drive child group include status of spare drive (other, failed, inactive building or active), and the identity of the physical drive which the spare drive is replacing. More specifically, the spare drive group located at branch 232.3.2.4 contains a spare drive table at branch 232.3.2.4.1. The spare drive table includes an entry N for each spare drive associated with the drive array and, for each entry N, the spare drive table includes a controller index object located at branch 232.3.2.4.1.N.1, a drive index object located at branch 232.3.2.4.1.N.2, a status object located at branch 232.3.2.4.1.N.3, a replaced drive object located at branch 232.3.2.4.1.N.4, a rebuild blocks object located at branch 232.3.2.4.1.N.5 and a spare condition object located at branch 232.3.2.4.1.N.6. The formal organization of the spare drive child group is as follows:

```
sparerTable         OBJECT-TYPE
    SYNTAX          SEQUENCE OF SpareEntry
    ACCESS          not-accessible
    STATUS          mandatory
    DESCRIPTION
        "Drive Array Spare Table
        A table of spare entries."
    : := ( spareDrv 1 )
spareEntry          OBJECT-TYPE
    SYNTAX          SpareEntry
    ACCESS          not-accessible
    STATUS          mandatory
    DESCRIPTION
        "Drive Array Spare Entry
        An entry in the spare table."
    INDEX           ( spareCntlrIndex,
                      sparePhyDrvIndex )
    : := ( sparerTable 1 )
SpareEntry          : := SEQUENCE
(
    spareCntlrIndex     INTEGER,
    sparePhyDrvIndex    INTEGER,
    spareStatus         INTEGER,
    spareReplacedDrv    INTEGER,
    spareRebuildblocks  Counter,
    spareCondition      INTEGER
)
spareCntlrIndex     OBJECT-TYPE
    SYNTAX          INTEGER
    ACCESS          read-only
    STATUS          mandatory
    DESCRIPTION
        "Drive Array Spare Controller Index
        This index maps the spare drive back to the
        controller to which it is attached. The value
        of this index is the same as the one used under
        the controller group."
    : := ( spareEntry 1 )
accelStatus         OBJECT-TYPE
    SYNTAX          INTEGER
    ACCESS          read-only
    STATUS          mandatory
    DESCRIPTION
        "Drive Array Spare Physical Drive Index
        This index maps to the physical drive it
        represents. The value of this index is the
        same as the one used with the physical drive
        table."
    : := ( spareEntry 2 )
spareStatus         OBJECT-TYPE
    SYNTAX          INTEGER
    (
        other(1),
        invalid(2),
        failed(3),
        inactive(4),
        building(5),
        active(6)
    )
    ACCESS          read-only
    STATUS          mandatory
    DESCRIPTION
        "Spare Status
        The following values are valid for the spare
        status:
            Building (5)    A physical drive has
                            failed. Automatic Data
                            Recovery is in progress to
                            recover data to the on-
                            line spare.
            Active (6)      A physical drive has
                            failed. Automatic Data
                            Recover is complete. The
                            system is using the on-
                            line spare as a
                            replacement for the failed
                            drive.
            Failed (3)      The on-line spare has
                            failed and is no longer
                            available for use.
            Inactive (4)    The monitored system has
                            an on-line spare
                            configured, but is not
                            currently in use."
    : := ( SpareEntry 3 )
spareReplacedDrv    OBJECT-TYPE
    SYNTAX          INTEGER
    ACCESS          read-only
    STATUS          mandatory
    DESCRIPTION
        "If the spare status is active (6), then this
        has the physical drive number of the replaced
        drive."
    : := (spareEntry 4 )
spareRebuildBlocks  OBJECT-TYPE
    SYNTAX          Counter
    ACCESS          read-only
    STATUS          mandatory
    DESCRIPTION
        "Drive Array Spare Number of Rebuild Blocks
Left
        If the spare status is building (5), then this
        is this is the number of blocks left to rebuild
        before completion.
        The data contained on the failed physical drive
        must be reconstructed from the fault tolerance
        data and copied to the spare so that the spare
        can function in place of the failed drive.
        When the number reaches zero, the building
        process is complete and the spare has replaced
        the physical drive."
    : := ( spareEntry 5)
spareCondition      OBJECT-TYPE
    SYNTAX          INTEGER
    (
        other(1),
        ok(2),
        degraded(3),
        failed(4)
    )
    ACCESS          read-only
    STATUS          mandatory
    DESCRIPTION
        "The condition of the device. This value
```

-continued

> represents the overall condition of this spare drive and any associated physical drives."
> := ( spareEntry 6)

©1992 Compaq Computer Corporation

Figure 7F:
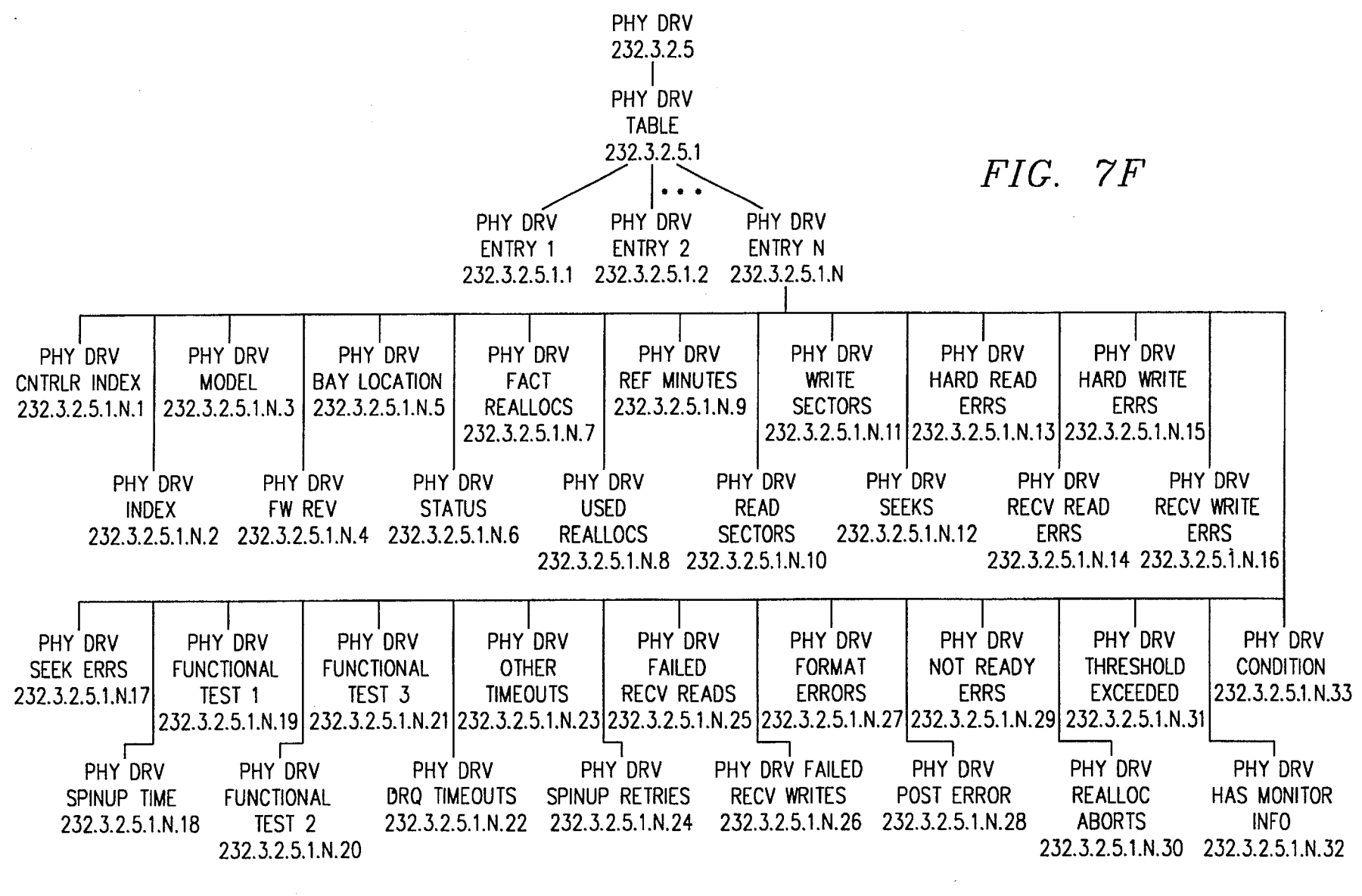

Referring next to FIG. 7F, the physical drive child group located at branch 232.3.2.5 will now be described in greater detail. The physical drive child group contains configuration and statistical information regarding the physical drives associated with the drive array controller in the form of objects that describe each individual spindle in the array. Examples of information which would be contained in the physical drive child group include drive model, firmware revision, bay offset, reallocation units available, reallocation units used, on-line performance test results. More specifically, the physical drive child group contains a physical drive table located at branch 232.3.2.5.1. The physical drive table includes an entry N for each physical drive associated with the drive array and, for each entry N, the physical drive table includes a controller index object located at branch 232.3.2.5.1.N.1, a drive index object located at branch 232.3.2.5.1.N.2, a model object located at branch 232.3.2.5.1.N.3, a firmware revision object located at branch 232.3.2.5.1.N.4, a bay location object located at branch 232.3.2.5.1.N.5, a status object located at branch 232.3.2.5.1.N.6, a factory reallocation object located at branch 232.3.2.5.1.N.7, a used reallocations object located at branch 232.3.2.5.1.N.8, a reference minutes object located at branch 232.3.2.5.1.N.9, a read sectors object located at branch 232.3.2.5.1.N.10, a write sectors object located at branch 232.3.2.5.1.N.11, a seeks object located at branch 232.3.2.5.1.N.12, a hard read errors object located at branch 232.3.2.5.1.N.13, a recovered read errors object located at branch 232.3.2.5.1.N.14, a hard write errors object located at branch 232.3.2.5.1.N.15, a recovered write errors object located at branch 232.3.2.5.1.N.16, a seek errors object located at branch 232.3.2.5.1.N.17, a spinup time object located at branch 232.3.2.5.1.N.18, first, second and third functional test objects located at branches 232.3.2.5.1.N.19, 232.3.2.5.1.N.20 and 232.3.2.5.1.N.21, respectively, a DRQ timeouts object located at branch 232.3.2.5.1.N.22, an other timeouts object located at branch 232.3.2.5.1.N.23, a spinup retries object located at branch 232.3.2.5.1.N.24, a recover failed read errors object located at branch 232.3.2.5.1.N.25, a recover failed write errors object located at branch 232.3.2.5.1.N.26, a format errors object located at branch 232.3.2.5.1.N.27, a power on self test error object located at branch 232.3.2.5.1.N.28, a drive not ready errors object located at branch 232.3.2.5.1.N.29, a reallocation abort object located at branch 232.3.2.5.1.N.30, a factory threshold exceeded object located at branch 232.3.2.5.1.N.31, a monitor information object located at branch 232.3.2.5.1.N.32 and a drive condition object located at branch 232.3.2.5.1.N.33. The formal organization of the physical drive table is as follows:

```
phyDrvTable     OBJECT-TYPE
    SYNTAX      SEQUENCE OF PhyDrvEntry
    ACCESS      not-accessible
    STATUS      mandatory
    DESCRIPTION
        "Drive Array Physical Drive Table A table of physical drive entry"
    ::- ( phyDrv 1 )

PhyDrvEntry     ::= SEQUENCE
(
    phyDrvCntlrIndex            INTEGER,
    phyDrvModel                 DisplayString,
    phyDrvFWRev                 DisplayString,
    phyDrvBayLocation           INTEGER,
    phyDrvstatus                INTEGER,
    phyDrvFactRealloc           INTEGER,
    phyDrvUsedRealloc           Counter,
    phyDrvRefMinutes            Counter,
    phyDrvReadSectors           Counter,
    phyDrvWriteSectors          Counter,
    phyDrvSeeks                 Counter,
    phyDrvHardReadErrs          Counter,
    phyDrvRecvReadErrs          Counter,
    phyDrvSeekErrs              Counter,
    phyDrvSpinupTime            INTEGER,
    phyDrvFunctionalTest1       Gauge,
    phyDrvFunctionalTest2       Gauge,
    phyDrvFunctionalTest3       Gauge,
```

```
    phyDrvDrqTimeouts         Counter,
    phyDrvOtherTimeouts       Counter,
    phyDrvSpinupRetries       Counter,
    phyDrvFailedRecvReads     Counter,
    phyDrvFailedRecWrites     Counter,
    phyDrvFormatErrors        Counter,
    phyDrvPostError           INTEGER,
    phyDrvDrvNotReadyErrs     Counter,
    phyDrvReallocAborts       Counter,
    phyDrvThresholdExceeded   INTEGER,
    phyDrvDrvHasMonitorInfo   INTEGER,
    phyDrvCondition           INTEGER phyDrvCntlrIndex    OBJECT-TYPE
    SYNTAX     INTEGER
    ACCESS     read-only
    STATUS     mandatory
    DESCRIPTION
        "Drive Array Physical Drive Controller Index This index maps the physical drive back to the
        controller to which it is attached.  The value
        of this index is the same as the one used under
        the controller group."
    ::= ( phyDrvEntry 1 )

phyDrvIndex     OBJECT-TYPE
    SYNTAX     INTEGER
    ACCESS     read-only
    STATUS     mandatory
    DESCRIPTION
        "Drive Array Physical Drive Index This index is used for selecting the physical
        drive table entry.  The index is the physical
        drive number based on the logical drive's drive
        assignment map."
    ::= ( phyDrvEntry 2 )

phyDrvModel     OBJECT-TYPE
    SYNTAX     DisplayString
    ACCESS     read-only
    STATUS     mandatory
    DESCRIPTION
        "Physical Drive Model
```

This is a test description of the physical drive. The text that appears depends upon who manufactured the drive and the drive type.

For example, you might see: COMPAQ 210MB CP3201.

If a model number is not present, you may not have properly initialized the drive array to which the physical drive is attached for monitoring. If you suspect that a problem exists, schedule server down time to run COMPAQ DIAGNOSTICS and select the Drive Monitoring Diagnostics option."
::= ( phyDrvEntry 3)

```
phyDrvModel    OBJECT-TYPE
     SYNTAX    DisplayString
     ACCESS    read-only
     STATUS    mandatory
     DESCRIPTION
          "Physical Drive Model
```

This is a test description of the physical drive. The text that appears depends upon who manufactured the drive and the drive type.

For example, you might see: COMPAQ 210MB CP3201.

If a model number is not present, you may not have properly initialized the drive array to which the physical drive is attached for monitoring. If you suspect that a problem exists, schedule server down time to run COMPAQ DIAGNOSTICS and select the Drive Monitoring Diagnostics option."
::= ( phyDrvEntry 3 )

```
phyDrvFWRev    OBJECT-TYPE
     SYNTAX    DisplayString (SIZE (0..8))
     ACCESS    read-only
     STATUS    mandatory
     DESCRIPTION
          "Physical Drive Firmware Revision
```

This shows the physical drive revision number.

If the firmware revision is not present, you have not properly initialized the drive array. If you suspect that a problem exists, schedule server down time to run COMPAQ DIAGNOSTICS and select the Drive Monitoring Diagnostics option."
::= ( phyDrvEntry 4 )

phyDrvBayLocation   OBJECT-TYPE
    SYNTAX      INTEGER
    ACCESS      read-only
    STATUS      mandatory
    DESCRIPTION
        "Physical Drive Bay Location This value matches the bay location where the physical drive has been installed. Each bay is labeled with a separate number so that you can identify the location of the drive."
::= ( phyDrvEntry 5 )

phyDrvStatus   OBJECT-TYPE
    SYNTAX      INTEGER
    (
        other(1),
        ok(2),
        failed(3)
    )
    ACCESS      read-only
    STATUS      mandatory
    DESCRIPTION
        "Physical Drive Status This shows the status of the physical drive.

The following values are valid for the physical drive status:

ok (2)          Indicates the drive is functioning properly.

Failed (3)   Indicates that the drive is no longer operating and should be replaced.

Other (1)   Indicates that the instrument agent does not recognize the drive. You may need to upgrade your software.

If you suspect a problem, run COMPAQ DIAGNOSTICS."
  ::= ( phyDrvEntry 6 )

phyDrvFactReallocs OBJECT-TYPE
    SYNTAX    INTEGER
    ACCESS    read-only
    STATUS    mandatory
    DESCRIPTION
        "Physical Drive Used Reallocated Sectors This shows the number of sectors of the reallocation area that have been used by the physical drive.

To see how many sectors were originally available for use in the reallocation area, refer to the factory reallocation information if it exists. Not all drives support factory reallocation.

Because of the nature of magnetic disks, certain sectors on a drive may have media defects. The reallocation area is part of the disk drive that the drive manufacturer sets aside to compensate for these defects. The drive array controller writes information addressed from these unusable sectors to available sectors in the reallocation area. If too many sectors have been reallocated, there may be a problem with the drive.

If you suspect a problem, schedule server down time to run COMPAQ DIAGNOSTICS and select the Drive Monitoring Diagnostics option to verify that a problem exists."
::= ( phyDrvEntry 8 )

phyDrvRefMinutes    OBJECT-TYPE
    SYNTAX     Counter
    ACCESS     read-only
    STATUS     mandatory
    DESCRIPTION
        "Reference Minutes This shows the total number of minutes that a physical drive has been spinning since the drive was stamped. The drive will have either been stamped when it left the factory or when you ran COMPAQ DIAGNOSTICS on your new drive. You can use the reference time to calculate rates for other physical drive events."
    ::= ( phyDrvEntry 9 )

phyDrvReadSectors    OBJECT-TYPE
    SYNTAX     Counter
    ACCESS     read-only
    STATUS     mandatory
    DESCRIPTION
        "Sectors Read This shows the total number of sectors read from the physical disk drive.

This information may be useful for determining rates. For instance, if you wanted to calculate the average number of reads per minute of operation, divide this number by the reference minutes."
    ::= (phyDrvEntry 10 )

phyDrvWriteSectors    OBJECT-TYPE
    SYNTAX     Counter
    ACCESS     read-only
    STATUS     mandatory
    DESCRIPTION
        "Sectors Written This shows the total number of sectors written to the physical disk drive. This information may be useful for determining rates. For instance, if you wanted to calculate the average number of writes per minute of operation, divide this number by the reference minutes."
::= ( phydrvEntry 11 )

phyDrvSeeks     OBJECT-TYPE
    SYNTAX      Counter
    ACCESS      read-only
    STATUS      mandatory
    DESCRIPTION
        "Total Seeks This shows the total number of seek operations performed by the physical drive since the drive was shipped."
::= ( phydrvEntry 12 )

phyDrvHardReadErrs   OBJECT-TYPE
    SYNTAX      Counter
    ACCESS      read-only
    STATUS      mandatory
    DESCRIPTION
        "Hard Read Errors This shows the number of read errors that have occurred on a drive that could not be recovered by a physical drive's Error Correction Code (ECC) algorithm or through retries. Overtime, a disk drive may produce *these errors. If you receive these errors, a problem may exist with your drive.

The value increases every time the physical drive detects another error.

The severity of these errors depends on whether the monitored system is running in a fault tolerant mode. With fault tolerance, the controller can remap data to eliminate the problems caused by these errors. In either case, if you see an increase in these errors, schedule server down time to run COMPAQ DIAGNOSTICS to verify that a problem exists."
::= (phyDrvEntry 13 )

phyDrvRecvReadErrs  OBJECT-TYPE
    SYNTAX     Counter
    ACCESS     read-only
    STATUS     mandatory
    DESCRIPTION
        "Recovered Read Errors This shows the number of read errors corrected through physical drive retries.

Over time, all disk drives produce these errors. If you notice a rapid increase in the value for Recovered Read Errors (or Hard Read Errors), a problem may exist with the drive. The value increases every time the physical drive detects and corrects another error.

Expect more Recovered Read Errors than Hard Read Errors. If you suspect that a problem may exist with the drive, schedule server down time to run COMPAQ DIAGNOSTICS."
::= ( phyDrvEntry 14 )

phyDrvHardWriteErrs             OBJECT-TYPE
    SYNTAX     Counter
    ACCESS     read-only
    STATUS     mandatory
    DESCRIPTION
        "Hard Write Errors This shows the number of write errors that could not be recovered by a physical drive.

Over time a disk drive may detect these errors. If you notice an increase in the value shown for Hard Write Errors or Recovered Write Errors, a problem may exist with the drive. The value increases every time the physical drive detects another error. On average, these errors should occur less frequently than read errors. If you see an increase in these errors, schedule server down time to run COMPAQ DIAGNOSTICS to verify that a problem exists."
::= ( phyDrvEntry 15 )

phyDrvRecWriteErrs  OBJECT-TYPE
    SYNTAX    Counter
    ACCESS    read-only
    STATUS    mandatory
    DESCRIPTION
        "Recovered Write Errors This shows the number of write errors corrected through physical drive retries or recovered by a physical drive on a monitored system.

Over time a disk drive may produce these errors.

If you notice an increase in the value shown for Hard Write Errors or Recovered Write Errors, a problem may exist with the drive.

The value increases every time the physical drive detects and corrects and error. Only an unusually rapid increase in these errors indicates a problem.

On average, these errors should occur less frequently than hard read errors. If you suspect that a problem may exist with the drive, schedule server down time to run COMPAQ DIAGNOSTICS."
::= ( phyDrvEntry 16 )

phyDrvSeekErrs  OBJECT-TYPE
    SYNTAX    Counter
    ACCESS    read-only
    STATUS    mandatory
    DESCRIPTION
        "Seek Errors This shows the number of seek errors that a physical drive detects. Over time, a disk drive usually produces these errors. If you notice a rapid increase in the value shown for Seek Errors, this physical drive may be failing.

The value increases every time the physical drive produces another error. Only an unusually rapid increase in these errors indicates a problem. If you suspect that a problem exists, schedule server down time to run COMPAQ DIAGNOSTICS."
::= (phyDrvEntry 17 )

phyDrvSpinupTime   OBJECT-TYPE
    SYNTAX    INTEGER
    ACCESS    read-only
    STATUS    mandatory
    DESCRIPTION
      "Spinup Time in milliseconds This is the time it takes for a physical drive to spin up to full speed.

Disks require time to gain momentum and reach operating speed. As cars are tested to go from 0 mph to 60 mph in x number of seconds, drive manufacturers have preset expectations for the time it takes the drive to spin to full speed. Drives that do not meet these expectations may have problems.

The value may be zero under one of the following conditions:

If you are monitoring a physical drive that is part of the monitored system's internal drive array storage, and you use a warm boot to reset the monitored system. During a warm boot, the drives continue to spin.

If you have a COMPAQ Drive Array but have a version of the physical controller ROM that is less than version 1.00. If you have used and upgrade utility on versions less than 1.00, the value may still be zero.

If you are monitoring a physical drive in an Intelligent Array Expansion System and you reset the monitored system but not the Intelligent Array Expansion System.

If you suspect a problem, schedule server down time to run COMPAQ DIAGNOSTICS and select the Drive Monitoring Diagnostics option to verify that a problem exists."
::= ( phyDrvEntry 18 )

phyDrvFunctionalTest1    OBJECT-TYPE
    SYNTAX    Gauge
    ACCESS    read-only
    STATUS    mandatory
    DESCRIPTION
        "Functional Test 1

This provides information about a series of tests that indicate how well a physical drive works. These tests compare the way the physical drive currently operates when performing various tasks with the way it worked when it was new.

A percent value is displayed that represents how the drive works currently when compared to how the drive worked when new. New drives operate at 100% level. By default, if the current value is less than or equal to 80 percent, a problem may exist.

If you suspect a problem, schedule server down time to run COMPAQ DIAGNOSTICS and select the Drive Monitoring Diagnostics option to verify that a problem exists."
    ::= ( phyDrvEntry 19 )

phyDrvFunctionalTest2    OBJECT-TYPE
    SYNTAX    Gauge
    ACCESS    read-only
    STATUS    mandatory
    DESCRIPTION
        "Functional Test 2

This provides information about a series of test that indicates how well a physical drive works. These test compare the way the physical drive currently operates when performing various tasks with the way it worked when it was new.

A percent value is displayed that represents how the drive works currently when compared to how the drive worked when new. New drives operate at the 100% level. By default, if the current value is less than or equal to 80 percent, a problem may exist.

If you suspect a problem, schedule server down time to run COMPAQ DIAGNOSTICS and select the Drive Monitoring Diagnostics option to verify that a problem exists."
```
    ::= (phyDrvEntry 20 )

phyDrvFunctionalTest3    OBJECT-TYPE
    SYNTAX     Gauge
    ACCESS     read-only
    STATUS     mandatory
    DESCRIPTION
        "Functional Test 3
```

This provides information about a series of tests that indicate how well a physical drive works. These tests compare the way the physical drive currently operates when performing various tasks when the way it worked when it was new.

A percent value is displayed that represents how the drive works currently when compared to how the drive worked when new. New drives operate at the 100% level. By default, if the current value is less than or equal to 80 percent, a problem may exist.

If you suspect a problem, schedule server down time to run COMPAQ DIAGNOSTICS and select the Drive Monitoring Diagnostics option to verify that a problem exists."

```
            ::= ( phyDrvEntry 21 )

phyDrvDrqTimeouts    OBJECT-TYPE
      SYNTAX    Counter
      ACCESS    read-only
      STATUS    mandatory
      DESCRIPTION
            "DRQ Timeouts
```

The number of time that a physical drive continued to request data, but did not get a command completion. This value increases every time a DRQ timeout occurs for the physical drive.

A defective drive or cable may cause DRQ timeouts to occur. If you see an increase in these errors, complete the following steps for the monitored system:

1. Check the cables connecting the drive to ensure that they are intact.

2. If the cables are properly connected, schedule server down time to run COMPAQ DIAGNOSTICS to verify that a problem exists."

```
            ::= ( phyDrvEntry 22 )

phyDrvOtherTimeouts OBJECT-TYPE
      SYNTAX    Counter
      ACCESS    read-only
      STATUS    mandatory
      DESCRIPTION
            "Other Timeouts
```

The number of times that a physical drive did not respond with an interrupt within a controller-defined period of time after a command had been issued. This does not include DRQ timeouts.

If you suspect a problem, complete the following steps for the monitored system:

1. Check the cables connecting the drive to ensure that they are intact.

2. If the cables are properly connected, schedule server down time to run COMPAQ DIAGNOSTICS to verify that a problem exists."
::= ( phyDrvEntry 23 )

phyDrvSpinupRetries OBJECT-TYPE
    SYNTAX    Counter
    ACCESS    read-only
    STATUS    mandatory
    DESCRIPTION
        "Spinup Retries The number of times that a physical drive had to retry to spin up before successfully achieving operating speed. This value represents the spin-up retries that occurred since the last time you turned the monitored system on.

If you suspect a problem, schedule server down time to run COMPAQ DIAGNOSTICS and select the Drive Monitoring Diagnostics option to verify that a problem exists."
::= ( phyDrvEntry 24 )

phyDrvFailedRecvReads    OBJECT-TYPE
    SYNTAX    Counter
    ACCESS    read-only
    STATUS    mandatory
    DESCRIPTION
        "Recover Failed Read Error The number of times a read error occurred while performing Automatic Data Recovery from this physical drive to another drive.

If a read error occurs, Automatic Data Recovery stops. These errors indicate that the physical drive has failed. If you suspect a problem, schedule server down time to run COMPAQ DIAGNOSTICS and select the Drive Monitoring Diagnostics option to verify that a problem exits."
::= ( phyDrvEntry 25 )

phyDrvFailedRecWrites    OBJECT-TYPE
    SYNTAX      Counter
    ACCESS      read-only
    STATUS      mandatory
    DESCRIPTION
        "Recovery Failed Write Error The number of times a write error occurred while performing Automatic Data Recovery from another drive to this physical drive.

If a write error occurs, Automatic Data Recovery stops. These error indicate that the physical drive has failed. If you suspect a problem, schedule server down time to run COMPAQ DIAGNOSTICS and select the Drive Monitoring Diagnostics option to verify that a problem exists."
    ::= ( phyDrvEntry 26 )

phyDrvFormatErrs    OBJECT-TYPE
    SYNTAX      Counter
    ACCESS      read-only
    STATUS      mandatory
    DESCRIPTION
        "Format Errors The number of times a format operation failed when the controller attempted to remap a bad sector. Zero indicates that no format errors have occurred. The value increases each time a format error occurs. A failed format operation may cause the controller to mark a drive failed.

If you suspect a problem, schedule server down time to run COMPAQ DIAGNOSTICS and select the Drive Monitoring Diagnostics option to verify a problem exists."
    ::= (phyDrvEntry 27 )

```
phyDrvPostError      OBJECT-TYPE
    SYNTAX    Counter
    ACCESS    read-only
    STATUS    mandatory
    DESCRIPTION
        "Power On Self Test (Post) Error The number of times that a physical drive
        failed its self test.

The physical drive does a self test each time
        the system is turned on."
    ::= ( phyDrvEntry 28 )

phyDrvNotReadyErrs   OBJECT-TYPE
    SYNTAX    Counter
    ACCESS    read-only
    STATUS    mandatory
    DESCRIPTION
        "Drive Not Ready Errors The number of times the physical drive failed
        after the spin up command was issued. When the
        spin up command was issued, the drive failed to
        reach its ready state. If the current value is
        zero, the drive has not failed, If the current
        value is greater than zero, at least one
        failure occurred.

This error could be caused because the physical
        drive has failed to spin.

If you suspect a problem:

1.  Check the cables connecting the
                drive to ensure that they are
                intact.

2.  If the cables are properly
                connected, schedule server down time
                to run COMPAQ DIAGNOSTICS to verify
                that a problem exists."
    ::= ( phyDrvEntry 29 )

phyDrvReallocAborts      OBJECT-TYPE
```

```
    SYNTAX      Counter
    ACCESS      read-only
    STATUS      mandatory
    DESCRIPTION
        "Physical Drive Reallocation Aborts The number of times the physical drive has
        failed due to an error that occurred when the
        controller was trying to reallocate a bad
        sector.  Zero indicates that no Reallocation
        Abort errors have occurred.  The value
        increases each time a Reallocation Abort error
        occurs.

Because of the nature of magnetic disks,
        certain sectors on a drive may have media
        defects.  The reallocation area is part of the
        disk drive that is set aside to compensate for
        these defects.  The array controller writes
        information addressed from unusable sectors to
        available sectors in the reallocation area.

If you suspect a problem, schedule server down
        time to run COMPAQ DIAGNOSTICS and select the
        Drive Monitoring Diagnostics option to verify
        a problem exists."
    ::= ( phyDrvEntry 30 )

phyDrvThreshExceeded      OBJECT-TYPE
    SYNTAX      INTEGER
    (
        false(1),
        true(2)
    )
    ACCESS      read-only
    STATUS      mandatory
    DESCRIPTION
        "Physical Drive Factory Threshold Exceeded When the drive is shipped, certain thresholds
        have been set to monitor performance of the
        drives.  For example, a threshold might be set
        up for Spinup Time.  If the time that it takes
        the drive to spin up exceeds the factory
``` threshold, there may be a problem with one of the drives.

If you suspect a problem, schedule server down time to run COMPAQ DIAGNOSTICS and select the Physical Drive Test option.

Note: These thresholds may be under COMPAQ warranty under certain conditions."
::= ( phyDrvEntry 31 )

phyDrvHasMonitorInfo     OBJECT-TYPE
    SYNTAX    INTEGER
    (
        false(1),
        true(2)
    )
    ACCESS    read-only
    STATUS    mandatory
    DESCRIPTION
        "Physical Drive Has Monitor Info All of the physical disk table fields except for the physical disk status (phyDrvStatus) and the bay location (phyDrvBayLocation) are invalid unless this field has a value of true(2).

If the value is false(1), you must run COMPAQ DIAGNOSTICS and select the Physical Drive Test option. This will enable the physical disk monitoring information."
    ::= ( phyDrvEntry 32 )

phyDrvCondition     OBJECT-TYPE
    SYNTAX    INTEGER
    (
        other(1),
        ok(2),
        degraded(3),
        failed(4)
    )
    ACCESS    read-only
    STATUS    mandatory
    DESCRIPTION

```
            "The condition of the device.  This value
        represents  the  overall  condition  of  this
        physical drive."
    ::= ( phyDrvEntry 33 )

©1992 Compaq Computer Corporation
```

Referring next to FIG. 7E, the spare drive child group located at branch 232.3.2.4 shall now be described in greater detail. The spare drive child group contains object instances that describe the spare drive that may be present on an external IDA. Spare drives may be available for any particular logical drive until allocated for use. Example object instances would be status (other, failed, inactive building or active) physical drive number the spare is replacing and others. More specifically, the spare drive child group contains a spare drive table located at branch 232.3.2.4.1 which contains N entries, one for each spare drive installed in the drive array. For each installed spare drive, the spare drive table includes a controller index object located at branch 232.3.2.4.1.N.1, a physical drive index object located at branch 232.3.2.3.1.N.2, a spare status object located at branch 232.3.2.3.1.N.3, a replaced drive object located at branch 232.3.2.3.1.N.4, a rebuild blocks object located at branch 232.3.2.3.1.N.5 and a spare condition object located at branch 232.3.2.3.1.N.6. Further details are set forth in the formal organizational framework of the spare child group set forth below:

```
spareTable    OBJECT-TYPE
    SYNTAX    SEQUENCE OF SpareEntry
    ACCESS    not-accessible
    STATUS    mandatory
```

```
        DESCRIPTION
            "Drive Array Spare Table

A table of spare entries."
        ::= ( spareDrv 1 )

spareEntry      OBJECT-TYPE
    SYNTAX      SpareEntry
    ACCESS      not-accessible
    STATUS      mandatory
    DESCRIPTION
            "Drive Array Spare Entry An entry in the spare table."
    INDEX       ( spareCntlrIndex,
                  sparePhyDrvIndex )
    ::= ( spareTable 1 )

SpareEntry      ::= SEQUENCE
(
    spareCntlrIndex             INTEGER,
    sparePhyDrvIndex            INTEGER,
    spareStatus                 INTEGER,
    spareReplacedDrv            INTEGER,
    spareRebuildblocks          Counter,
    spareCondition              INTEGER
    spareCntlrIndex     OBJECT-TYPE
    SYNTAX      INTEGER
    ACCESS      read-only
    STATUS      mandatory
    DESCRIPTION
            "Drive Array Spare Controller Index
            This index maps the spare drive back
            to the controller to which it is
            attached.  The value of this index
            is the same as the one used under
            the controller group."
    ::= ( spareEntry 1 )

accelStatus     OBJECT-TYPE
    SYNTAX      INTEGER
    ACCESS      read-only
    STATUS      mandatory
    DESCRIPTION
```

"Drive Array Spare Physical Drive Index

This index maps to the physical drive it represents. The value of this index is the same as the one used with the physical drive table."
::= ( spareEntry 2 )

```
spareStatus      OBJECT-TYPE
    SYNTAX    INTEGER
    (
        other(1),
        invalid(2),
        failed(3),
        inactive(4),
        building(5),
        active(6)
    )
    ACCESS    read-only
    STATUS    mandatory
    DESCRIPTION
```
"Spare Status The following values are valid for the spare status:

| | | |
|---|---|---|
| Building (5) | | A physical drive has failed. Automatic Data Recovery is in progress to recover data to the on-line spare. |
| Active (6) | | A physical drive has failed. Automatic Data Recover is complete. The system is using the on-line spare as a replacement for the failed drive. |
| Failed (3) | | The on-line spare has failed and is no longer available for use. |

Inactive (4)   The monitored system has
                                   an   on-line   spare
                                   configured, but is not
                                   currently in use."
        ::= ( spareEntry 3 )

spareReplacedDrv    OBJECT-TYPE
    SYNTAX      INTEGER
    ACCESS      read-only
    STATUS      mandatory
    DESCRIPTION
        "If the spare status is active (6),
        then this has the physical drive
        number of the replaced drive."
    ::- (spareEntry 4 )

spareRebuildBlocks  OBJECT-TYPE
    SYNTAX      Counter
    ACCESS      read-only
    STATUS      mandatory
    DESCRIPTION
        "Drive Array Spare Number of Rebuild Blocks
Left If the spare status is building (5),
        then this is this is the number of
        blocks left to rebuild before
        completion.

The data contained on the failed
        physical drive must be reconstructed
        from the fault tolerance data and
        copied to the spare so that the
        spare can function in place of the
        failed drive.

When the number reaches zero, the
        building process is complete and the
        spare has replaced the physical
        drive."
    ::= ( spareEntry 5)

spareCondition      OBJECT-TYPE
    SYNTAX      INTEGER

```
(
    other(1),
    ok(2),
    degraded(3),
    failed(4)
)
ACCESS      read-only
STATUS      mandatory
DESCRIPTION
    "The condition of the device.  This
    value    represents    the    overall
    condition of this spare drive and
    any associated physical drives."
::= ( spareEntry 6)
```

©1992 Compaq Computer Corporation

Figure 8A:
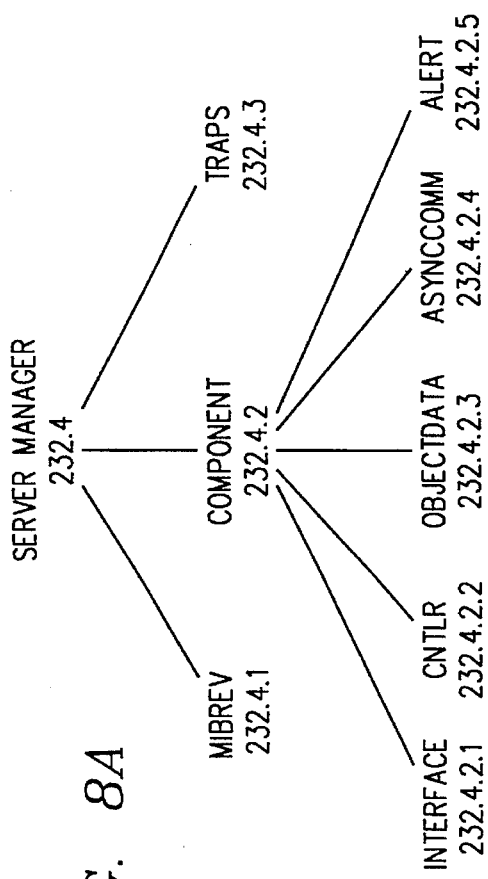
FIG. 8A is an inheritance tree illustrating a fourth subMIB of the enterprise MIB of FIG. 4A.

Referring next to FIG. 8A, the server manager subMIB located at branch 232.4 will now be described in greater detail. The server manager subMIB details the configuration of the server manager board 24, monitored item information maintained on the server board 24 and historical information about important events occurring on the board. The server manager subMIB includes three child groups, a mibREV group located at branch 232.4.1, a component group located at branch 232.4.2, and a traps group located at branch 232.4.3. The mibRev child group contains information regarding the revision of the subMIB to which the SNMP agent conforms and is configured as previously described in FIG. 4B, the component group describes the server manager and the trap group contains information regarding traps issued from the server manager subMIB and is configured as previously described in FIG. 4c. Trap definitions specific to the traps child group located at branch 232.4.3 are as follows:

```
board Failed         TRAP-TYPE
    ENTERPRISE       serverManager
    DESCRIPTION
        "A boardfailed trap signifies that the sending
        SNMP agent has detected a failure of the COMPAQ
        Server Manager/R board in the system."
    : := 1
boardReset           TRAP-TYPE
    ENTERPRISE       serverManager
    DESCRIPTION
        "A boardReset trap signifies that the sending
        SNMP agent has detected a reset of the Server
        Manager board in the system."
    : := 2
serverManagerAlert   TRAP-TYPE
    ENTERPRISE       serverManager
    VARIABLES        ( monItemCurVal , objectLabel,
                       monItemLabel, monItemDataType,
                       monItemSeverity, monitemLimit,
                       monItemOptional, monItemComparator,
                       monItemTimeStamp
                     )
    DESCRIPTION
        "A serverManagerAlert trap signifies a
        monitored item on the Server Manager board
        exceeding a threshold when alerting is enabled
        for the monitored item."
    : := 3
commFailed           TRAP-TYPE
    ENTERPRISE       servermanager
    DESCRIPTION
        "A commFailed trap signifies a failure of the
        Server Manager board's asynchronous
        communication system."
    : := 4
batteryFailed        TRAP-TYPE
    ENTERPRISE       servermanager
    DESCRIPTION
        "A batteryFailed trap signifies a failure of
        the Server Manager board's onboard battery."
    : := 5
boardTimeout         TRAP-TYPE
    ENTERPRISE       servermanager
    DESCRIPTION
        "A boardTimeout trap signifies that the sending
        SNMP agent has detected a timeout of the System
        Manager board in the system by the Server
        Manager Board driver."
    : := 6
```

©1992 Compaq Computer Corporation

The component group located at branch 232.4.2 contains a series of child groups, each of which describes a particular part of the server manager 24. Of these, the interface child group located at branch 232.4.2.1 contains information specific to the host software that supports the server manager controller. The controller child group located at branch 232.4.2.2 contains configuration and statistical information regarding the server manager board such as board name, board ID, firmware date, country code, modem type voice ROM status and others. The object data child group located at branch 232.4.2.3 lists and describes the objects and monitored items on the server manager board 24. In addition to containing the objects, the object data child group also contains the attribute label and value for each object in the group. Finally, the object data child group also contains information regarding the server manager's object management resource utilization. The asynchronous communication child group located at branch 232.4.2.4 describes the configuration and status of the server manager board's asynchronous communication ports using a series of objects which contain information regarding port status, modem type, session status, modem setting and other data relating to the aforementioned communication ports. Finally, the alert child group located at branch 232.4.2.5 contains object instance information describing the "off the network" alerting capabilities of the system manager. For example, alert destinations, including device type (SMF, pager or voice), phone number to dial, number or retries and others is typical information related to off the network alerting capabilities which is contained in the alert child group.

Figure 8B:
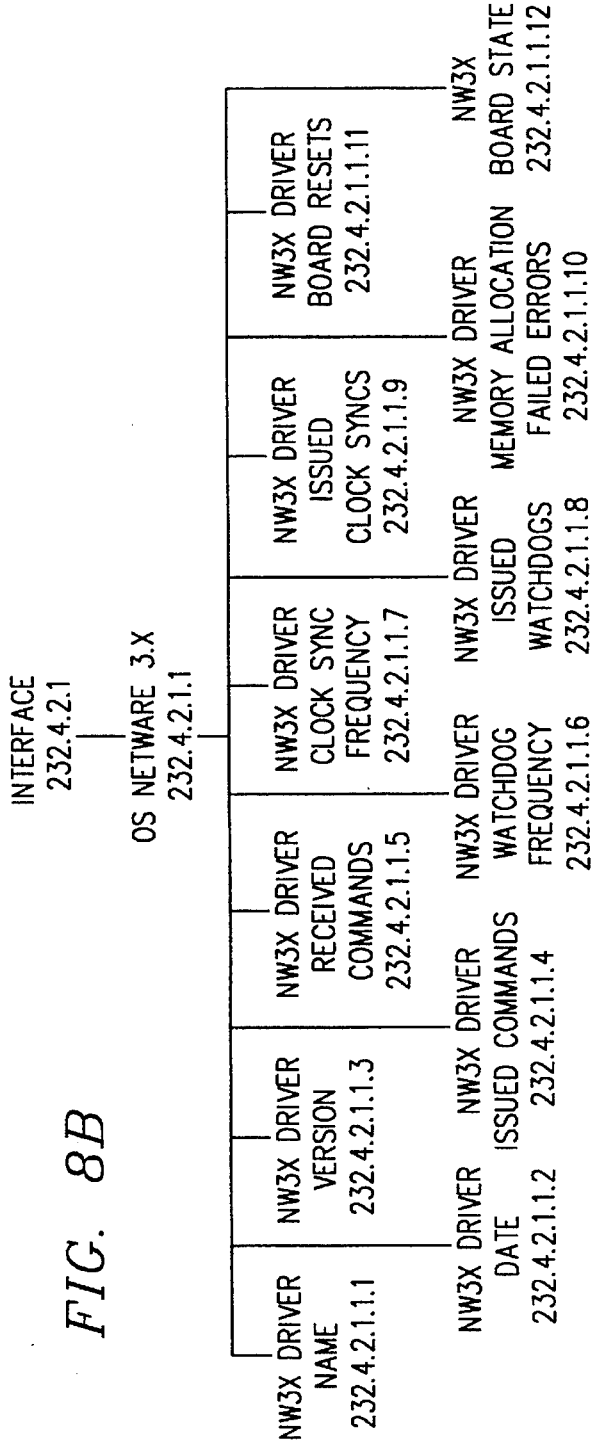
FIG. 8B is an inheritance tree illustrating an interface child group of a component group of the subMIB of FIG. 8A.

Referring next to FIG. 8b, the interface child group located at branch 232.4.2.1 will now be described in greater detail. The interface group contains at least one child group which contains information describing how the server manager board 24 interfaces with a particular host operating system for the computer management system 8. In the embodiment of the invention disclosed herein, a single child group describing the interface of the server manager board 24 with a NetWare operating system is disclosed. It is contemplated, however, that as additional host operating system are instrumented, more child groups will be created.

The NetWare3x group is located at branch 232.4.2.1.1 and describes the driver module of the server manager board in its software interface with the NetWare v3.x operating system using twelve objects, a driver name object located at branch 232.4.2.1.1.1, a driver date object located at branch 232.4.2.1.1.2, a driver version object located at branch 232.4.2.1.1.3, an issued commands object located at branch 232.4.2.1.1.4, a received commands object located at branch 232.4.2.1.1.5, a watchdog frequency object located at branch 232.4.2.1.1.6, a clock synchronization command frequency object located at branch 232.4.2.1.1.7, an issued watchdogs object located at branch 232.4.2.1.1.8, an issued clock sychronization commands object located at branch 232.4.2.1.1.9, a memory allocation failure errors object located at branch 232.4.2.1.1.10, a board resets object located at branch 232.4.2.1.1.11 and a board state object located at branch 232.4.2.1.1.12. The formal organization of the interface child group is as follows:

```
nw3xDriverName    OBJECT-TYPE
    SYNTAX        DisplayString (SIZE (0 . . . 255))
    ACCESS        read-only
    STATUS        mandatory
    DESCRIPTION
        "Driver Name
        The value identified the NetWare loadable
module      providing the operating system access to
            the Server Manager board."
    : := ( osNetWare 3x 1 )
nw3xDriverDate    OBJECT-TYPE
```

```
            -continued
    SYNTAX       DisplayString (Size (0 . . . 8))
    ACCESS       read-only
    STATUS       mandatory
    DESCRIPTION
        "Driver Date
        The date of the NetWare loadable module
        providing the operating system access to the
        Server Manager board. The date is provided in
        mm/dd/yy format."
    : :=( osNetWare 3x 2 )
nw3xDriverVerson       OBJECT-TYPE
    SYNTAX       DisplayString (SIZE (0 . . . 5))
    ACCESS       read-only
    STATUS       mandatory
    DESCRIPTION
        "Driver Version
        This is the version of the NetWare loadable
        module providing the operating system access to
        the Server Manager board. Version 1.20 or
        greater of the driver is required for the
        Server Manager SNMP agent."
    : :=( osNetWare3x 3 )
nw3xDriverIssued Commands      OBJECT-TYPE
    SYNTAX       Counter
    ACCESS       read-only
    STATUS       mandatory
    Description
        "Server Manager Commands Sent
        The number of commands the driver has issued to
        the Server Manager board since it was loaded."
    : :=( osNetWare 3x 4 )
nw3xDriverReceivedCommands     OBJECT-TYPE
    SYNTAX       Counter
    ACCESS       read-only
    STATUS       mandatory
    DESCRIPTION
        "Server Manager Commands Received
        The number of commands the driver has received
        from the Service Manager board since it was
        loaded."
    : :=( osNetWare3x 5 )
nw3xDriverWatchdogFrequency    OBJECT-TYPE
    SYNTAX       INTEGER ( ) . . . 255)
    ACCESS       read-only
    STATUS       mandatory
    DESCRIPTION
        "Server Manager Watchdog Frequency
        The number of minutes between watchdog
        commands. The watchdog command is the way the
        Server Manager board determines that the driver
        and NetWare are still running. A value of 0
        means no watchdog is being performed."
    : :=( osNetWare3x 6 )
nw3xDriverClockSyncFrequency   OBJECT-TYPE
    SYNTAX       INTEGER (0 . . . 65535)
    ACCESS       read-only
    STATUS       mandatory
    DESCRIPTION
        "Server Manager Clock Sync Frequency
        The number of minutes between clock
        synchronization commands. The clock
        synchronization command sets the Server Manager
        board's clock to the same value as the NetWare
        OS clock. A value of 0 means no clock
        synchronization is being performed."
    : :=( osNetWare3x 7 )
nw3xDriverIssuedWatchdogs      OBJECT-TYPE
    SYNTAX       Counter
    ACCESS       read-only
    STATUS       mandatory
    DESCRIPTION
        "Server Manager Watchdog Commands Issues
        The number of watch dog commands issued since
```

```
            -continued
        the driver was loaded."
    : :=( osNetWare3x 8 )
nw3xDriverIssuedClockSyncs     OBJECT-TYPE
    SYNTAX       Counter
    ACCESS       read-only
    STATUS       mandatory
    DESCRIPTION
        "Server Manager Clock Sync Commands Issues
        The number of clock synchronization commands
        performed since the driver was loaded."
    : :=( osNetWare3x 9 )
nw3xDriverMemoryAllocationsFailedErrs       OBJECT-TYPE
    SYNTAX       Counter
    ACCESS       read-only
    STATUS       mandatory
    DESCRIPTION
        "Server Manager Memory Allocation Errors
        The number of times that a memory allocation
        failed when a command received by the driver
        required a buffer to be allocated."
            : :=( osNetWare3x 10 )
nw3xDriverBoardResets      OBJECT-TYPE
    SYNTAX       Counter
    ACCESS       read-only
    STATUS       mandatory
    DESCRIPTION
        "Server Manager Board Resets
        The number of times the driver detected the
        Server Manager board resetting itself."
    : :=( osNetWare3x 11 )
nw3xBoardState         OBJECT-TYPE
    SYNTAX       INTEGER (
        ok(1),
        failed(2)
    ACCESS       read-only
    STATUS       mandatory
    DESCRIPTION
        "Server Manager Board State
        The driver's perception of the Server Manager
        board's state."
    : :=( osNetWare3x 12 )
```

©1992 Compaq Computer Corporation

Figures 1, 8C, 8D:
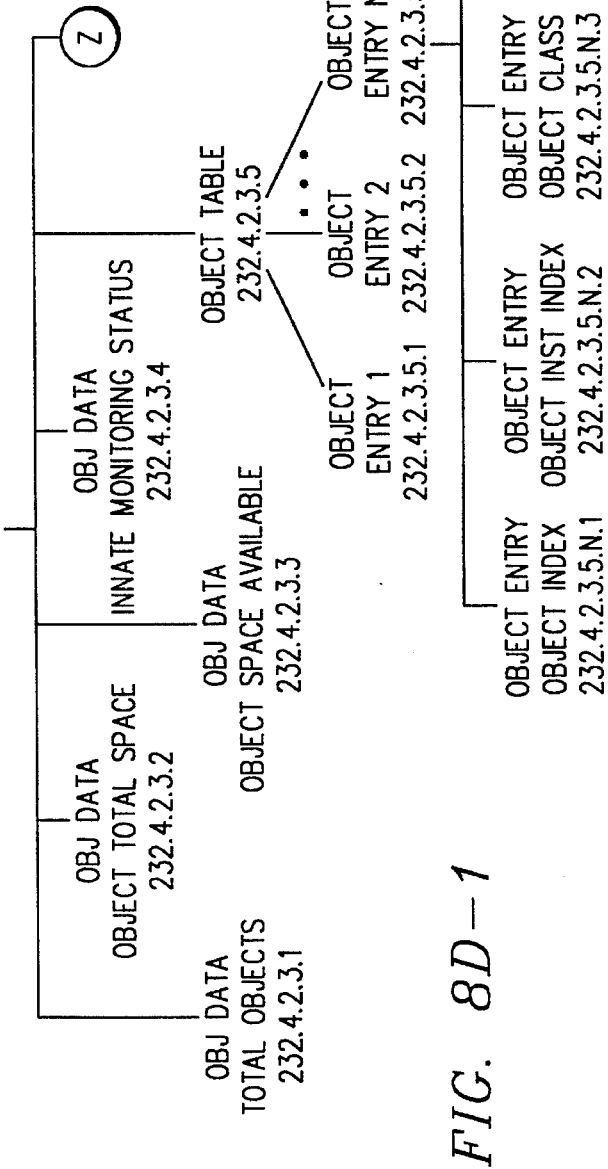
Figures 2, 8D:
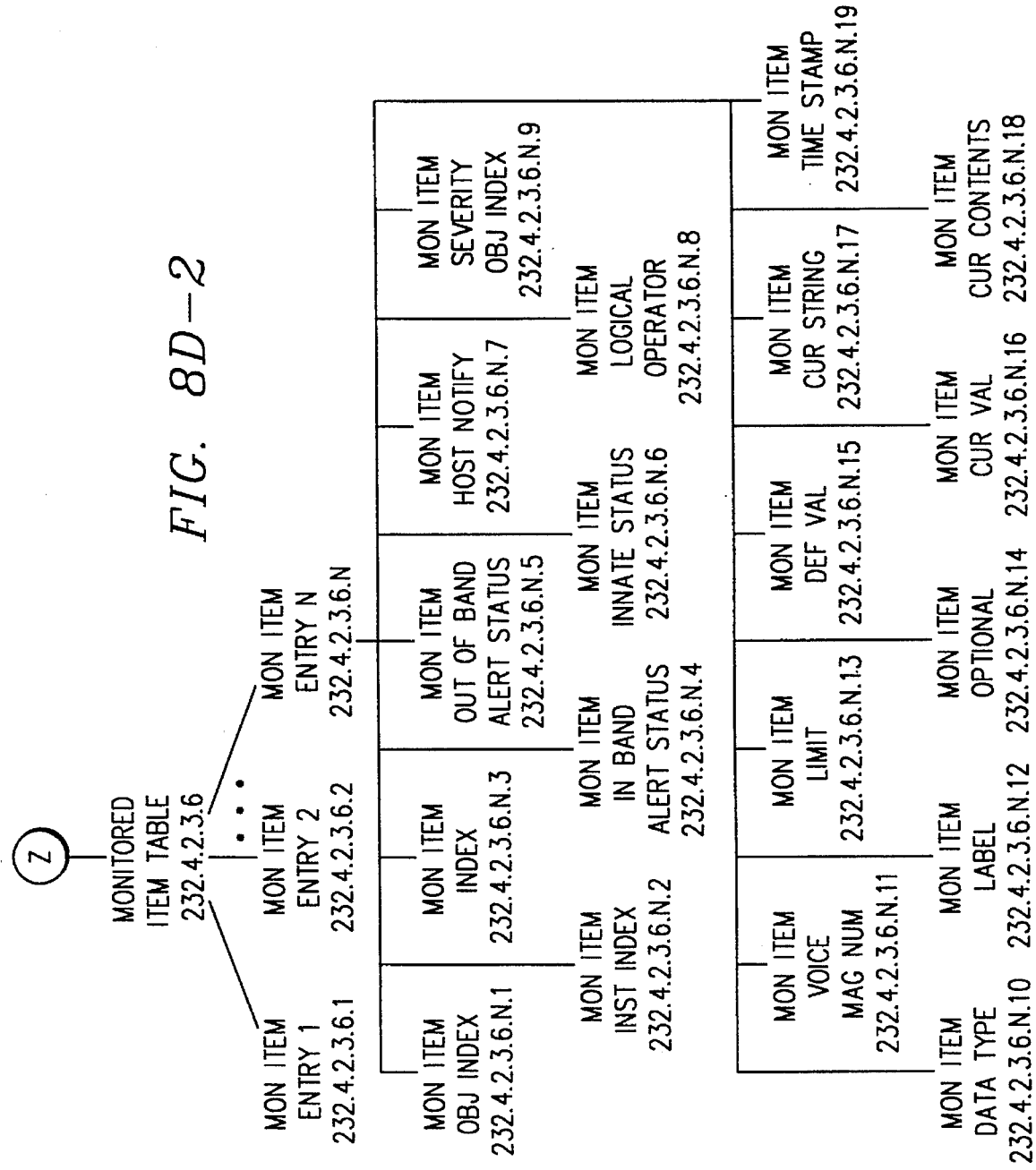

Referring next to FIG. 8C, the controller child group located at branch 232.4.2.2 will now be described in greater detail. The controller child group contains configuration and statistical information, for example, board name, board ID, formware date, country code, modem type and voice ROM status, regarding the server manager controller. The group is comprised of twelve objects which detail this information. The objects of the child group are a board name object located at branch 232.4.2.2.1, a board ID object located at branch 232.4.2.2.2, a ROM date object located at branch 232.4.2.2.3, a country code object located at branch 232.4.2.2.4, a ROM status object located at branch 232.4.2.2.5, a battery status object located at branch 232.4.2.2.6, a dormant mode status object located at branch 232.4.2.2.7, a self test error code object located at branch 232.4.2.2.8, an operating system ID object located at branch 232.4.2.2.9, an operating system major revision object located at branch 232.4.2.2.10, an operating system minor revision object located at branch 232.4.2.2.11, a power on self test timeout object located at branch 232.4.2.2.12, and a condition object located at branch 232.4.2.2.13. The formal organization of the controller child group is as follows:

```
cntrlrBoardName OBJECT-TYPE
    SYNTAX  DisplayString (SIZE (0..15))
    ACCESS  read-only
    STATUS  mandatory
    DESCRIPTION
        "Server Manger Board Name The name of the Server Manager board supplied
        by the user during configuration of the Server
        Manager board using the EISA CONFIGURATION
        UTILITY."
    ::=( cntlr 1 )

cntlrBoardId OBJECT-TYPE
    SYNTAX  DisplayString (SIZE (0..5))
    ACCESS  read-only
    STATUS  mandatory
    DESCRIPTION
        "Server Manager Board ID The ID of the Server Manager board supplied by
        the user during configuration of the Server
```

Manager board using the EISA CONFIGURATION
UTILITY."
::=( cntlr 2 )

cntlrRomDate OBJECT-TYPE
    SYNTAX  DisplayString (SIZE (0..8))
    ACCESS  read-only
    STATUS  mandatory
    DESCRIPTION
        "Server Manager ROM Date The date of the firmware on the board in
        mm/dd/yy format."
    ::= ( cntlr 3)

cntlrCountryCode  OBJECT-TYPE
    SYNTAX  DisplayString (SIZE (0..2))
    ACCESS  read-only
    STATUS  mandatory
    DESCRIPTION
        "Server Manager Country Code An abbreviation for the country (language) for
        which the Server Manager board is configured.
        The possible values are:

AE    Arabic-English
                AF    Arabic-French
                AU    Australia
                BE    Belgium
                BF    Belgium-Flemish
                CE    Canadian-English
                CF    Canadian-French
                CH    China
                DN    Denmark
                DU    Dutch
                EE    European-English
                FN    Finland
                FR    French
                GR    Germany
                HA    Hungary
                IT    Italy
                IS    Israel
                KA    Kangi
                LA    Latin America

```
                    ME    Middle East
                    NE    Netherlands
                    NO    Norway
                    PO    Portugal
                    SP    Spain
                    SW    Sweden
                    ST    Switzerland
                    SF    Swiss-French
                    SG    Swiss-German
                    TA    Taiwan
                    UK    United Kingdom
                    US    United States"
        ::= ( cntrl 4 )

cntlrVoiceRomStatus   OBJECT-TYPE
    SYNTAX   INTEGER (
            notInstalled(1),
            installed(2)
            )
    ACCESS   read-only
    STATUS   mandatory
    DESCRIPTION
        "Server Manager Voice ROM Status The value specifies if the Server Manager board
        has a voice ROM installed."
    ::=( cntlr 5)

cntlrBatteryStatus   OBJECT-TYPE
    SYNTAX   INTEGER (
            connected(1),
            disconnected(2)
            )
    ACCESS   read-only
    STATUS   mandatory
    DESCRIPTION
        "Server Manager Battery Connection Status."
    ::= ( cntlr 6 )

cntlrDormantModeStatus   OBJECT-TYPE
    SYNTAX   INTEGER (
            normal(1),
            dormantOnPowerDown(2)
            )
    ACCESS   read-only
```

```
        STATUS  mandatory
        DESCRIPTION
            "Server Manager Dormant Mode Status The status of the power management system."
        ::=( cntlr 7)

cntlrSelfTestErrorCode  OBJECT-TYPE
        SYNTAX   INTEGER  (0..65535)
        ACCESS   read-only
        STATUS   mandatory
        DESCRIPTION
            "Server Manager Self Test Error Code The result of the self test run by the Server
            Manager board's firmware.  This value is a set
            of bit flags defined as follows (bit 0 is the
            least significant bit):
                    Bit 0 set  -  ROM Checksum failed
                    Bit 1 set  -  RAM test failed
                    Bit 2 set  -  80186 timer failed
                    Bit 3 set  -  Built in modem failed
                    Bit 4 set  -  Direct connect interface
                                  failed
                    Bit 5 set  -  Real time clock failed
                    Bit 6 set  -  Temperature and/or voltage
                                  sensor failed
                    Bit 7 set  -  DTMF failed
                    Bit 8 set  -  VSL failed
                    Bit 9 set  -  Host bus monitor failed
                    Bit 10 set -  BMIC interface failed
                    Bit 11 set -  Battery is broken
              Bits 12 - 15 are currently reserved.

A value of zero (no bits are set) indicates no
            self test error has occurred."
        ::= ( cntlr 8 )

cntlrOsId OBJECT-TYPE
        SYNTAX   INTEGER (
                other(1),
                netware286(177),
                netware386(178),
                os2LanManager(179),
                unix(180),
```

```
            banyan(181),
            dos(182),
            )
    ACCESS  read-only
    STATUS  mandatory
    DESCRIPTION
        "Server Manager Operating System ID The host operating system registered by the
        driver with the Server Manager board."
    ::= ( cntlr 9 )

cntlrOsMajorRev  OBJECT-TYPE
    SYNTAX  INTEGER (0..255)
    ACCESS  read-only
    STATUS  mandatory
    DESCRIPTION
        "Server Manager Operating System Major Revision The major revision of the host operating system
        registered by the driver with the Server
        Manager board."
    ::=( cntlr 10 )

cntlrOsMinorRev  OBJECT-TYPE
    SYNTAX  INTEGER (0..255)
    ACCESS  read-only
    STATUS  mandatory
    DESCRIPTION
        "Server Manager Operating System Minor Revision The minor revision of the host operating system
        registered by the driver with the Server
        Manager board."
    ::=( cntlr 11 )

cntlrPostTimeout  OBJECT-TYPE
    SYNTAX  INTEGER (0..60)
    ACCESS  read-only
    STATUS  mandatory
    DESCRIPTION
        "Server Manager Power on Self Test Timeout The number of minutes the board should wait for
        POST to complete.  A value of 0 indicates that
```

```
        the version of firmware on the Server Manager
        board   does   not   make   this   information
        available."
    ::=( cntlr 12 )

cntlrCondition   OBJECT-TYPE
    SYNTAX   INTEGER (
          other(1),
          ok(2),
          degraded(3),
          failed(4)
          )
    ACCESS   read-only
    STATUS   mandatory
    DESCRIPTION
        "Server Manager Condition This represents the overall condition of the
        Server Manager board."
    ::=( cntlr 13 )

©1992 Compaq Computer Corporation
```

Referring generally to FIGS. 8D-1 through 8D-2 and

Referring generally to FIGS. 8D-1 through 8D-2 and, in particular to FIG. 8D-1, the object data child group located at branch 232.4.2.3 will now be described in greater detail. The object data child group describes the objects and monitored items on the server manager board 24 using three objects, a total objects object located at branch 232.4.2.3.1, a total object space object located at branch 232.4.2.3.2, an innate monitoring status object located at branch 232.4.2.3.4, an object table located at branch 232.4.2.3.5 and a monitored item table located at branch 232.4.2.3.6.

The object table is comprised of N entries, one for each object monitored by the server manager 24. For each entry N, the object table contains four objects: an object index object located at branch 232.4.2.3.5.N.1, an object instance index object located at branch 232.4.2.3.5.N.2, an object class object located at branch 232.4.2.3.5.N.3 and an object label object located at branch 232.4.2.3.5.N.4.

Referring, in particular, to FIG. 8D-2, the monitored item table located at branch 232.4.2.3.6 includes an entry N for each item monitored by the server manager. For each entry N, the monitored item table contains 18 objects: a monitored item index object located at branch 232.4.2.3.6.N.1, a monitored item instruction index object located at branch 232.4.2.3.6.N.2, a monitored item index located at branch 232.4.2.2.3.6.N.3, an in-band alert status object located at branch 232.4.2.3.6.N.4, an out-of-band alert status object located at branch 232.4.2.3.6.N.5, an innate status object located at branch 232.4.2.3.6.N.6, a host notification object located at branch 232.4.2.3.6.N.7, a logical operator object located at branch 232.4.2.3.6.N.8, a monitored item severity object located at branch 232.4.2.3.5.N.9, a monitored item data type object located at branch 232.4.2.3.5.N.10, a voice message number object located at branch 232.4.2.3.5.N.11, a monitored item label object located at branch 232.4.2.3.5.N.12, a monitored item limit object located at branch 232.4.2.3.5.N.13, an optional monitored item object located at branch 232.4.2.3.5.N.14, a monitored item default value object located at branch 232.4.2.3.5.N.15, a monitored item current value object located at branch 232.4.2.3.5.N.16, a monitored item current string object located at branch 232.4.2.3.5.N.17, a monitored item current contents located at branch 232.4.2.3.5.N.18 and a monitored item time stamp located at branch 232.4.2.3.5.N.19.

The formal organization of the object data child group is as follows:

type and is best used in comparison with the
objDataObjectTotalSpace."
::=( objData 3 )

objDataInnateMonitoringStatus   OBJECT-TYPE
    SYNTAX   INTEGER (
        other(1),
        disabled(2),
        enabled(3),
        )
    ACCESS   read-only
    STATUS   mandatory
    DESCRIPTION
        "Server Manager Innate Monitoring Status The following values are valid:

Enabled (3)    Innate Monitoring is
                           active.

Disabled (2)   Innate Monitoring is
                           not active.

Other (1)      Innate Monitoring
                           status    is
                           unobtainable Innate Monitoring is performed by the Server
        Manager board without input from the operating
        system. It includes monitoring of information
        such as Temperature, Input/Output Check, and
        Power.

COMPAQ DIAGNOSTICS disables Innate Monitoring
        before executing any tests so that alerts are
        not caused inadvertently. After completion,
        Diagnostics re-enables alerting."
    ::= (objData 4 )

objectTable   OBJECT-TYPE
    SYNTAX   SEQUENCE OF ObjectEntry
    ACCESS   not-accessible
    STATUS   mandatory
    DESCRIPTION

```
            "A list of the objects currently defined on the
            Server Manager board."
        ::= ( objData 5 )

objectEntry OBJECT-TYPE
    SYNTAX  ObjectEntry
    ACCESS  not-accessible
    STATUS  mandatory
    DESCRIPTION
        "A description of an object currently defined
        on the Server Manager board."
    INDEX  ( objectIndex, objectInstIndex )
    ::=( objectTable 1 )

objectEntry ::= SEQUENCE (
    objectIndex         INTEGER   (0..4294967295),
    objectInstIndex     INTEGER   (0..255),
    objectClass         INTEGER   (0..4294967195),
    objectLabel         DisplayString (SIZE (0..15))
    )

objectIndex OBJECT-TYPE
    SYNTAX  INTEGER  (0..4294967295)
    ACCESS  read-only
    STATUS  mandatory
    DESCRIPTION
        "This is a number that uniquely specifies a
        type of object on the Server Manager board.
        The number zero will never be an object."
    ::= (objectEntry 1)

objectInstIndex OBJECT_TYPE
    SYNTAX  INTEGER  (0..255)
    ACCESS  read-only
    STATUS  mandatory
    DESCRIPTION
        "This number uniquely specifies a particular
        instance of an object on the Server Manager
        board."
    ::= (objectEntry 2 )

objectClass OBJECT-TYPE
    SYNTAX  INTEGER  (0..429496795)
    ACCESS  read-only
    STATUS  mandatory
```

DESCRIPTION
"A number used to group associated objects together by the type of function they perform. The currently defined classes are:

```
    4096  (1000 hex) System Board
    8192  (2000 hex) Disk Storage
    16384 (4000 hex) Tape Storage
    20480 (5000 hex) Network
    24576 (6000 hex) NetWare
    28672 (7000 hex) SCO-Unix
    32768 (8000 hex) OS/2 - LanMan
    36864 (9000 hex) Banyan Vines"
```
::= ( objectEntry 3 )

objectLabel OBJECT-TYPE
    SYNTAX  DisplayString (SIZE (0..15))
    ACCESS  read-only
    STATUS  mandatory
    DESCRIPTION
        "A short text description of the object."
    ::= ( objectEntry 4)

monItemTable OBJECT-TYPE
    SYNTAX  SEQUENCE OF MonItemEntry
    ACCESS  not-accessible
    STATUS  mandatory
    DESCRIPTION
        "A list of the monitored items currently defined on the Server Manager Board."
    ::= ( objData 6 )

monItemEntry OBJECT-TYPE
    SYNTAX  MonItemEntry
    ACCESS  not-accessible
    STATUS  mandatory
    DESCRIPTION
        "A description of a monitored item currently defined on the Server Manager board."
    INDEX   ( monItemObjIndex, monItemInstIndex, monItemIndex)
    ::= ( monItemTable 1)

MonItemEntry ::= SEQUENCE (
    monItemObjIndex     INTEGER (0..4294967295),

```
    monItemInstIndex       INTEGER (0..255),
    monItemIndex           INTEGER (0..255),
    monItemInBandAlertStatus INTEGER,
    monItemOutOfBandAlertStatus   INTEGER,
    monItemInnateStatus    INTEGER,
    monItemHostNotify      INTEGER,
    monItemLogicalOperator INTEGER,
    monItemSeverity        INTEGER,
    monItemDataType        INTEGER,
    monItemVoiceMagNum     INTEGER (0..511),
    monItemLabel           DisplayString (SIZE
                               (0..15)),
    monItemLimit           INTEGER
                               (-2147483648..2147483647)
    monItemOption          INTEGER
                               (-2147483648..2147483647),
    monItemDefVal          INTEGER
                               (-2147483648..2147483647),
    monItemCurVal          INTEGER
                               (-2147483648..2147483647),
    monItemCurString       Displaystring (SIZE (0..255)),
    monItemCurContents     OCTET STRING (SIZE (0..256)),
    monItemTimeStamp       OCTET STRING (SIZE (0..6))
    )

monItemObjIndex  OBJECT-TYPE
    SYNTAX  INTEGER (0..4294967295)
    ACCESS  read-only
    STATUS  mandatory
    DESCRIPTION
        "This is a number that uniquely specifies a
        type of object on the Server Manager board with
        which this monitored item is associated."
    ::= ( monItemEntry 1 )

monItemInstIndex  OBJECT-TYPE
    SYNTAX  INTEGER (0..255)
    ACCESS  read-only
    STATUS  mandatory
    DESCRIPTION
        "This is a number that uniquely specifies a
        particular instance of an object on the Server
        Manager board that with which this monitored
        item is associated."
    ::= ( monItemEntry 2 )
```

```
monItemIndex   OBJECT-TYPE
    SYNTAX   INTEGER (0..255)
    ACCESS   read-only
    STATUS   mandatory
    DESCRIPTION
        "This is a number that specifies the monitored
        item of the object and instance given in the
        first two fields that this entry describes."
    ::= ( monItemEntry 3 )

monItemInBandAlertStatus   OBJECT-TYPE
    SYNTAX   INTEGER (
            other(1),
            disabled(2),
            enabled (3)
            )
    ACCESS   read-only
    STATUS   mandatory
    DESCRIPTION
        "This field indicates whether the driver will
        be notified when this monitored item crosses a
        defined threshold. The driver may provide some
        mechanism for logging the event or notifying
        specified users.

This field is undefined if the monItemDataType
        is string, date, or queue."
    ::= ( monItemEntry 4 )

monItemOutOfBandAlertStatus   OBJECT-TYPE
    SYNTAX   INTEGER (
            other(1),
            disabled(2),
            enabled(3)
            )
    ACCESS   read-only
    STATUS   mandatory
    DESCRIPTION
        "This field indicates whether the Server
        Manager board will notify pagers, telephones,
        or Server Manager facilities when this monitored
        item crosses a defined threshold.

This field is undefined if the monItemDataType
        is string, date or queue."
```

```
        ::= ( monItemEntry 5)

monItemInnateStatus   OBJECT-TYPE
    SYNTAX   INTEGER (
             externallyManaged(1)
             innate(2)
             )
    ACCESS   read-only
    STATUS   mandatory
    DESCRIPTION
         "This field indicates if the Server Manager
         board is responsible for monitoring the value
         of this monitored item or if an external
         operating system agent is acquiring the value
         and placing the data on the Server Manager
         board."
    ::= (monItemEntry 6 )

monItemHostNotify  OBJECT-TYPE
    SYNTAX   INTEGER (
             other(1),
             disabled(2),
             enabled(3)
             )
    ACCESS   read-only
    STATUS   mandatory
    DESCRIPTION
         "This field indicate if the operating system
         driver is to be notified of modifications to
         this monitored item's thresholds.
    ::= ( monItemEntry 7 )

monItemLogicalOperated   OBJECT-TYPE
    SYNTAX   INTEGER (
             equal(1),
             notequal(2),
             lessThan(3),
             greaterThan(4),
             lessThanOrEqual(5),
             greaterThanOrEqual(6),
             inside(7),
             outside(8)
             )
    ACCESS   read-only
    STATUS   mandatory
```

```
        DESCRIPTION
                "This shows the logical operation that is done
                with the limit (and optional) to determine if
                an alerting event has occurred.

This field is undefined if the monItemDataType
                is string, data or queue."
        ::= ( monItemEntry 8 )

monItemSeverity  OBJECT-TYPE
        SYNTAX   INTEGER (
                status(1),
                warning(2),
                critical(3),
                catastrophic(4)
                )
        ACCESS   read-only
        STATUS   mandatory
        DESCRIPTION
                "The severity of a problem with this monitored
                item.

This field is undefined if the monItemDataType
                is string, data or queue."
        ::= ( monItemEntry 9 )

monItemDataType  OBJECT-TYPE
        SYNTAX   INTEGER (
                counter(1),
                state(2),
                range(3),
                string(4),
                data(5),
                queue(6)
                )
        ACCESS   read-only
        STATUS   mandatory
        DESCRIPTION
                "The conceptual type of data of this monitored
                item."
        ::= ( monItemEntry 10)

monItemVoiceMagNum  OBJECT-TYPE
        SYNTAX   INTEGER (0..511)
        ACCESS   read-only
```

```
        STATUS   mandatory
        DESCRIPTION
            "The voice message number that would be
            delivered as part of a voice alert when this
            monitored item exceeds its threshold.

This field is undefined if the monItemDataType
            is string, data, or queue."
        ::= ( monItemEntry 11)

monItemLabel  OBJECT-TYPE
        SYNTAX   DisplayString (SIZE (0..15))
        ACCESS   read-only
        STATUS   mandatory
        DESCRIPTION
            "A short text description of the monitored
            item."
        ::= ( monItemEntry 12 )

monItemLimit  OBJECT-TYPE
        SYNTAX   INTEGER (-2147483648..2147483647)
        ACCESS   read-only
        STATUS   mandatory
        DESCRIPTION
            "Threshold information for this monitored item.
            The interpretation of this field depends on the
            monItemDataType field.

For counters this is the value that when
            passed, as specified by the comparator, an
            alert will occur.  the optional can be used to
            specify a step.  Whenever the value of the
            monitored item passes the value of the limit
            plus an integer multiple of the step a new
            alert will occur.

For states this is the value that when passed,
            as specified by the comparator, an alert will
            occur.

For ranges this value (the low threshold) and
            the value of the optional (the high threshold)
            define a range.  When the range boundaries are
            crossed, as specified by the comparator, an
            alert will occur.
```

This field is undefined if the monItemDataType
is string, data, or queue.
    ::= ( monItemEntry 13 )

monItemOptional   OBJECT-TYPE
    SYNTAX   INTEGER (-2147483648..2147483647)
    ACCESS   read-only
    STATUS   mandatory
    DESCRIPTION
        "Threshold information for this monitored item.
        The interpretation of this field depends on the
        monItemDataType field.

For counters this is the step.  Whenever the
        value of the monitored item passes the value of
        the limit plus an integer multiple of the step
        a new alert will occur.

For ranges this value (the high threshold) and
        the value of the limit (the low threshold)
        define a range.  When the range boundaries are
        crossed, as specified by the comparator, an
        alert will occur.

This field is undefined if the monItemDataType
        is state, string, data or queue."
    ::= ( monItemEntry 14 )

monItemDefVal   OBJEC-TYPE
    SYNTAX   INTEGER (-2147483648..21474863647)
    ACCESS   read-only
    STATUS   mandatory
    DESCRIPTION
        "Default value information for this monitored
        item. Certain Server Manager data types support
        a reset function.  This field specifies the
        value that the monitored item will change to
        when a reset command is received.  This field
        is only valid if the monItemDataType value is
        counter, state, or range.  This field is
        undefined if the monItemDataType is string,
        data, or queue."
    ::= ( monItemEntry 15 )

monItemCurVal   OBJECT-TYPE

```
    SYNTAX  INTEGER (-2147483648..2147483647)
    ACCESS  read-only
    STATUS  mandatory
    DESCRIPTION
        "The value of the monitored item if the
        monitored item's data type is counter, state,
        or range.  If the monitored item's data type is
        string,   data,   or   queue   this   value   is
        undefined."
    ::= ( monItemEntry 16 )

monItemCurString  OBJECT-TYPE
    SYNTAX  DisplayString (SIZE (0..255))
    ACCESS  read-only
    STATUS  mandatory
    DESCRIPTION
        "The value of the monitored item is the
        monItemDataType   is   string.     If   the
        monItemDataType is counter, state, range, data
        or queue this value is undefined."
    ::= ( monItemEntry 17)

monItemCurContents  OBJECT-TYPE
    SYNTAX  OCTET STRING (SIZE (0..256))
    ACCESS  read-only
    STATUS  mandatory
    DESCRIPTION
        "The value of the monitored item if the
        monItemDataType is data or queue.  If the
        monItemDataType is counter, state, range or
        string this value is undefined.

If the monItemDataType is data this field will
        contain a length octet(byte) followed by a
        number of octets of data equal to the value of
        the length octet.

If the monItemDataType is queue this field will
        contain a head of queue octet followed by 255
        octets of data.  The value of the head of queue
        octet indicates the data octet that is the
        logical head of the circular queue of data.
    ::= ( monItemEntry 18)

monItemTimeStamp  OBJECT-TYPE
```

```
SYNTAX   OCTET STRING (SIZE (0..6))
ACCESS   read-only
STATUS   mandatory
DESCRIPTION
        "An octet string specifying the time of the
        last change of this monitored item.  This octet
        string contains in the following order:  year,
        month, day of month, hour, minute, second."
::= ( monItemEntry 19)
```

©1992 Compaq Computer Corporation

Figure 8E:
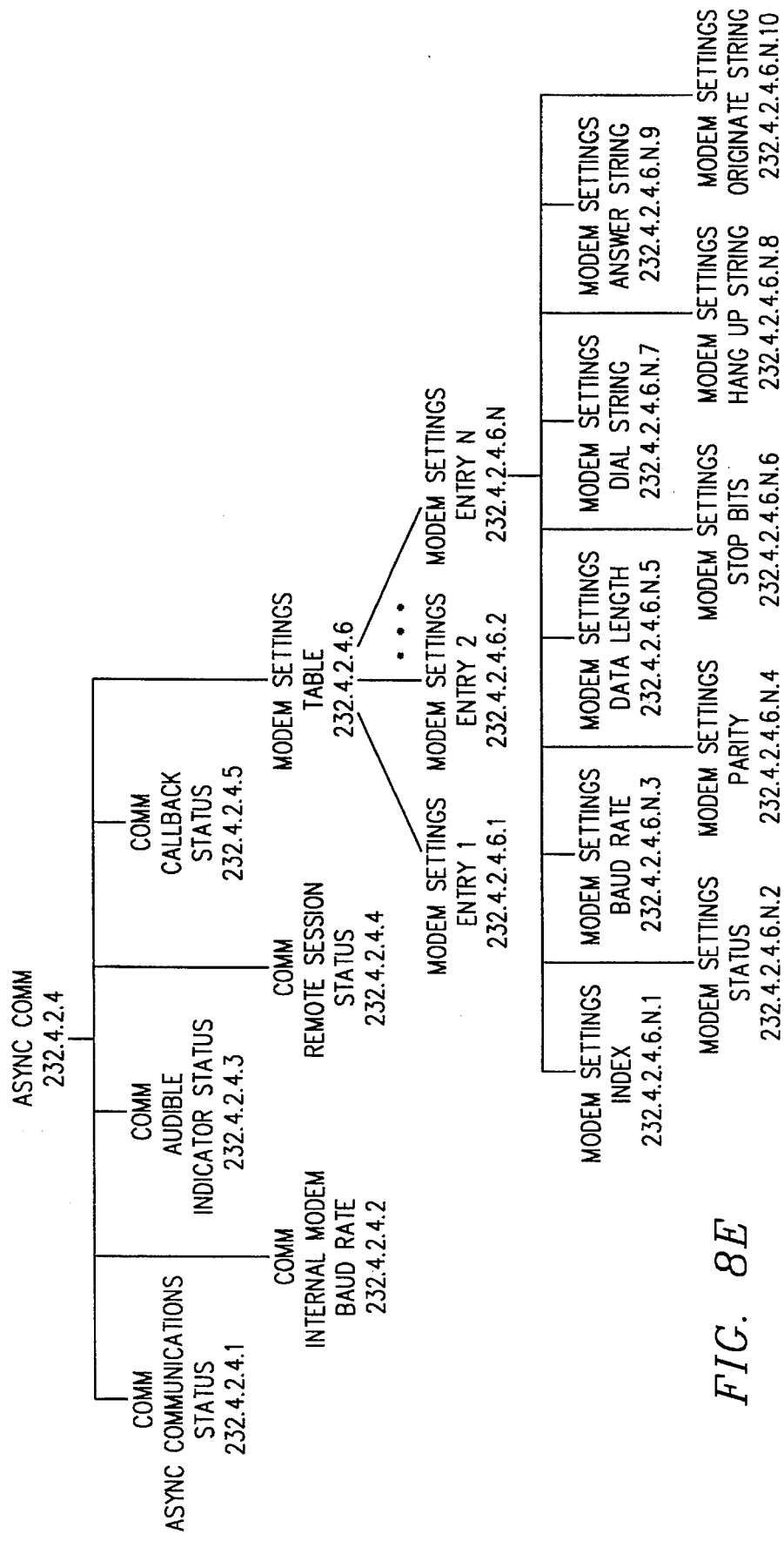
FIG. 8E is an inheritance tree illustrating an asynchronous communication child group of the component group of the subMIB of FIG. 8A.

Referring next to FIG. 8E, the asynchronous communications child group located at branch 232.4.2.4 will now be described in greater detail. The asynchronous communications child group contains five objects and a table for describing the configuration and status of the asynchronous communication ports of the server manager 24. The objects of the asynchronous communications child group include a status object located at branch 232.4.2.4.1, a internal modem baud rate object located at 232.4.2.4.2, an audible indicator status object located at branch 232.4.2.4.3, a remote session status object located at branch 232.4.2.4.3 and a callback status object located at branch 232.4.2.4.5. Information regarding the modem settings is contained in a modem settings table located at branch 232.4.2.4.6. The modem settings table includes an entry N for each modem installed on the server manager board. Each entry N contains a settings index object located at branch 232.4.2.4.6.N.1, a settings status object located at branch 232.4.2.4.6.N.2, a settings baud rate object located at branch 232.4.2.4.6.N.3, a settings parity object located at branch 232.4.2.4.6.N.3, a settings data length object located at branch 232.4.2.4.6.N.4, a settings stop bits object located at branch 232.4.2.4.6.N.5, a settings dial string object located at branch 232.4.2.4.6.N.7, a settings hand up string located at branch 232.4.2.4.6.N.8, a settings answer string located at branch 232.4.2.4.6.N.9 and a settings originate string located at branch 232.4.2.4.6.N.10. The formal organizational framework for the asynchronous communications child group is as follows:

settings stop bits object located at branch 232.4.2.4.6.N.5, a settings dial string object located at branch 232.4.2.4.6.N.7, a settings hand up string located at branch 232.4.2.4.6.N.8, a settings answer string located at branch 232.4.2.4.6.N.9 and a settings originate string located at branch 232.4.2.4.6.N.10. The formal organizational framework for the asynchronous communications child group is as follows:

```
commAsyncCommunicationStatus   OBJECT-TYPE
      SYNTAX   INTEGER (
               other(1),
               disable(2),
               enabled(3)
               )
      ACCESS   read-only
      STATUS   mandatory
      DESCRIPTION
            "Async Status
                  This shows if asynchronous communication
                  with the Server Manager's serial interface
                  and modem is enabled (3) or disabled (2).

This feature can be enabled or disabled
                  through the Collection Agent User
                  Interface (CPQCAUI.NLM).

You may want to disable the Async
                  Communication with the Server Manager to
                  prevent a Server manager Facility (SMF)
                  user from assuming control of the system
                  console.  Disabling the Async
                  Communication disconnects any active SMF
                  session.  Disabling the Async
                  Communications also disables all remote
                  alerts.  Server Manager On-the-Network
                  alerts will remain enabled.  On-the-
                  Network alerts are those sent over the
                  network."
      ::= ( asyncComm 1 )

commInternalModemMaxBaudRate   OBJECT-TYPE
```

```
commCallbackStatus   OBJECT-TYPE
     SYNTAX   INTEGER (
          other(1),
          disabled(2),
          enabled(3)
          )
     ACCESS   read-only
     STATUS   mandatory
     DESCRIPTION
          "The status of the call back feature of the
          Server Manager board."
     ::= ( asyncComm 5 )

commModemSettingsTable   OBJECT-TYPE
     SYNTAX   SEQUENCE OF ModemSettingEntry
     ACCESS   not-accessible
     STATUS   mandatory
     DESCRIPTION
          "The list of defined modem settings for the
          Server Manager board."
     ::= ( asyncComm 6 )

modemSettingsEntry   OBJECT-TYPE
     SYNTAX   ModemSettingsEntry
     ACCESS   not-accessible
     STATUS   mandatory
     DESCRIPTION
          "A defined modem's settings for the Server
          Manager board."
     INDEX   ( modemSettingsIndex )
     ::= ( commModemSettingsTable 1 )

ModemSettingsEntry   ::=SEQUENCE (
     modemSettingsIndex        INTEGER,
     modemSettingsStatus       INTEGER,
     modemSettingsBaudRate     INTEGER,
     modemSettingsParity       INTEGER,
     modemSettingsDataLength   INTEGER,
     modemSettingsStopBits     INTEGER (1..2)
     modemSettingsDialString   DisplayString (SIZE
                                    (0..24))
     modemSettingsHangUpString DisplayString (SIZE
                                    (0..24))
     modemSettingsAnswerString DisplayString (SIZE
                                    (0..24))
```

```
        modemSettingsOriginateString DisplayString (SIZE
                                    (0..24))
    )

modemSettingsIndex  OBJECT-TYPE
    SYNTAX   INTEGER (
             internalModem(48),
             externalModem(49),
             pager(50)
             )
    ACCESS   read-only
    STATUS   mandatory
    DESCRIPTION
        "The type of modem settings this entry
        describes."
    ::= ( modemSettingsEntry 1)

modemSettingsStatus   OBJECT-TYPE
    SYNTAX   INTEGER  (
             internalModemNotInstalled(1),
             internalUnitedStatesModemInstalled(2),
             internalInternationalModemInstalled(3),
             serialPortNotSetup(4),
             serialPortSetUpForDirectConnect(5),
             serialPartSetupForExternalModem(6),
             pagerInformationData(7)
             )
    ACCESS   read-only
    STATUS   mandatory
    DESCRIPTION
        "Status information about the modem described
        by this table entry.  Only some of these values
        are appropriate for some types of entries."
    ::= ( modemSettingsEntry 2 )

modemSettingsBaudRate   OBJECT-TYPE
    SYNTAX   INTEGER
    ACCESS   read-only
    STATUS   mandatory
    DESCRIPTION
        "The baud rate to be used over the
        communication medium by the Server Manager
        board."
    ::= ( modemSettingsEntry 3)
```

```
modemSettingsParity  OBJECT-TYPE
    SYNTAX  INTEGER (
            none(1),
            odd(2),
            even(3)
            )
    ACCESS  read-only
    STATUS  mandatory
    DESCRIPTION
        "The parity used for this communication medium
        by the Server Manager board."
    ::= ( modemSettingsEntry 4 )

modemSettingsDataLength  OBJECT-TYPE
    SYNTAX  INTEGER
    ACCESS  read-only
    STATUS  mandatory
    DESCRIPTION
        "The date length used for this communication
        medium by the Server Manager board."
    ::= ( modemSettingsEntry 5 )

modemSettingsStopBits  OBJECT-TYPE
    SYNTAX  INTEGER (1..2)
    ACCESS  read-only
    STATUS  mandatory
    DESCRIPTION
        "The number of stop bits used for this
        communication medium by the Server Manager
        board."
    ::= ( modemSettingsEntry 6 )

modemSettingsDialString  OBJECT-TYPE
        SYNTAX  DisplayString (SIZE (0..24))
        ACCESS  read-only
        STATUS  mandatory
        DESCRIPTION
            "The string that is entered before any
            dial operation by the Server Manager
            board."
        ::= ( modemSettingsEntry 7 )

modemSettingsHangUpString  OBJECT-TYPE
        SYNTAX  DisplayString (SIZE (0..24))
        ACCESS  read-only
```

```
        STATUS   mandatory
        DESCRIPTION
            "The string used to hang up the phone by
            the Server Manager board."
        ::= ( modemSettingsEntry 8 )

modemSettingsAnswerString   OBJECT-TYPE
        SYNTAX   DisplayString (SIZE (0..24))
        ACCESS   read-only
        STATUS   mandatory
        DESCRIPTION
            "The string used to put the modem into
            auto-answer mode by the Server Manager
            board."
        ::= ( modemSettingEntry 9 )

modemSettingsOriginateString   OBJECT-TYPE
        SYNTAX   DisplayString (SIZE (0..24))
        ACCESS   read-only
        STATUS   mandatory
        DESCRIPTION
            "The string is used to put the modem into
            originate mode by the Server Manager
            board."
        ::= ( modemSettingsEntry 10 )
```

©1992 Compaq Computer Corporation

```
alertStatus   OBJECT-TYPE
    SYNTAX   INTEGER (
             other(1),
             disabled(2),
             enabled(3)
             )
    ACCESS   read-only
    STATUS   mandatory
    DESCRIPTION
        "The current alerting status."
    ::= ( alert 1 )

alertDestTable   OBJECT-TYPE
    SYNTAX   SEQUENCE OF AlertDestEntry
    ACCESS   not-accessible
    STATUS   mandatory
    DESCRIPTION
        "The list of currently defined alert
        destinations on the Server Manager board."
    ::= ( alert 2 )

alertDestEntry   OBJECT-TYPE
    SYNTAX   AlertDestEntry
    ACCESS   not-accessible
    STATUS   mandatory
    DESCRIPTION
```

Figure 8F:
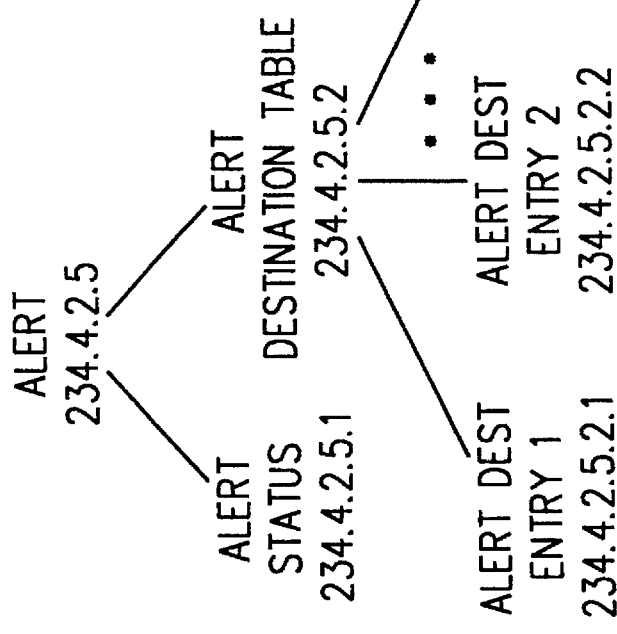
FIG. 8F is an inheritance tree illustrating an alert child group of the component group of the subMIB of FIG. 8A.

Referring next to FIG. 8F, the alert child group located at branch 234.4.2.5 will now be described in greater detail. The alert child group describes the configuration and status of the server manager board's alerting system using an alert status object located at branch 232.4.2.5.1 and an alert destination table located at branch 232.4.2.5.2. The alert destination table contains an entry N for each designated destination for an alert. For each selected destination, the alert destination table includes an alert priority index object located at branch 232.4.2.5.2.N.1, an alert destination type object located at branch 232.4.2.5.2.N.2, an alert destination retries object located at branch 232.4.2.5.2.N.3, an alert destination connect flags object located at branch 232.4.2.5.2.N.4, an alert destination phone number object located at branch 232.4.2.5.2.N.5, an alert destination time mask object located at branch 232.4.2.5.2.N.6, an alert destination pager type object located at branch 232.4.2.5.2.N.7, an alert destination pager ID object located at branch 232.4.2.5.2.N.8, and an alert destination pager display length object located at branch 232.4.2.5.2.N.9. The formal organization of the alert child group is as follows:

"A currently defined alert destination on the Server Manager board."
    INDEX   ( alertDestPriorityIndex )
    ::= ( alertDestTable 1 )

alertDestEntry ::= SEQUENCE (
    alertDestPriorityIndex    INTEGER,
    alertDestType             INTEGER,
    alertDestRetries          INTEGER (0..31),
    alertDestConnectFlags     INTEGER,
    alertDestPhoneNumber      DisplayString (SIZE
                                 (0..24)),
    alertDestTimeMast         OCTET STRING (SIZE
                                 (0..21)),
    alertDestPagerType        INTEGER,
    alertDestPagerID          DisplayString (SIZE
                                 (0..15)),
    alertDestPagerDisplayLength   INTEGER (0..80)
    )

alertDestPriorityIndex  OBJECT-TYPE
    SYNTAX   INTEGER
    ACCESS   read-only
    STATUS   mandatory
    DESCRIPTION
        "This is a number that uniquely specifies this alert destination. This number is also the priority of the alert destination. When an alert occurs, alert destinations are tried in an order based on their priority (lowest number first)."
    ::= ( alertDestEntry 1 )

alertDestType   OBJECT-TYPE
    SYNTAX   INTEGER (
            internalModemToSmf(161),
            internalModemToPager(162),
            internalModemToVoice(163),
            externalModemToSmf(164),
            externalModemToPager(165),
            externalDirectToSmf(166)
            )
    ACCESS   read-only
    STATUS   mandatory
    DESCRIPTION "The type of connection appropriate for the destination."
::= ( alertDestEntry 2 )

alertDestRetries  OBJECT-TYPE
    SYNTAX   INTEGER (0..31)
    ACCESS   read-only
    STATUS   mandatory
    DESCRIPTION
        "The number of retries for a successful connection that should be attempted to this alert destination."
    ::= ( alertDestEntry 3 )

alertDestConnectFlags  OBJECT-TYPE
    SYNTAX   INTEGER (
             alertOnly(1),
             callbackOnly(2),
             alertAndCallback(3)
             )
    ACCESS   read-only
    STATUS   mandatory
    DESCRIPTION
        "The type(s) of communication that this destination supports."
    ::= ( alertDestEntry 4 )

alertDestPhoneNumber  OBJECT-TYPE
    SYNTAX   DisplayString (SIZE (0..24))
    ACCESS   read-only
    STATUS   mandatory
    DESCRIPTION
        "The phone number for this destination.  This field is undefined if the alertDestType is externalDirectToSmf."
    ::= ( alertDestEntry 5 )

alertDestTimeMastk  OBJECT-TYPE
    SYNTAX   OCTET STRING (SIZE (0..21))
    ACCESS   read-only
    STATUS   mandatory
    DESCRIPTION
        "A set of bit flags specifying the times this is a valid destination.  Each bit specifies whether if this a valid destination for a specific hour of the week. The first bit is for the hour 12:00:01 am to 1:00:00 am on Monday. Each bit thereafter specifies the validity of this destination for the next hour."
::= ( alertDestEntry 6 )

alertDestPagerType   OBJECT-TYPE
    SYNTAX   INTEGER (
        numericOnly(1),
        alphanumeric(2)
        )
    ACCESS   read-only
    STATUS   mandatory
    DESCRIPTION
        "The type of pager at this destination. This field is undefined if the alerDestType is internalModemToSmf, internalModemToVoice, externalModemtoSmf or externalDirectToSmf."
    ::= ( alertDestEntry 7 )

alertDestPagerID   OBJECT-TYPE
    SYNTAX   DisplayString (SIZE (0..15))
    ACCESS   read-only
    STATUS   mandatory
    DESCRIPTION
        "The pager ID assigned by the paging company to identify the pager. This field is undefined if the alertDestType is internalModemtoSmf, internalModemToVoice, e x t e r n a l M o d e m T o S m f , o r externalDirectToSmf."
    ::= ( alertDestEntry 8 )

alertDestPagerDisplayLength   OBJECT-TYPE
    SYNTAX   INTEGER (0..80)
    ACCESS   read-only
    STATUS   mandatory
    DESCRIPTION
        "The size of the pager display. This field is undefined if the alertDestType is internalModemToSmf, internalModemToVoice, e x t e r n a l M o d e m T o S m f   o r externalDirectToSmf."
    ::= ( alertDestEntry 9 )

©1992 Compaq Computer Corporation

Thus, there has been described and illustrated herein a computer management system and a management information base associated therewith which provides significantly enhanced capabilities in managing a network comprised of multiple manageable devices. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of managing, using a management application running on a management console, a plurality of networked manageable devices which include at least one file server using a constructed management information base, said at least one file server having a system board, a drive array subsystem associated with said file server and a server manager installed in said file server for monitoring said system board, comprising the steps of:

collecting a plurality of objects describing said system board in a first subMIB;

collecting a plurality of objects describing said drive array subsystem in a second subMIB;

collecting a plurality of objects describing said server manager in a third subMIB;

assembling said first subMIB containing said plurality of objects describing said system board, said second subMIB containing said second plurality of objects describing said drive array subsystem and said third subMIB containing said plurality of objects describing said server manager into a management information base ("MIB"); and managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB.

2. A method of managing a plurality of networked manageable devices according to claim 1 wherein said system board is comprised of a plurality of components and has a software management agent installed therein to interface with said management console networked therewith and wherein the step of collecting said plurality of objects describing said system board into a first subMIB further comprises the step of organizing said first subMIB into two child groups, said first child group containing selected ones of said plurality of objects which describe a revision level of said software management agent installed on said system board and said second child group containing selected ones of said plurality of objects describe said components of said system board and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said revision level of said software management agent installed on said system board using said plurality of objects contained in said first child group of said first subMIB; and monitoring said components of said system board using said plurality of objects contained in said second child group of said first subMIB.

3. A method of managing a plurality of networked manageable devices according to claim 1 wherein said system board is comprised of a plurality of components and wherein the step of collecting a plurality of objects describing said system board in a first subMIB further comprises the step of organizing said collected plurality of objects into said first subMIB and a fourth subMIB, said first subMIB and said fourth subMIB each containing selected ones of said plurality of objects describing said system board, said first subMIB containing objects describing components installed on said system board other than those described in said fourth subMIB and said fourth subMIB containing objects which describe those components specific to a manufacturer and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said components installed on said system board which are specific to a manufacturer using said plurality of objects contained in said first subMIB; and monitoring said components installed on said system board which are not specific to a manufacturer using said plurality of objects contained in said fourth subMIB.

4. A method of managing a plurality of networked manageable devices according to claim 6 wherein a software management agent is installed in said system board to interface with said management console networked therewith and wherein the step of collecting said plurality of objects describing said system board into said first subMIB and a fourth subMIB further comprises the step of:

organizing said first subMIB into two child groups, said first child group containing selected ones of said plurality of objects describing a revision level of said software management agent installed on said system board and said second child group containing selected ones of said plurality of objects which describe said components of said system board other than those described in said fourth subMIB; and organizing said second subMIB into two child groups, said first child group containing selected ones of said plurality of objects which describe a revision level of said software management agent installed on said system board and said second child group containing selected ones of said plurality of objects which describe those components specific to a manufacturer;

wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the step of:

monitoring said revision level of said software management agent installed on said system board using said plurality of objects contained in said first child group of said first subMIB and said plurality of objects contained in said first child group of said fourth subMIB.

5. A method of managing a plurality of networked manageable devices according to claim 4 wherein the step of organizing said fourth subMIB to include a child group containing selected ones of said plurality of objects which describe those components of said system board specific to a manufacturer further comprises the step of organizing said child group into a plurality of children groups, said children groups including an interface child group which contains selected ones of said plurality of component objects which contain information specific to said software management agent, an asset management child group which contains selected ones of said plurality of component objects which contain asset management information, a security child group which contains selected ones of said plurality of component objects which contain information describing security features specific to said manufacturer and a system board child group which contains selected ones of said plurality of component objects which contain object instances describing said system board and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said software management agent installed on said system board using said plurality of objects contained in said interface child group of said fourth subMIB;

monitoring asset management information for said system board using said plurality of objects contained in said asset management child group of said fourth subMIB;

monitoring security information for said system board using said plurality of objects contained in said security child group of said fourth subMIB; and monitoring said components of said system board using said plurality of objects contained in said system board child group of said fourth subMIB.

6. A method of managing a plurality of networked manageable devices according to claim 1 wherein said drive array subsystem is comprised of a plurality of components and has a software management agent installed therein to interface with said management console networked therewith and wherein the step of collecting said plurality of objects describing said drive array subsystem into a second subMIB further comprises the step of organizing said second subMIB into three child groups, said first child group containing selected ones of said plurality of objects which describe a revision level of said software management agent installed on said drive array subsystem, said second child group containing selected ones of said plurality of objects which describe said components of said drive array subsystem and said third child group containing selected ones of said plurality of objects which describes traps generated by said drive array subsystem and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said revision level of said software management agent installed on said drive array subsystem using said plurality of objects contained in said first child group of said second subMIB;

monitoring said components of said drive array subsystem using said plurality of objects contained in said second child group of said second subMIB;

monitoring said traps generated by said drive array subsystem using said plurality of objects contained in said third child group of said second subMIB.

7. A method of managing a plurality of networked manageable devices according to claim 6 wherein said drive array subsystem further comprises at least one controller and/or accelerator card and logical, physical and spare drives and wherein the step of organizing said second subMIB to include said second child group containing selected ones of said plurality of objects describing said components of said drive array subsystem further comprises the steps of:

organizing said second child group into a plurality of sub-child groups, said sub-child groups including an interface child group which contains selected ones of said plurality of component objects which contain information specific to said software management agent, a controller child group which contains selected ones of said plurality of component objects which contain information specific to said controllers and/or accelerator cards, a logical drive child group which contains selected ones of said plurality of component objects which contain information specific to said logical drive, a physical drive group which contains selected ones of said plurality of component objects which contain information specific to said logical drive and a spare drive child group which contains selected ones of said plurality of component objects which contain information specific to said spare drive and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said software management agent using said plurality of component objects contained in said interface child group;

monitoring said controllers and/or accelerator cards using said plurality of component objects contained in said controller child group;

monitoring said logical drive using said plurality of component objects contained in said logical drive child group;

monitoring said physical drive using said plurality of component objects contained in said physical drive child group; and monitoring said spare drive using said plurality of component objects contained in said spare drive child group.

8. A method of managing a plurality of networked manageable devices according to claim 1 wherein said server manager is comprised of a plurality of components and has a software management agent installed therein to interface with said management console networked therewith and wherein the step of collecting said plurality of objects describing said server manager into a third subMIB further comprises the step of organizing said third subMIB into three child groups, said first child group containing selected ones of said plurality of objects which describe a revision level of said software management agent installed on said server manager, said second child group containing selected ones of said plurality of objects which describe said components of said server manager and said third child group containing selected ones of said plurality of objects which describe traps generated by said server manager and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said revision level of said software management agent installed in said server manager using said plurality of objects contained in said first child group of said third subMIB;

monitoring said components of said server manager using said plurality of objects contained in said second child group of said third subMIB; and monitoring said traps generated by said server manager using said plurality of objects contained in said third child group of said third subMIB.

9. A method of managing a plurality of networked manageable devices according to claim 8 wherein said components of said server manager innately monitor said system board to collect objects for processing thereby, said server manager further comprises at least one asynchronous port for performing off-the-network alerting and wherein the step of organizing said third subMIB to include a second child group containing all of said plurality of objects describing said components of said server manager further comprises the step of organizing said child group into a plurality of sub-child groups, said sub-child groups including an interface child group containing selected ones of said plurality of component objects which contain information specific to said software management agent, a controller child group containing selected ones of said plurality of component objects which contain configuration information specific to said server manager, an object child group containing selected ones of said plurality of objects whose values represent objects innately monitored by said server manager and objects containing information describing said server manager, an asynchronous communication child group containing selected ones of said plurality of objects which contain information describing status of said asynchronous communication ports installed on said server manager and an alert child group containing selected ones of said plurality of objects which contain information on the off-the-network alerting capabilities of said server manager and wherein the step of managing said file server from said management console using said assembled MIB by monitoring performance of said system board, said drive array subsystem and said server manager by monitoring performance of said system board, said drive array subsystem and said server manager using said plurality of objects describing said system board, said drive array subsystem and said server manager respectively contained in said first subMIB, said second subMIB and said third subMIB further comprises the steps of:

monitoring said software management agent using said plurality of component objects contained in said interface child group;

monitoring said configuration of said server manager using said plurality of component objects contained in said controller child group;

monitoring operations of said server manager using said plurality of component objects contained in said object child group which describes said server manager and said plurality of component objects in said object child group related to objects innately monitored by said server manager;

monitoring said status of said asynchronous communication port of said server manager using said plurality of component objects contained in said asynchronous communication child group; and monitoring said off-the-network alerting capabilities of said server manager using said plurality of component objects contained in said alert child group.

10. A method of managing, using a management application running on a management console, a plurality of networked manageable devices which include at least one file server using a constructed management information base, said at least one file server having a system board, a drive array subsystem associated with said file server and a server manager installed in said file server for monitoring said system board, comprising the steps of:

collecting a plurality of objects describing said system board;

collecting a plurality of objects describing said drive array subsystem;

collecting a plurality of objects describing said server manager;

assembling said plurality of objects describing said system board, said drive array subsystem and said server manager into a management information base ("MIB") having first, second, third and fourth subMIBs, said first subMIB organized to contain selected ones of said plurality of objects which describe said system board, said second subMIB containing selected ones of said plurality of objects which describe manufacturer specific components of said system board, said third subMIB containing selected ones of said plurality of objects which describe said drive array subsystem, and said fourth subMIB containing selected ones of said plurality of objects which describe said server manager; and managing said file server from said management console using said assembled MIB by monitoring performance of said system board, said drive array subsystem and said server manager using said plurality of objects describing said system board, said manufacturer specific components of said system board, said drive array subsystem and said server manager respectively contained in said first subMIB, said second subMIB, said third subMIB and said fourth subMIB.

11. For a file server having a system board, a drive array subsystem associated with said file server and a server manager installed in said file server for monitoring said system board, a management system for managing said file server comprising:

a bus;

a management information base ("MIB") coupled to said bus, said MIB comprised of:

a first subMIB containing a plurality of objects describing said system board;

a second subMIB containing a plurality of objects describing said drive array subsystem; and a third subMIB containing a plurality of objects describing said server manager;

a first software management agent installed in said system board and coupled to said bus, said first software management agent supporting said first subMIB by transporting said plurality of objects describing said system board to said first subMIB;

a second software management agent installed in said drive array subsystem and coupled to said bus, said second software management agent supporting said second subMIB by transporting said plurality of objects describing said drive array subsystem to said second subMIB;

a third software management agent installed in said server manager and coupled to said bus, said third software management agent supporting said third subMIB by transporting said plurality of objects describing said server manager to said third subMIB; and a management application coupled to said system bus, said file server being managed by monitoring, using said management application, performance of said system board, said drive array subsystem and said server manager using said plurality of objects describing said system board, said drive array subsystem and said server manager respectively contained in said first subMIB, said second subMIB and said third subMIB.

12. A management system according to claim 11 wherein said drive array subsystem further comprises a plurality of components, wherein said second subMIB further comprises a first child group containing selected ones of said plurality of objects which describe a revision level of said second software management agent installed in said drive array subsystem, a second child group containing selected ones of said plurality of objects which describe said components of said drive array subsystem and a third child group containing selected ones of said plurality of objects which describe traps generated by said drive array subsystem, said file server being further managed by monitoring, using said management application, said revision level of said second software management agent, said components of said drive array subsystem and said traps generated by said drive array subsystem using said plurality of objects contained in said first, second and third child groups, and further comprising an alert log listing said traps generated by said drive array subsystem.

13. A management system according to claim 12 wherein said drive array subsystem further comprises at least one controller and/or accelerator card and logical, physical and spare drives and wherein second child group further comprises a first sub-child group containing selected ones of said plurality of component objects containing information specific to said second software management agent, a second sub-child group containing selected ones of said plurality of component objects containing information specific to said controllers and/or accelerator cards, a third sub-child group which contains selected ones of said plurality of component objects containing information specific to said logical drive, a fourth sub-child group which contains selected ones of said plurality of component objects containing information specific to said physical drive and a fifth sub-child group which contains selected ones of said plurality of component objects containing information specific to said spare drive, said file server being further managed by monitoring, using said management application, said second software management agent, said controllers and/or accelerator cards, said logical drive, said physical drive and said spare drive using said plurality of component objects contained in said first, second, third, fourth and fifth sub-child groups.

14. A management system according to claim 11 wherein said server manager further comprises a plurality of components, wherein said third subMIB further comprises a first child group containing selected ones of said plurality of objects which describe a revision level of said third software management agent installed in said server manager, a second child group containing selected ones of said plurality of objects which describe said components of said server manager and a third child group containing selected ones of said plurality of objects which describe traps generated by said server manager, said file server being further managed by monitoring, using said management application, said revision level of said third software management agent, said components of said server manager and said traps generated by said server manager using said plurality of objects contained in said first, second and third child groups, and further comprising an alert log listing said traps generated by said server manager.

15. A management system according to claim 14 wherein said server manager further comprises at least one asynchronous communication port and wherein said second child group further comprises a first component child group containing selected ones of said plurality of component objects which contain information specific to said server manager's software management agent, a second component child group containing selected ones of said plurality of component objects which contain objects which describe the configuration of said system manager, a third component child group containing selected ones of said plurality of component objects whose values represent objects innately monitored by said server manager and objects containing information describing said server manager, a fourth component child group containing selected ones of said plurality of component objects which contain information related to said asynchronous communication port of said server manager, and a fifth component child group containing selected ones of said plurality of component objects which contain information related to the off-the-network alert capabilities of said server manager, said file server being further managed by monitoring, using said management application, said third software management agent, said configuration, said server manager, said status of said asynchronous communication port and said off-the-network alert capabilities of said server manager using said plurality of component objects contained in said first, second, third, fourth and fifth component child groups.

16. A method of managing a plurality of networked manageable devices according to claim 10 wherein the step of assembling said plurality of objects describing said system board, said drive array subsystem and said server manager into a management information base ("MIB") having first, second, third and fourth subMIBs further comprises the step of organizing said third subMIB to include a traps child group which contains selected ones of said plurality of objects which describes traps generated by said drive array subsystem and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB, said third subMIB and said fourth subMIB further comprises the step of:

transporting traps generated by said drive array subsystem to said management application; and notifying a network administrator located at said management consol of said traps transported from said drive array subsystem to said management application.

17. A method of managing a plurality of networked manageable devices according to claim 16 wherein a memory subsystem is coupled to said management application and further comprising the steps of:

transporting said objects which describes traps generated by said drive array subsystem transported to said management application to said memory subsystem; and assembling said objects transported to said memory subsystem as an alert log.

18. A method of managing a plurality of networked manageable devices according to claim 10 wherein the step of assembling said plurality of objects describing said system board, said drive array subsystem and said server manager into a management information base ("MIB") having first, second, third and fourth subMIBs further comprises the step of organizing said fourth subMIB to include a traps child group which contains selected ones of said plurality of objects which describes traps generated by said server manager and wherein the step of managing said file server from said management console using said assembled MIB by monitoring performance of said system board, said drive array subsystem and said server manager using said plurality of objects describing said system board, said drive array subsystem and said server manager respectively contained in said first subMIB, said second subMIB, said third subMIB and said fourth subMIB further comprises the step of:

transporting traps generated by said server manager to said management application; and notifying a network administrator located at said management consol of said traps transported from said server manager to said management application.

19. A method of managing a plurality of networked manageable devices according to claim 18 wherein a memory subsystem is coupled to said management application and further comprising the steps of:

transporting said objects which describes traps generated by said server manager and transported to said management application to said memory subsystem; and assembling said objects transported to said memory subsystem as an alert log.

* * * * *